United States Patent [19]
Takahashi et al.

[11] Patent Number: 5,887,867
[45] Date of Patent: Mar. 30, 1999

[54] SHEET SUPPLYING APPARATUS INCLUDING FIRST AND SECOND SHEET SUPPLY ROLLERS AND A SEPARATION ROLLER ALL MADE OF THE SAME MATERIAL

[75] Inventors: Koji Takahashi, Yokohama; Masaaki Saito; Masahiko Yokota, both of Tokyo, all of Japan

[73] Assignee: Canon Kabushiki Kaisha, Tokyo, Japan

[21] Appl. No.: 953,013

[22] Filed: Oct. 16, 1997

Related U.S. Application Data

[63] Continuation of Ser. No. 600,897, Feb. 13, 1996, abandoned.

[30] Foreign Application Priority Data

| | | | |
|---|---|---|---|
| Feb. 15, 1995 | [JP] | Japan | 7-026945 |
| Jun. 21, 1995 | [JP] | Japan | 7-154846 |
| Jul. 12, 1995 | [JP] | Japan | 7-175914 |

[51] Int. Cl.⁶ ........................................ B65H 3/06
[52] U.S. Cl. .................. 271/117; 271/122; 271/127; 271/165
[58] Field of Search ................ 271/9.07, 9.08, 271/117, 122, 125, 126, 127, 162, 165

[56] References Cited

U.S. PATENT DOCUMENTS

| | | | |
|---|---|---|---|
| 4,239,203 | 12/1980 | Uchida | 271/122 |
| 4,674,734 | 6/1987 | Ibuchi | 271/117 X |
| 5,116,034 | 5/1992 | Trask et al. | 271/121 X |

FOREIGN PATENT DOCUMENTS

| | | | |
|---|---|---|---|
| 123833 | 9/1980 | Japan | 271/117 |
| 17837 | 2/1981 | Japan | 271/117 |
| 183540 | 10/1983 | Japan | 271/122 |
| 61-1335 | 1/1986 | Japan . | |
| 162438 | 7/1986 | Japan | 271/9.07 |
| 170346 | 7/1993 | Japan | 271/9.07 |

*Primary Examiner*—Boris Milef
*Attorney, Agent, or Firm*—Fitzpatrick Cella Harper & Scinto

[57] ABSTRACT

A sheet supplying apparatus is provided including a sheet stacking unit for stacking a plurality of sheets, a first roller for supplying an uppermost sheet on the sheet stacking unit and a second roller for supplying a lowermost sheet on the sheet stacking unit. A separation roller is disposed between the first and second sheet supply rollers to pass a single sheet toward a predetermined direction and to separate the other sheets from the single sheet for return. The first and second sheet supply rollers and the separation roller are made of the same material, and the first and second sheet supply rollers are disposed upstream of the separation roller in a sheet supplying direction. The apparatus also includes a controller for controlling (i) a motor for driving the separation roller and the first and second sheet supply rollers, (ii) a pendulum gear train for selectively connecting the first or second sheet supply rollers to the motor and for reversing a rotational direction of the separation roller and (iii) a solenoid for shifting the sheet stacking unit to position the sheets thereon at a predetermined position with respect to the first and second sheet supply rollers.

15 Claims, 28 Drawing Sheets

SHEET SUPPLYING APPARATUS INCLUDING FIRST AND SECOND SHEET SUPPLY ROLLERS AND A SEPARATION ROLLER ALL MADE OF THE SAME MATERIAL

This application is a continuation of application Ser. No. 08/600,897 filed Feb. 13, 1996, now abandoned.

BACKGROUND OF THE INVENTION

1. Field of the Invention

The present invention relates to a sheet supplying apparatus used with a recording apparatus having a plurality of functions such as a copying function, a facsimile function, a printing function and the like, and a recording apparatus using such a sheet supplying apparatus.

2. Related Background Art

Normally, a recording apparatus includes an image reading portion, an image signal transmitting portion, and an image recording portion so that communication of image signals is effected, and a copying function is realized by driving the image reading portion and the image recording portion simultaneously. Further, in the image reading portion, there is provided a sheet supplying apparatus for separating plural originals one by one and supplying the separated original. Regardless of the communication function and the copying function, the original is supplied by using such a sheet supplying apparatus.

In FIG. 28 schematically showing the entire construction of a conventional recording apparatus, an original stacking plate 101 is constituted by an upper cover on which a plurality of originals S can be stacked. The recording apparatus comprises an image recording portion 102 for reading image information on the original S, a recording portion 103 comprised of a laser beam printer, an original convey portion 104, an image sensor 105 of close contact type for reading an image on the original, an original discharge tray 106, a laser scanner 107, an image forming portion 108, a photosensitive drum 109, a fixing portion 110, a cassette sheet supply portion 111, a recording sheet discharge tray 112, an upper original tray 113, a lower original tray 114, an operation portion 115, an auxiliary convey roller 116, a separation portion 117, a separation roller 118, and a reverse rotation roller 119.

First of all, an operator rests the originals S on the original stacking plate 101 with the imaged surfaces facing downside and then inserts the originals into the original convey portion constituted by the upper and lower original guides 113, 114. Then, the operator selects an operation mode by using selection keys on the operation portion 115. The operation mode may be a transmission mode, a copy mode, an image resolving power mode, a post-transmission stamp mode or the like.

When the original is sent or transmitted, after the original transmission mode is selected, the operator inputs the FAX telephone number of an receiver via the operation portion 115 and then depresses a start key on the operation portion. On the other hand, when the original is copied, the copy mode is selected, the operator inputs the copy number (number of parts) via the operation portion and then depresses the start key.

When the start key is depressed, the originals are sent to the separation portion 117 by the auxiliary roller 116. When the originals reach the separation portion 117, an lowermost original is separated from the other originals by the separation roller 118 (which tries to pull the lowermost sheet) and the reverse rotation roller 119 (which tries to return the laminated originals). The separated original is sent to the downstream original convey portion 104.

An image on the imaged surface (lower surface) of the original sent to the original convey portion is read by the image sensor 105 of close contact type. An analogue signal outputted from the image sensor 105 close contact type is subjected to image treatment such as shading correction, A/D conversion and the like. Thereafter, the signal is sent to a control portion (not shown) as image information. When the original is transmitted (facsimile transmission), the image information sent to the control portion is outputted to the circuit through a modem; whereas, when the original is copied, the image information sent to the control portion is outputted to the recording portion 103. After the image on the original is read, the original is discharged onto the original discharge tray. Accordingly, the originals are re-stacked with the imaged surface facing downside from the firstly supplied original to the lastly supplied original (so-called "face-down" and "page sequence").

When the original is copied, in the recording portion 103, scan light from the laser scanner 107 is illuminated on the photosensitive drum 109 of the image forming portion 108 in response to an image signal outputted from the control portion, thereby forming the image information on the photosensitive drum 109. Then, the image information is transferred onto a recording sheet P supplied from the cassette sheet supply portion 111 to the image forming portion 108. The recording sheet P to which the image information was transferred is sent to the fixing portion 110, where the image information is permanently fixed to the recording sheet. Thereafter, the recording sheet is discharged onto the recording sheet discharge tray. The recording sheets are stacked on the tray with the imaged surface facing upside from the first discharged sheet to the last discharged sheet (so-called "face-up" and "reverse page sequence"). In the case where the original is copied, when the recording sheets are stacked in a face-up fashion, since the imaged surface of the recording sheet can easily be ascertained, it is easy to check the image quality.

However, in the conventional technique as shown in FIG. 28, since the originals are read in page sequence and the recording sheets are stacked in the face-up fashion, there arises a problem that the recording sheets are stacked in the reverse page sequence. In order to stack the recording sheets in the same sequence as the original (page sequence), it is necessary to read the originals from the last page toward the first page and to stack the recorded recording sheet in the face-up fashion, or to read the original from the first page toward the last page and to stack the recorded recording sheets in the face-down fashion. However, in the former case, there arises a problem that, in the transmission (facsimile transmission), the information of the originals is sent from the last page. Further, in the latter case, there arises a problem that, in the copying operation, it is hard to check the image quality. To solve these problems, it is considered that the page sequence is reversed between the facsimile transmission and the copying operation, and the originals with page sequence or reverse page sequence are set in the sheet supplying apparatus. However, in this case, the handling of the originals becomes troublesome to frequently cause the mis-setting (upper/lower surface error), thus making the apparatus hard to use.

In consideration of the above circumstances, the inventors have proposed an improved sheet supplying apparatus capable of eliminating the drawbacks in the conventional technique shown in FIG. 28 (see Japanese Patent Publication No. 61-1335 (1986)). In this improved apparatus, two pair of combinations of sheet supply means and separation means are provided on two shafts, respectively so that sheets (originals) can be supplied from both an uppermost one and a lowermost one. Accordingly, if the improved sheet supplying apparatus is used with the recording apparatus shown in FIG. 28, it is not required that the page sequence is reversed or changed between the facsimile transmission and the copying operation, thereby making the recording apparatus easy to use.

However, in the above-mentioned improved apparatus, since there must be provided two pairs of combinations of the sheet supply means and the separation means having different coefficients of friction, the arrangement becomes complex and the number of parts is greatly increased, thereby making the sheet supplying apparatus very expensive, and, thus, the recording apparatus using such a sheet supplying apparatus is also expensive and complex.

SUMMARY OF THE INVENTION

An object of the present invention is to provide a sheet supplying apparatus and a recording apparatus having such a sheet supplying apparatus, in which it is not required that the page sequence is reversed or changed between facsimile transmission and a copying operation and in which, in the transmission, originals are transmitted from a first page, and, in the copying operation, recorded sheets are stacked in the original page sequence while facilitating the check of image quality.

To achieve the above object, according to the present invention, there is provided a sheet supplying apparatus comprising a sheet stacking means for stacking a plurality of sheets, a first rotary sheet supply means for supplying an uppermost sheet on the sheet stacking means, a second rotary sheet supply means for supplying a lowermost sheet on the sheet stacking means, a rotary separation means disposed between the first and second rotary sheet supply means and adapted to cooperate with the first or second rotary sheet supply means to pass a single sheet toward a predetermined direction and to separate the other sheets from the single sheet to return the other sheets, a first drive means for driving the rotary separation means and the first and second rotary sheet supply means, a switching means for selectively connecting the first rotary sheet supply means or the second rotary sheet supply means to the first drive means and for reversing a rotational direction of the rotary separation means, and a second drive means for shifting the sheet stacking means so that the sheets on the sheet stacking means are positioned at a predetermined position with respect to the first and second rotary sheet supply means, and wherein the first and second rotary sheet supply means and the rotary separation means are formed from substantially the same material.

Further, the present invention provides a sheet supplying apparatus comprising a sheet stacking weans for stacking a plurality of sheets, a first rotary sheet supply means for supplying an uppermost sheet on the sheet stacking means, a second rotary sheet supply means for supplying a lowermost sheet on the sheet stacking means, a rotary separation means disposed between the first and second rotary sheet supply means at a downstream side and adapted to cooperate with the first or second rotary sheet supply means to pass a single sheet toward a predetermined direction and to separate the other sheets from the single sheet to return the other sheets, a first drive means for driving the rotary separation means and the first and second rotary sheet supply means, a switching means for selectively connecting the first rotary sheet supply means or the second rotary sheet supply means to the first drive means and for reversing a rotational direction of the rotary separation means, and a second drive means for shifting the sheet stacking means so that the sheets on the sheet stacking means are positioned at a predetermined position with respect to the first and second rotary sheet supply means.

Furthermore, the present invention provides a sheet supplying apparatus comprising a sheet stacking means for stacking a plurality of sheets, a first rotary sheet supply means for supplying an uppermost sheet on the sheet stacking means, a second rotary sheet supply means for supplying a lowermost sheet on the sheet stacking means, a rotary separation means disposed between the first and second rotary sheet supply means and having a diameter smaller than those of the first and second rotary sheet supply means and adapted to cooperate with the first or second rotary sheet supply means to pass a single sheet toward a predetermined direction and to separate the other sheets from the single sheet to return the other sheets, a first drive means for driving the rotary separation means and the first and second rotary sheet supply means, a switching means for selectively connecting the first rotary sheet supply means or the second rotary sheet supply means to the first drive means and for reversing a rotational direction of the rotary separation means, and a second drive means for shifting the sheet stacking means so that the sheets on the sheet stacking means are positioned at a predetermined position with respect to the first and second rotary sheet supply means.

In addition, the present invention provides a sheet supplying apparatus comprising a sheet stacking means for stacking a plurality of sheets, a displacement means for displacing the sheet stacking means upwardly and downwardly, a rotary sheet supply means capable of selectively effecting a normal rotation for supplying an uppermost sheet on the sheet stacking means or a reverse rotation for supplying a lowermost sheet on the sheet stacking means, a first rotary separation means disposed above the rotary sheet supply means and rotated in a sheet returning direction, and a second rotary separation means disposed below the rotary sheet supply means and rotated in the sheet returning direction, and wherein a diameter of the rotary sheet supply means is greater than those of the first and second rotary separation means.

Further, the present invention provides a sheet supplying apparatus comprising a sheet stacking means for stacking a plurality of sheets, a displacement means for displacing the sheet stacking means upwardly and downwardly, a rotary sheet supply means capable of selectively effecting a normal rotation for supplying an uppermost sheet on the sheet stacking means or a reverse rotation for supplying a lowermost sheet on the sheet stacking means, a first rotary separation means disposed above the rotary sheet supply means and rotated in a sheet returning direction, and a second rotary separation means disposed below the rotary sheet supply means and rotated in the sheet returning direction, and wherein the rotary sheet supply means is disposed at an upstream side of the first and second rotary separation means.

Furthermore, the present invention provides a sheet supplying apparatus comprising a sheet stacking means for stacking sheets, a sheet tip end restraining means for restraining tip ends of the sheets stacked on the sheet stacking means, a first separation means for separating and supplying an uppermost sheet on the sheet stacking means, and a second separation means for separating and supplying a lowermost sheet on the sheet stacking means, and wherein the sheet stacking means can be shifted between a waiting position where the shifting of the sheet into the first and second separation means is prevented by the sheet tip end restraining means, a first feeding-out position where the sheet is fed out to the first separation means and a second feeding-out position where the sheet is fed out to the second separation means.

Finally, the present invention provides a sheet supplying apparatus comprising a sheet stacking means for stacking sheets, a first rotary member capable of selectively effecting a normal rotation for supplying an uppermost sheet on the sheet stacking means or a reverse rotation for supplying a lowermost sheet on the sheet stacking means, a separation member disposed in a confronting relation to one peripheral surface of the first rotary member, and a second rotary member disposed in a confronting relation to the other peripheral surface of the first rotary member.

According to the sheet supplying apparatus of the present invention, when the sheet stacking means is shifted by the second drive means to shift the sheets on the sheet stacking means to the predetermined position with respect to the first rotary sheet supply means, the uppermost sheet on the sheet stacking means is supplied to the predetermined direction by means of the first rotary sheet supply means and the other sheets (other than the uppermost sheet) are returned by the separation means. When the sheet stacking means is shifted by the second drive means to shift the sheets on the sheet stacking means to the predetermined position with respect to the second rotary sheet supply means, the lowermost sheet on the sheet stacking means is supplied to the predetermined direction by means of the second rotary sheet supply means and the other sheets (other than the lowermost sheet) are returned by the separation means.

Further, according to the present invention, since the first and second sheet supply means are disposed at the upstream side of the separation means in the sheet supplying direction, a contact area between the first and second sheet supply means and the sheet is increased, so that the sheet supplying force is effectively applied from the first and second sheet supply means to the sheet, thereby supplying the sheet positively. Further, since the diameters of a roller as the first sheet supply means and of a roller as the second sheet supply means are greater than the diameter of a roller as the separation means, a contact area between the first and second sheet supply means and the sheet is increased, so that the sheet supplying force is effectively applied from the first and second sheet supply means to the sheet, thereby supplying the sheet positively.

Further, according to the present invention, if the load acting on the separation means is smaller than a predetermined value, a torque limiter is not activated, so that the power is transmitted from the first drive means to the separation means, thereby returning the other sheets onto the sheet stacking means. On the other hand, if the load having the predetermined value acts on the separation means, the torque limiter is activated, so that the transmission of the power from the first drive means to the separation means is interrupted. Accordingly, if the load having the predetermined value acts on the separation means, the separation means is driven by the operation of the first or second sheet supply means, with the result that the separating operation of the separation means is stopped.

Further, according to the present invention, a first auxiliary convey means is connected to a third drive means via the switching means so that the first auxiliary convey means cooperates with the first sheet supply means to supply the uppermost sheet on the sheet stacking means to the predetermined direction. In addition, when a second auxiliary convey means is connected to the third drive means via the switching means, the second auxiliary convey means cooperates with the second sheet supply means to supply the lowermost sheet on the sheet stacking means to the predetermined direction.

Further, according to the present invention, an auxiliary convey means disposed below the sheet stacking means is driven by the drive means so that the auxiliary convey means cooperates with the second sheet supply means to supply the lowermost sheet on the sheet stacking means to the predetermined direction. Accordingly, the lowermost sheet which is difficult to supply since the weights of the other sheets act on the lowermost sheet, can positively be supplied by the adequate sheet supplying forces of the second sheet supply means and of the auxiliary convey means.

According to the present invention, since the sheets on the inclined sheet stacking means penetrate into a nip between the first sheet supply means and the separation means or a nip between the second sheet supply means and the separation means by their own weights, the gravity force is added to the sheet supplying force of the first or second sheet supply means, with the result that the uppermost or lowermost sheet on the sheet stacking means is positively supplied.

Further, according to the present invention, since the sheets are urged against a stopper by an elastic member, even when the number of the sheets on the sheet stacking means becomes few after the sheets were successively supplied, the uppermost sheet on the sheet stacking means is always positioned at a predetermined position with respect to the first sheet supply means, thereby supplying the uppermost sheet positively by the first sheet supply means.

Furthermore, according to the recording apparatus of the present invention, when the uppermost sheet on the sheet stacking means is applied by the sheet supplying apparatus, since a control signal is sent from a control means to a convey path switching means so that the convey path switching means switches a sheet convey path from a first sheet discharge tray side to a reverse rotation sheet convey path side, the sheet conveyed by the first convey means is guided by the convey path switching means toward the reverse rotation sheet convey path side, with the result that the sheets are discharged and stacked on a second discharge tray by the second convey means in a page sequence same as the page sequence of the sheets stacked on the sheet stacking means. On the other hand, when the lowermost sheet on the sheet stacking means is applied by the sheet supplying apparatus, the sheets conveyed by the first convey means are discharged and stacked on the first discharge tray by in the page sequence same as the page sequence of the sheets stacked on the sheet stacking means.

Further, since the sheet stacking means can be shifted between the waiting position where the shifting of the sheet into the first and second separation means is prevented by the sheet tip end restraining means, the first feeding-out position where the sheet is fed out to the first separation means and a second feeding-out position where the sheet is fed out to the second separation means, when the sheets are set, the tip ends of the sheets are prevented from entering into the first or second separation means by the sheet tip end restraining means, and, when the sheets are fed out, since the sheet stacking means is shifted to the sheet feeding-out position where the sheet can be fed out to the first or second separation means, the tip ends of the sheets set on the sheet stacking means is not obstructed by the rollers disposed at the downstream side in the sheet conveying direction, and, thus, the setting condition of the sheets is prevented from being disordered, thereby preventing poor sheet supply, such as double-feed.

In the present invention, with the arrangement as mentioned above, due to the cooperation between the first rotary member and the second rotary member, the sheets stacked on the sheet stacking means can be separated and supplied one by one from the lowermost one. Further, due to the cooperation between the first rotary member and the separation member, the sheets stacked on the sheet stacking means can be separated and supplied one by one from the lowermost one. By changing the rotational direction of the first rotary member in accordance with the case where the uppermost sheet is supplied or the case where the lowermost sheet is supplied, a lowermost sheet supply mode or an uppermost sheet supply mode can be selected.

By contacting the auxiliary sheet supply means with the lowermost sheet on the sheet stacking means to apply the sheet supplying force to the lowermost sheet, even when the sheet stack on the sheet stacking means is relatively heavy, the lowermost sheet in the sheet stack can be positively supplied.

By shifting a downstream end (supplying side end) of the sheet stacking means along a predetermined curvature of radius by means of a link mechanism and by setting the sheets stacked on the sheet stacking means between the first and second rotary members or between the first rotary member and the separation means, the lowermost or uppermost sheet can be contacted with the first rotary member.

When the sheets stacked on the sheet stacking means are supplied from the lowermost one, by holding the sheet stacking means to a stopped condition (fixed position), a lowermost position of the sheet stack can be kept constant by the weight of the sheet. On the other hand, when the sheets stacked on the sheet stacking means are supplied from the uppermost one, by changing the height of the sheet stacking means, an uppermost position of the sheet stack can be kept constant.

By shifting the downstream end (supplying side end) of the sheet stacking means by engaging an engagement member provided at the downstream end of the sheet stacking means with an end of a slit of a link member to urge the lowermost sheet on the sheet stacking means against the auxiliary sheet supply means, the height of the sheet stacking means can be kept substantially constant.

Further, by a sheet regulating means provided on the sheet stacking means, the supply of the sheets stacked on the sheet stacking means can be regulated. In addition, in response to the sheet supplying timing, by pushing an engagement portion of the sheet regulating means by means of a first or second lock member, the regulation of the sheet supply by means of the sheet regulating means can be released.

When the engagement portion of the sheet regulating means is locked by the second lock member, by biasing the sheet stacking means by a restoring force of an elastic member for holding a condition that a protruded portion of the sheet regulating means is positioned in perpendicular to the surface of the sheet stack on the sheet stacking means, the uppermost sheet on the sheet stacking means can be biased to contact with the first rotary member.

Further, by biasing the separation means to different positions with respect to the first rotary member, the respective biasing forces can be set independently, with the result that the separating condition (for the sheet) of the separation means can be adjusted in accordance with the difference in load resulting from the difference in sheet supply position between the uppermost and lowermost sheets.

If the sheet supplying force is insufficient when the sheets are supplied from the lowermost one in association with the weight of the sheets, the sheet supplying force is increased by the auxiliary sheet supply means. On the other hand, when the sheets are supplied from the uppermost one, the sheet supplying force of the auxiliary sheet supply means is not applied to the sheet, thereby preventing the excessive sheet supplying force.

By changing a contact portion between the sheet and the first rotary member by shifting the downstream end (supplying side end) of the sheet stacking means by means of the link mechanism, the uppermost sheet supply mode and the lowermost sheet supply mode can be switched.

By using an arrangement in which the link mechanism and the first rotary member are rotated in the same direction and the link mechanism and the first rotary member are driven by a single drive source, a discrete drive source for the link mechanism can be omitted, with the result that the number of parts can be reduced and the construction can be made simpler.

The downstream end (supplying side end) of the sheet stacking means can be shifted with the predetermined curvature of radius along the slit formed in the end of the link member constituting the link mechanism. Further, the transmission of the driving force of the link mechanism is permitted or prohibited by a clutch means, with the result that the sheet stacking means can be shifted to the predetermined position and stopped there.

When the sheets are supplied from the lowermost one, by keeping the sheet stacking means stationary to always keep a positional relation between the lowermost sheet and the first rotary member; whereas, when the sheets are supplied from the uppermost one, by shifting the sheet stacking means, a proper positional relation between the uppermost sheet and the first rotary member can always be maintained. After the downstream end (supplying side end) of the sheet stacking means passed through a highest point and is lowered to approach the first rotary member, the lowermost sheet is contacted with the auxiliary supply means, thereby ensuring the optimum position in the lowermost sheet supply mode.

By abutting the engagement portion provided on the downstream end (supplying side end) of the sheet stacking means against the end of the slit of the link member to urge the lowermost sheet on the sheet stacking means against the auxiliary sheet supply means, the height of the sheet stacking means can be kept constant to obtain the optimum position for the lowermost sheet supply mode. By arranging the auxiliary sheet supply means inside of an arc drawn by the downstream end (supplying side end) of the sheet stacking means, even while the sheet stacking means is being moved, a positional relation that the sheet stack is not contacted with the auxiliary sheet supply means can be maintained, thereby preventing the mis-alignment of sheets.

After the sheet is contacted with the first rotary member, by slightly overrunning the link member to permit the downstream end (supplying side end) of the sheet stacking means to shift along the slit of the link member, contact pressure between the uppermost sheet and the first rotary member can be changed freely, thereby obtaining the optimum contact pressure.

When the downstream end (supplying side end) of the sheet stacking means approaches the first rotary member, since the tip ends of the sheets are lifted by a slope provided on the separation means, the contact between the separation means and the tip ends of the sheets is avoided, thereby preventing the folding of the tip end portion(s) of the sheet(s) and the mis-alignment of the tip ends of the sheets.

Since the sheet regulating means is provided on the sheet stacking means, even while the sheet stacking means is being moved, the mis-alignment of the sheets can be avoided. Further, while the downstream end (supplying side end) of the sheet stacking means is approaching the first rotary member, the sheet regulating means releases the sheets.

In the uppermost sheet supply mode, when the elastic member for holding the sheet regulating means in the condition that one end of the sheet regulating means is protruded in perpendicular to the surface of the sheet stack is locked to the second lock member for urging the other end of the sheet regulating means in opposition to an elastic force of the elastic member, the sheet regulating member is biased to urged the uppermost sheet against the first rotary member.

As mentioned above, since the recording apparatus and the image forming apparatus having the sheet supplying apparatus according to the present invention have the aforementioned construction and function, in both the facsimile transmission mode and the copy mode, even when the originals arranged in the page sequence are set in the same orientation, during the facsimile transmission, the originals are read and transmitted from the first page toward the last page, and, during the copying operation, the originals are read from the last page toward the first page and the recorded recording sheets are stacked in the page sequence and in the face-up fashion.

Further, in the present invention, in accordance with the case where the originals are supplied from the uppermost one or the case where the originals are supplied from the lowermost one, since the first or the second sheet supply means is operated, various condition such as a working condition (polishing direction) and coefficient of friction for the respective sheet supply means can easily be set to stabilize the sheet supplying ability and the sheet separating ability, thereby improving the reliability of the sheet supplying apparatus and the recording apparatus having such a sheet supplying apparatus.

According to the present invention, since the separation means, first sheet supply means and second sheet supply means are constituted by the rollers and these rollers have the same shape and are made of same material, regardless of the fact that the first sheet supply means acts as the feed roller or the second sheet supply means acts as the feed roller, the coefficient of friction (for separating the sheets (to be supplied) one by one) between separation means and the first or second sheet supply means is kept constant to stabilize the sheet separating ability, thereby improving the reliability of the sheet supplying apparatus and the recording apparatus having such a sheet supplying apparatus. In addition, according to the present invention, when two or three rollers among above three rollers are constituted by similar rollers, the parts can be standardized, thereby reducing the manufacturing cost.

According to the present invention, since the separation means, first sheet supply means and second sheet supply means are constituted by the rollers and the first and second sheet supply means disposed above and below the separation means are disposed at the upstream side of the separation means in the sheet supplying direction, even when the sheets on the sheet stacking means are fed out from the lowermost one or the uppermost one, the contact areas between the sheet and the first and second sheet supply means can be increased to apply the sufficient supplying force to the sheet, thereby stabilizing the sheet separating ability and improving the reliability of the sheet supplying apparatus and the recording apparatus having such a sheet supplying apparatus.

Further, in the present invention, since the diameter of the roller as the separation means is smaller than the diameters of the rollers as the first and second sheet supply means so that the contact areas between the sheet and the rollers constituting the first and second sheet supply means can be increased, the sufficient supplying force can be applied to the sheet, thereby stabilizing the sheet separating ability and improving the reliability of the sheet supplying apparatus and the recording apparatus having such a sheet supplying apparatus.

Furthermore, according to the present invention, since the separation means acting as a retard roller is connected to the first drive means via the torque limiter, when the separation means cooperates with the first or second sheet supply means, the optimum torque can be transmitted to the separation means by the torque limiter. Accordingly, in the present invention, since the sheet returning force of the separation means can be controlled by the torque limiter, the sheet separating ability is stabilized, thereby improving the reliability of the sheet supplying apparatus and the recording apparatus having such a sheet supplying apparatus.

In addition, since, when the sheets are set, the tip ends of the sheets are prevented from entering into the first or second separation means by the sheet tip end restraining means, and, when the sheets are supplied, sheet stacking means is shifted to the position where the sheets are sent to the first or second separation means, the tip ends of the sheets set on the sheet stacking means are not obstructed by the rollers disposed at the downstream side in the sheet conveying direction, and, thus, the setting condition of the sheets can be prevented from being disordered, thereby preventing the poor sheet supply such as double-feed.

Further, by adopting the retard system in the lowermost sheet supply mode which may easily cause the double-feed and by adopting the friction separation system in the uppermost sheet supply mode, the construction of the separation portion can be simplified, thereby reducing the manufacturing cost. In addition, by using two kinds of separation systems, since the separating conditions (such as urging force, coefficient of friction and the like) for the first rotary member can easily be set with different value and the frictional wear can be reduced, the reliability and durability of the separation portion can be improved.

Since the first rotary member can be used both in the uppermost sheet supply mode and in the lowermost sheet supply mode, the construction can be simplified and the manufacturing cost can be reduced, thereby making the entire apparatus compact.

DETAILED DESCRIPTION OF THE PREFERRED EMBODIMENTS

The present invention will now be explained in connection with embodiments thereof with reference to the accompanying drawings.

[First Embodiment]

FIGS. 1 to 4 show a first embodiment of the present invention, where

Figure 1:
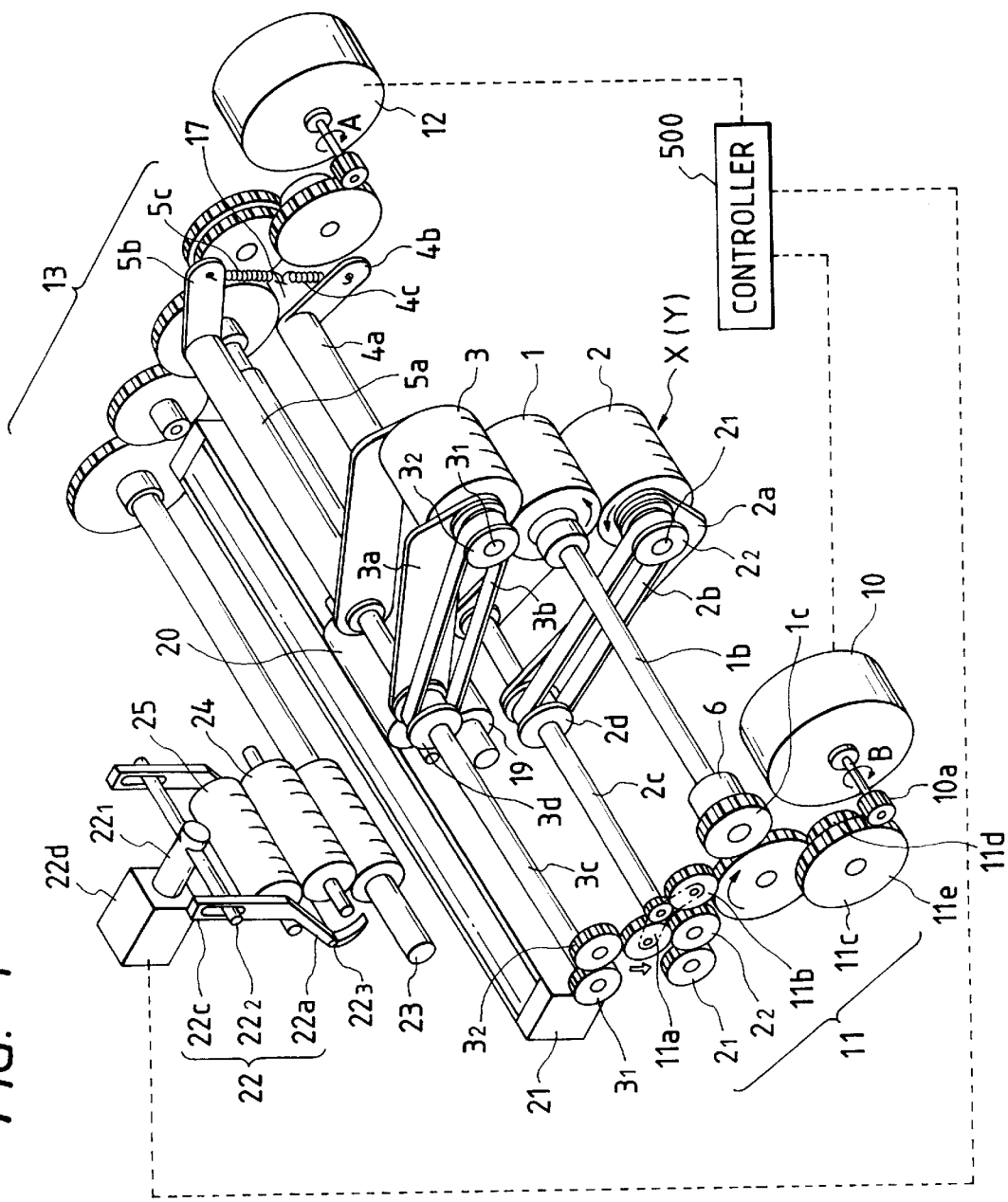
FIG. 1 is a perspective view of a main part of a sheet supplying apparatus according to a first embodiment of the present invention and a recording apparatus having such a sheet supplying apparatus, showing a first operating condition.
Figure 2:
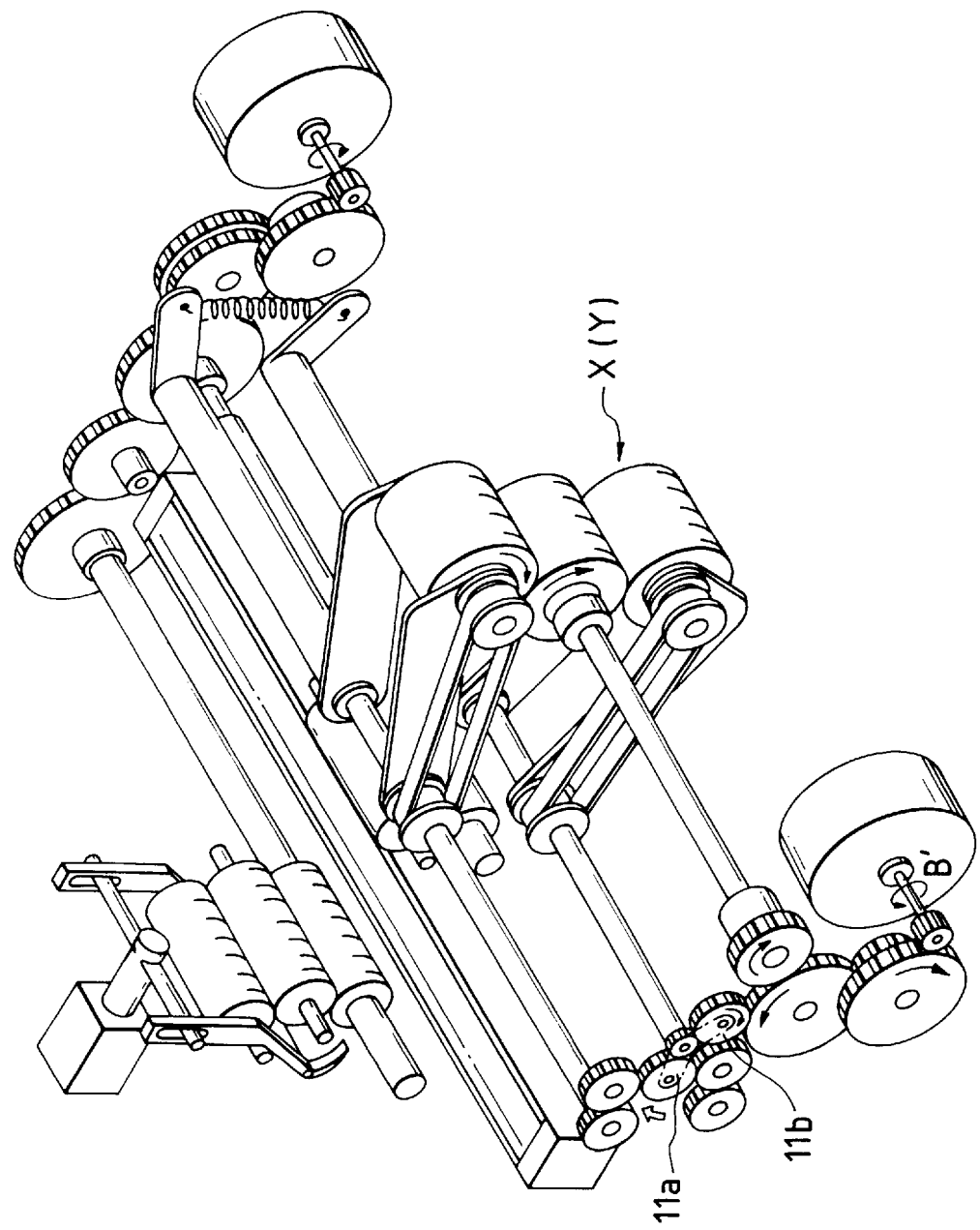
FIG. 2 is a perspective view showing a second operating condition.
Figure 3:
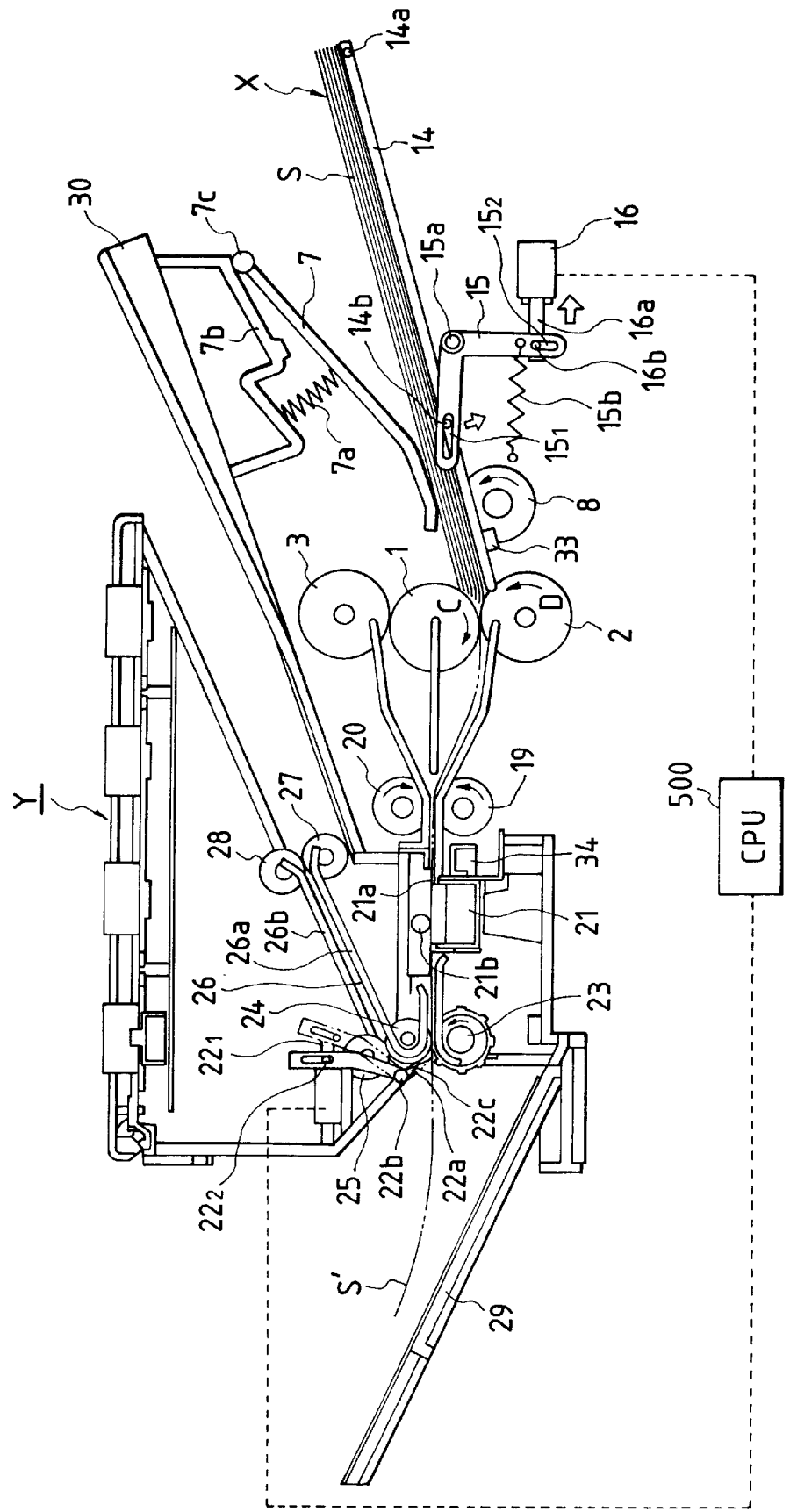
FIG. 3 is an elevational view of a main part of the sheet supplying apparatus according to the first embodiment of the present invention and the recording apparatus having such a sheet supplying apparatus, showing the first operating condition.
Figure 4:
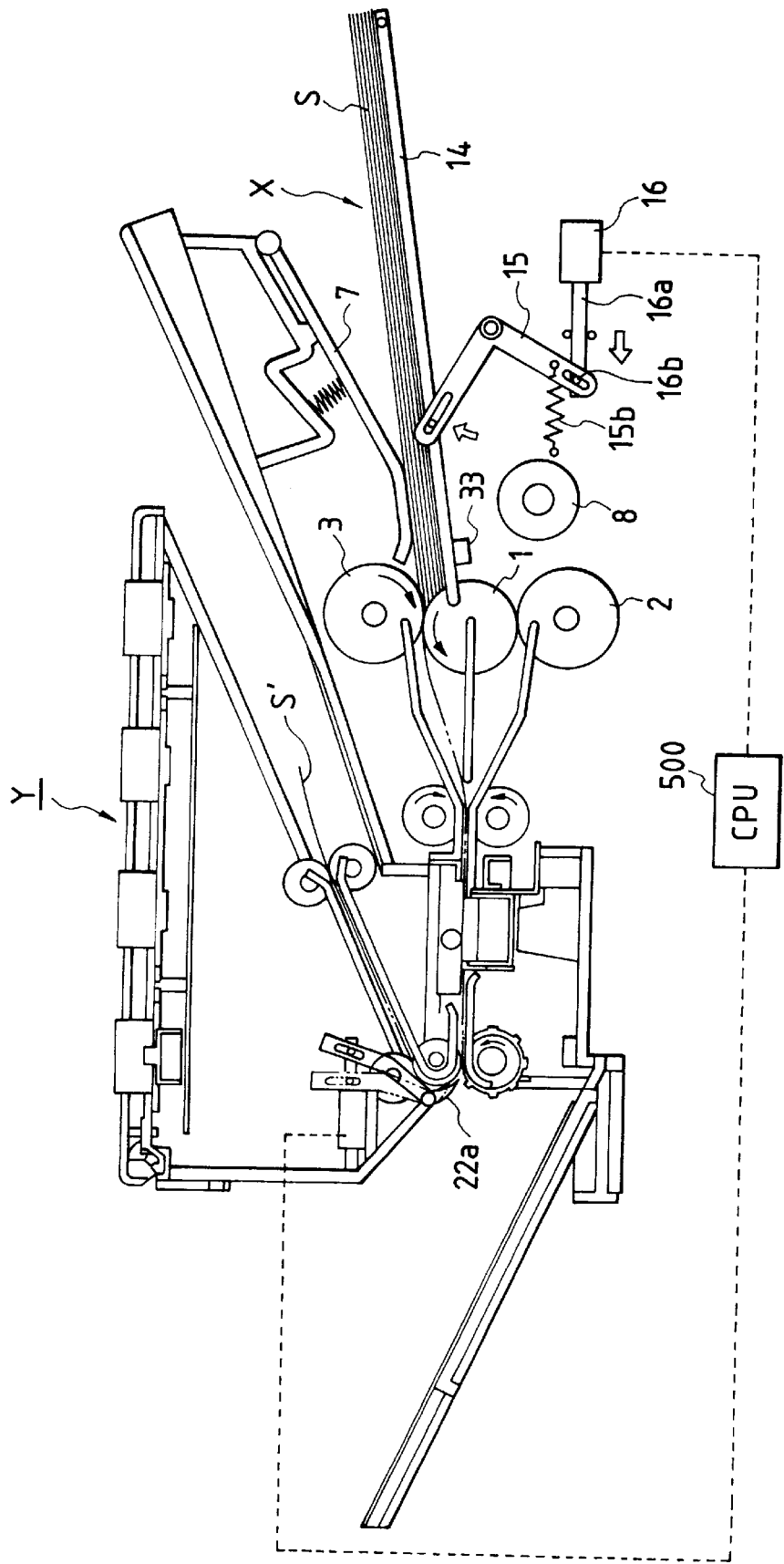
FIG. 4 is an elevational view showing the second operating condition.

FIG. 1 is a perspective view of a main part of a sheet supplying apparatus X according to a first embodiment of the present invention and a recording apparatus Y having such a sheet supplying apparatus, showing a first operating condition, FIG. 2 is a perspective view showing a second operating condition, FIG. 3 is an elevational view of a main part of the recording apparatus having the sheet supplying apparatus, showing the first operating condition; and FIG. 4 is an elevational view showing the second operating condition.

In FIGS. 1 to 4, a retard (double-feed preventing) roller 1 as a separation means is attached to a drive shaft 1$b$ which can be reversibly rotated. The drive shaft 1$b$ is rotatably supported by bearings (not shown) and is connected to a first motor (first drive means) 10 through gears 1$c$, 11$c$, 11$d$, 11$e$ and a pinion 10$a$ so that the drive shaft is rotated by the first motor 10. Incidentally, the gear 1$c$ is attached to the drive shaft 1$b$ via a torque limiter 6 so that, when a load having a predetermined value acts on the drive shaft via the retard roller 1, the power from the first motor 10 is interrupted by the torque limiter 6.

A first separation roller (second sheet supply means) 2 is disposed below the retard roller 1. The first separation roller 2 is attached to an end of an arm 2$a$ rotatably attached to a drive shaft 2$c$, via a bearing (not shown). A rotary shaft 2$_1$ rotated together with the first separation roller 2 is provided at its end with a pulley 2$_2$ which is connected to a pulley 2$d$ secured to the drive shaft 2$c$ via a belt 2$b$ extending between the pulleys, so that the rotary shaft is rotatingly driven by the drive shaft 2$c$. Further, the rotary shaft 2$_1$ of the first separation roller 2 is disposed at an upstream side of the rotary shaft (drive shaft 1$b$) of the retard roller 1.

As a result, when the originals are separated by the first separation roller 2 and the retard roller 1, a contact area between the original and the first separation roller 2 is increased to increase a conveying force acting on the original, thereby improving the original separating ability.

A second separation roller (first sheet supply means) 3 is disposed above the retard roller 1. As shown in FIGS. 3 and 4, the second separation roller 3 and the first separation roller 2 are disposed symmetrically with respect to the retard roller 1 in an up-and-down direction. The second separation roller 3 is attached to an end of an arm 3$a$ rotatably attached to a drive shaft 3$c$, via a bearing (not shown). A rotary shaft 3$_1$ rotated together with the second separation roller 3 is provided at its end with a pulley 3$_2$ which is connected to a pulley 3$d$ secured to the drive shaft 3$c$ via a belt 3$b$ extending between the pulleys, so that the rotary shaft is rotatingly driven by the drive shaft 3$c$. Further, the rotary shaft 3$_1$ of the second separation roller 3 is disposed at an upstream side of the rotary shaft (drive shaft 1$b$) of the retard roller 1. As a result, when the originals (sheets) are separated by the second separation roller 3 and the retard roller 1, a contact area between the original and the second separation roller 3 is increased to increase a conveying force acting on the original, thereby improving the original separating ability. The retard roller 1, first separation roller 2 and second separation roller 3 have the same configuration and are made of the same rubber material of silicone group, thereby achieving the cost-down and obtaining the same coefficient of friction.

A shaft 4a secured to the arm 2a extends in coaxial with the drive shaft 2c and is provided at its end with a bent portion 4b extending in the same direction as the arm 2a. A free end of the bent portion 4b is connected to a fixed point 17 on the apparatus through a biasing spring 4c. Thus, the first separation roller 2 is biased toward the retard roller 1 by the spring 4c.

As is in the shaft 4a, a shaft 5a secured to the arm 3a extends in coaxial with the drive shaft 3c and is provided at its end with a bent portion 5b extending in the same direction as the arm 3a. A free end of the bent portion 5b is connected to a fixed point 17 on the apparatus through a biasing spring 5c. Thus, the second separation roller 3 is biased toward the retard roller 1 by the spring 5c.

As mentioned above, the torque limiter 6 serves to maintain the torque acting on the drive shaft 1b to a constant value or less. Thus, when the single original is conveyed by the retard roller 1 and the first separation roller 2 or by the retard roller 1 and the second separation roller 3, since the torque acting on the retard roller 1 is great, the torque limiter 6 is activated, thereby interrupting the transmission of the power from the first motor 10 to the drive shaft 1b. As a result, the retard roller 1 follows the movement of the first or second separation roller 2 or 3. If the double-feed occurs (i.e. if two or more originals are inserted between the retard roller 1 and the first separation roller 2 or between the retard roller 1 and the second separation roller 3), since the driven torque of the retard roller 1 becomes smaller than the torque of the torque limiter 6, the power or driving force of the motor 10 is transmitted to the retard roller 1, with the result that the retard roller 1 is rotated in the direction for returning the original(s).

An urging arm (stopper) 7 is rotatably supported by a support shaft 7c below a lower surface of a copy original discharge tray (second discharge tray) 30. The urging arm 7 is urged against an original stack on an original guide plate (sheet stacking means) 14 by an urging spring 7a (see FIG. 3).

An auxiliary convey roller (auxiliary convey means; second auxiliary convey means) 8 is disposed below the original guide plate 14. When the original stack on the original guide plate 14 is supplied from a lowermost original S (lowermost sheet supply mode), the auxiliary convey roller 8 is contacted with a lower surface of the lowermost sheet S, thereby conveying the original S toward a downstream direction (FIG. 3). In the lowermost sheet supply mode, since the friction force between the lowermost sheet and original guide plate 14 is increased by the weight of the original stack rested on the original guide plate 14, the lowermost original cannot be supplied frequently by the first separation roller 2 alone. However, since the sheet supplying force of the auxiliary convey roller 8 is added to the sheet supplying force of the first separation roller 2, the lowermost sheet can be supplied positively.

On the other hand, since the uppermost sheet which is not subjected to the weight of the original stack rested on the original guide plate 14 can positively be supplied by the sheet supplying force of the second separation roller 3 alone, when the original stack is supplied from the uppermost original (uppermost sheet supply mode), there is no need of the provision of the auxiliary convey roller 8a (first to FIG. 4). However, an auxiliary convey roller (second auxiliary convey means), shown in FIG. 4, may be disposed above the original guide plate 14 so that the auxiliary convey roller can cooperate with the second separation roller 3 to supply the uppermost original more positively.

Incidentally, since the original guide plate 14 is inclined, a sliding-down force of each original due to its weight can act as an auxiliary conveying force, with the result that the positive sheet supply by means of the first or second separation roller 2 or 3 is further ensured. The inclination angle of the original guide plate 14 is selected so that the originals can smoothly be entered into a nip between the first separation roller 2 and the retard roller 1 or nip between the second separation roller 3 and the retard roller 1 by their own weights.

Figure 5:
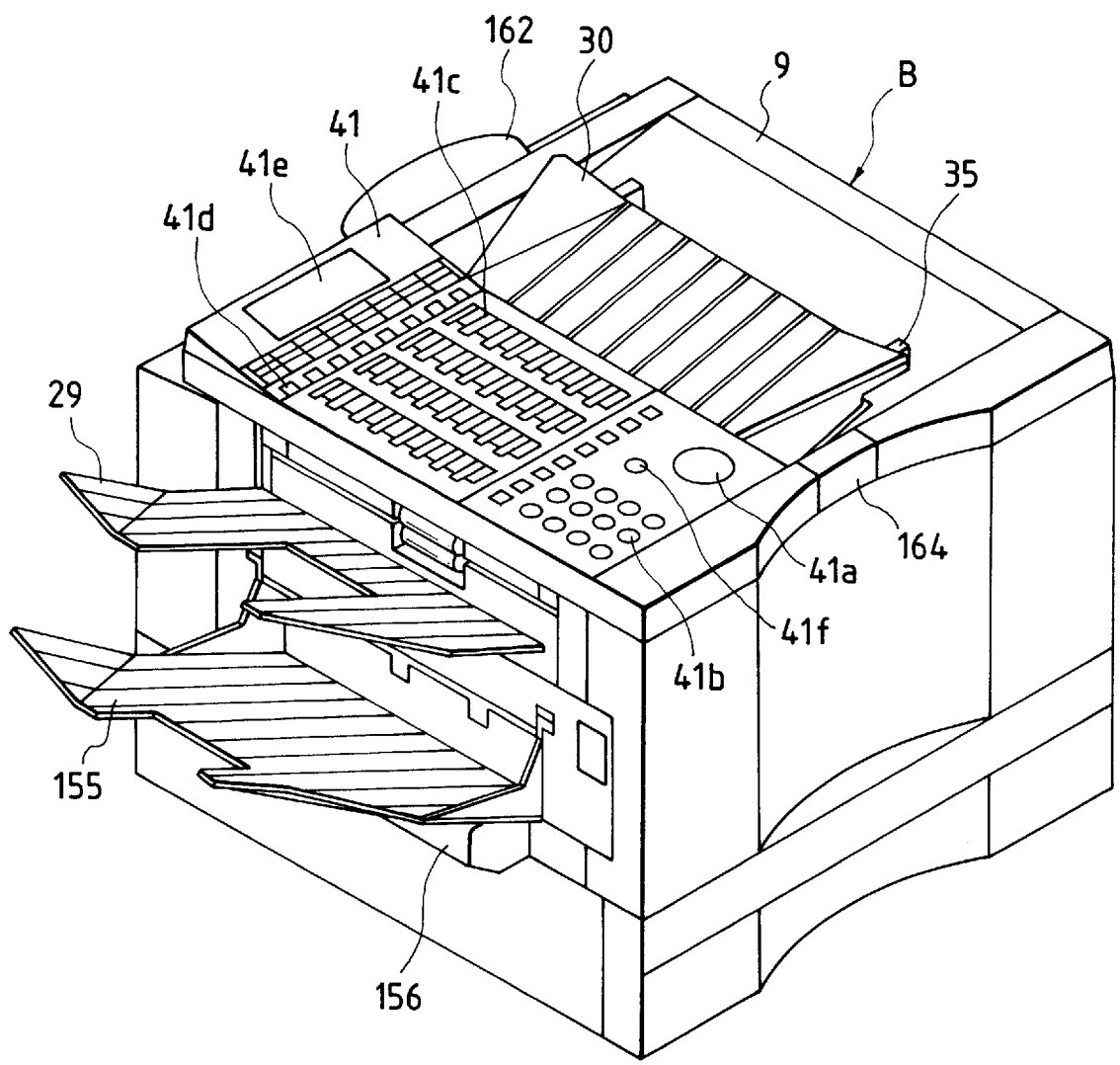
FIG. 5 is a perspective view of the recording apparatus.
Figure 6:
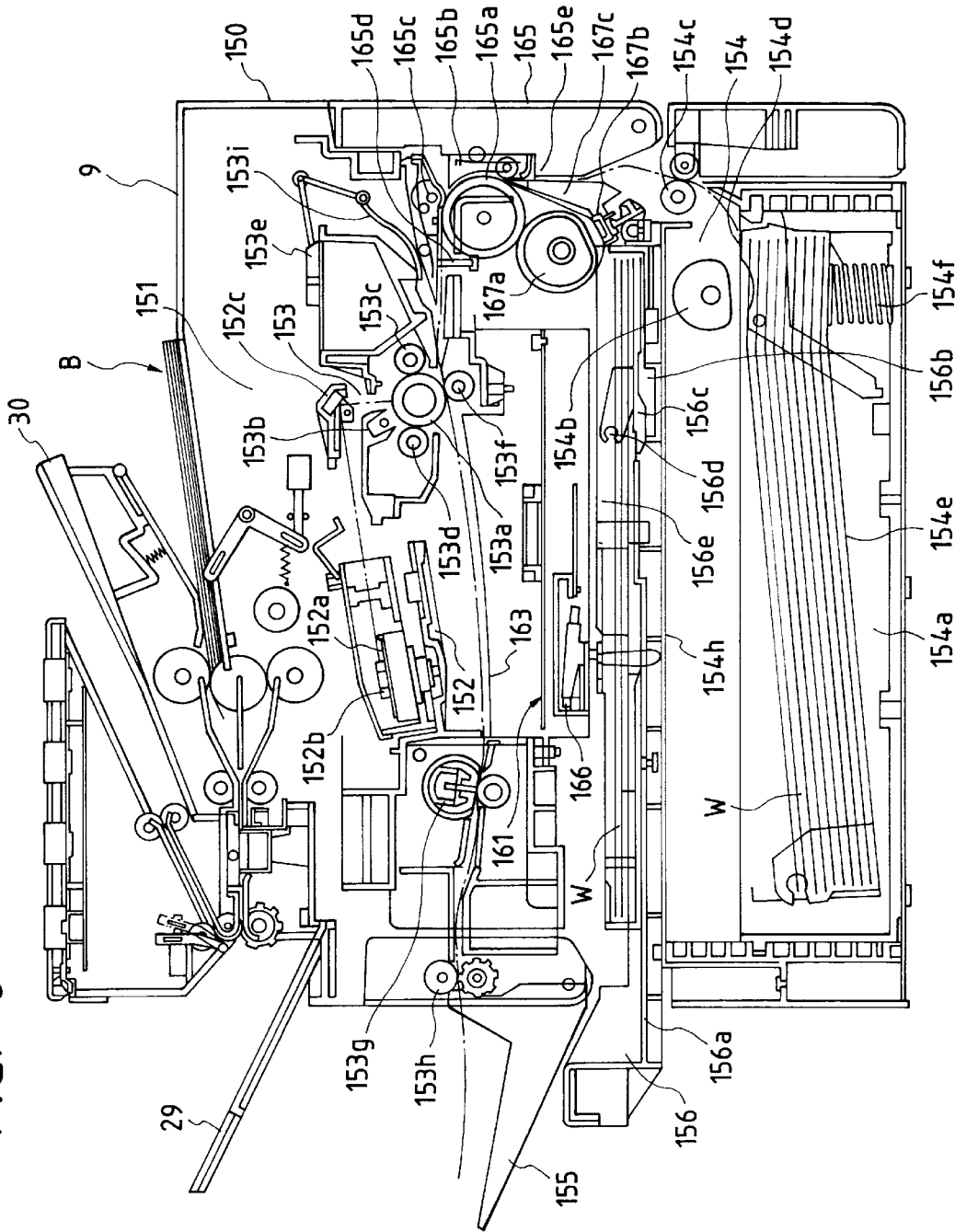
FIG. 6 is an elevational sectional view of the recording apparatus.

The copy original discharge tray (second discharge tray) 30 is disposed on a cartridge cover/original support 9 (refer to FIGS. 5 and 6). The retard roller 1, first separation roller 2 and second separation roller 3 are driven by the first motor (first drive means) 10. When the first motor 10 is rotated in a direction shown by the arrow B, the original separating operation is effected between the retard roller 1 and the first separation roller 2. On the other hand, when the motor is rotated in a direction shown by the arrow B', the original separating operation is effected between the retard roller 1 and the second separation roller 3.

The switching between the connection of first separation roller 2/motor 10 and the connection of second separation roller 3/motor 10 is automatically effected by a pendulum gear train (first switching means) 11a in a gear train 11 in response to the switching of the rotation direction of the first motor 10. That is to say, when the first motor 10 is rotated in the direction shown by the arrow B, the pendulum gear train 11a is rotated around its rotary shaft 11b in an anti-clockwise direction (FIG. 1), with the result that the pendulum gear train 11a is engaged by the gear $2_2$ of the first separation roller 2, thereby transmitting the driving force of the first motor 10 to the first separation roller 2 via the pendulum gear train 11a.

On the other hand, when the motor is rotated in the direction shown by the arrow B', the pendulum gear train 11a is rotated around its rotary shaft 11b in a clockwise direction (FIG. 2), with the result that the pendulum gear train 11a is engaged by the gear $3_2$ of the second separation roller 3, thereby transmitting the driving force of the first motor 10 to the second separation roller 3 via the pendulum gear train 11a.

Incidentally, in the above cases, the separation roller to which the driving force of the first roller is not transmitted can freely be rotated, with the result that said separation roller follows the rotation of the retard roller 1. Further, in the above cases, the gear $2_2$ is meshed with the gear $2_1$ secured to the drive shaft 2c. The gear $3_2$ is meshed with the gear $3_1$ secured to the drive shaft 3c.

A second motor (third drive means) 12 serves to drive a sheet supply roller 19 disposed at a downstream side of the separation portion and a discharge roller 23 through a gear train 13. Further, the second motor 12 is connected to the auxiliary roller 8 via a gear train (not shown) so that, when the first separation roller 2 is operated, the auxiliary roller (second auxiliary convey means) 8 is also operated by the second motor. As mentioned above, when the first auxiliary convey means is disposed above the original guide plate 14, in order to selectively operate the first auxiliary convey means 8a and the second auxiliary convey means 8, these auxiliary convey means may be selectively connected to the second motor 12 through a second switching means (not shown).

As shown in FIG. 3, the original guide plate 14 is provided at its right end with a fulcrum 14a and has a fulcrum 14b at a side surface near the retard roller 1. The original guide plate 14 is rotatably supported by a body (not shown) of the apparatus via the fulcrum 14a. Further, the fulcrum 14b of the original guide plate 14 is slidably received in an elongated slot (slide slot) 15l formed in an end portion of an L-shaped arm 15 so that the fulcrum 14b can be rocked around the fulcrum 14a as the L-shaped lever 15 is moved. Incidentally, in the illustrated embodiment, although an example that the original guide plate 14 can be rocked was explained, the original guide plate 14 may be slid in an up-and-down direction while keeping a posture as shown in FIG. 3.

Incidentally, as is in the illustrated embodiment, when the original guide plate 14 can be rocked, the construction can be simplified and the number of parts can be reduced in comparison with the case where the original guide plate can be slid in the up-and-down direction.

The L-shaped arm 15 is rotatably mounted on the body (not shown) of the apparatus via a fulcrum 15a provided on a central portion of the arm. The L-shaped arm 15 is provided at its other end portion with an elongated slot (slide slot) $15_2$ into which a shaft 16b of a plunger 16a of a solenoid (second drive means) 16 is slidably received.

The originals S are stacked on the original guide plate 14 with imaged surfaces facing downside (in a page sequence from the bottom). When the solenoid 16 is retracted, the L-shaped arm 15 is rotated to lower the original guide plate 14 (for example, the original guide plate is shifted from the condition shown in FIG. 4 to the condition shown in FIG. 3). On the other hand, when the solenoid 16 releases the plunger, the L-shaped arm 15 is returned by a return spring (elastic member) 15b, thereby lifting the original guide plate 14 (for example, the original guide plate is shifted from the condition shown in FIG. 3 to the condition shown in FIG. 4).

When the original guide plate 14 is lowered, the level (height) of the original guide plate 14 is maintained in a level of the first separation roller 2 as shown in FIG. 3 (when the plunger is completely retracted). On the other hand, when the original guide plate 14 is lifted, the urging arm 7 abuts against the projection 7b to determine the upper limit level of the original stack, and, as the number of the originals is decreased, the L-shaped arm 15 is gradually retracted by the return spring 15b to lift the original guide plate 14 gradually, thereby maintaining the level of the original stack on the original guide plate 14 to the optimum position regarding the second separation roller 3 (FIG. 4).

A back-up roller 20 is urged against a sheet supply roller 19 by a spring (not shown) so that the rollers 19, 20 cooperate with each other to convey the separated original to a downstream image sensor 21 of close contact type (original reading means). An urging member 21a is biased downwardly (FIG. 3) by a metallic shaft 21b to urge the original against the image sensor 21 of close contact type so that the original can be read correctly by the image sensor 21 of close contact type.

Incidentally, regardless of the uppermost sheet supply mode and the lowermost sheet supply mode, the original is conveyed with the imaged surface facing downside, so that the original can be read by the single image sensor 21 of close contact type.

A switching means (convey path switching means) 22 for switching discharging directions for the discharged original includes a flapper 22a pivotally mounted on a support shaft 22b attached to the body of the apparatus. A slit 22c is formed in the flapper 22a at an end portion thereof opposite to a pawl $22_3$. In the switching means 22, the slit 22c receives a shaft $22_2$ extending from a plunger $22_1$ of a solenoid 22d so that, when the solenoid 22d is energized, the flapper 22a is lifted to change the original conveying direction (refer to FIG. 3). In the lowermost sheet supply mode, the originals are discharged onto a FAX original discharge tray (first discharge tray) 29 as it is; whereas, in the uppermost sheet supply mode, the originals are reversely rotated (turned up) and then are discharged onto the copy original discharge tray (second discharge tray) 30.

Incidentally, in the FAX transmission, the FAX original discharge tray 29 serves to stack the originals supplied in the lowermost sheet supply mode. On the other hand, in the copying operation, the copy original discharge tray 30 serves to stack the originals supplied in the uppermost sheet supply mode.

A first discharge back-up roller 24 is biased toward a first original discharge roller 23 by a biasing spring (not shown). A first convey means is constituted by the first original discharge roller 23 and the first discharge back-up roller 24. The first convey means serves to discharge the original passed through the original reading means 21 onto the FAX original discharge tray 29. An auxiliary roller 25 is urged against the first discharge back-up roller 24 to change the original discharging direction. An original path (reverse rotation sheet convey path) 26 serves to reversely rotate (turn up) the read original and then discharge the original. A second discharge back-up roller 28 is urged against a second original discharge roller 27 by a biasing spring (not shown). The first discharge back-up roller 24, auxiliary roller 25, second original discharge roller 27 and second discharge back-up roller 28 constitute a second convey means for discharging the original onto the copy original discharge tray 30.

Incidentally, a CPU 500 as a control means serves to send control signals to the first motor 10, second motor 12, solenoid 16, solenoid 22d and the like.

Next, an operation will be explained with reference to FIGS. 3 to 6. FIG. 3 shows an operation in the facsimile transmission, and FIG. 4 shows the copying operation. FIG. 5 is a perspective view of the recording apparatus Y to which the present invention is applied, and FIG. 6 is an elevational sectional view of the recording apparatus Y.

(1) Facsimile Transmission

In FIG. 3, first of all, the originals are arranged and the originals S are inserted onto the original support 9 and the original guide plate 14 with the imaged surfaces facing downside (face-down), and the originals are aligned by sliding original slides 35 (FIG. 5) in a width-wise direction of the original.

Figure 9:
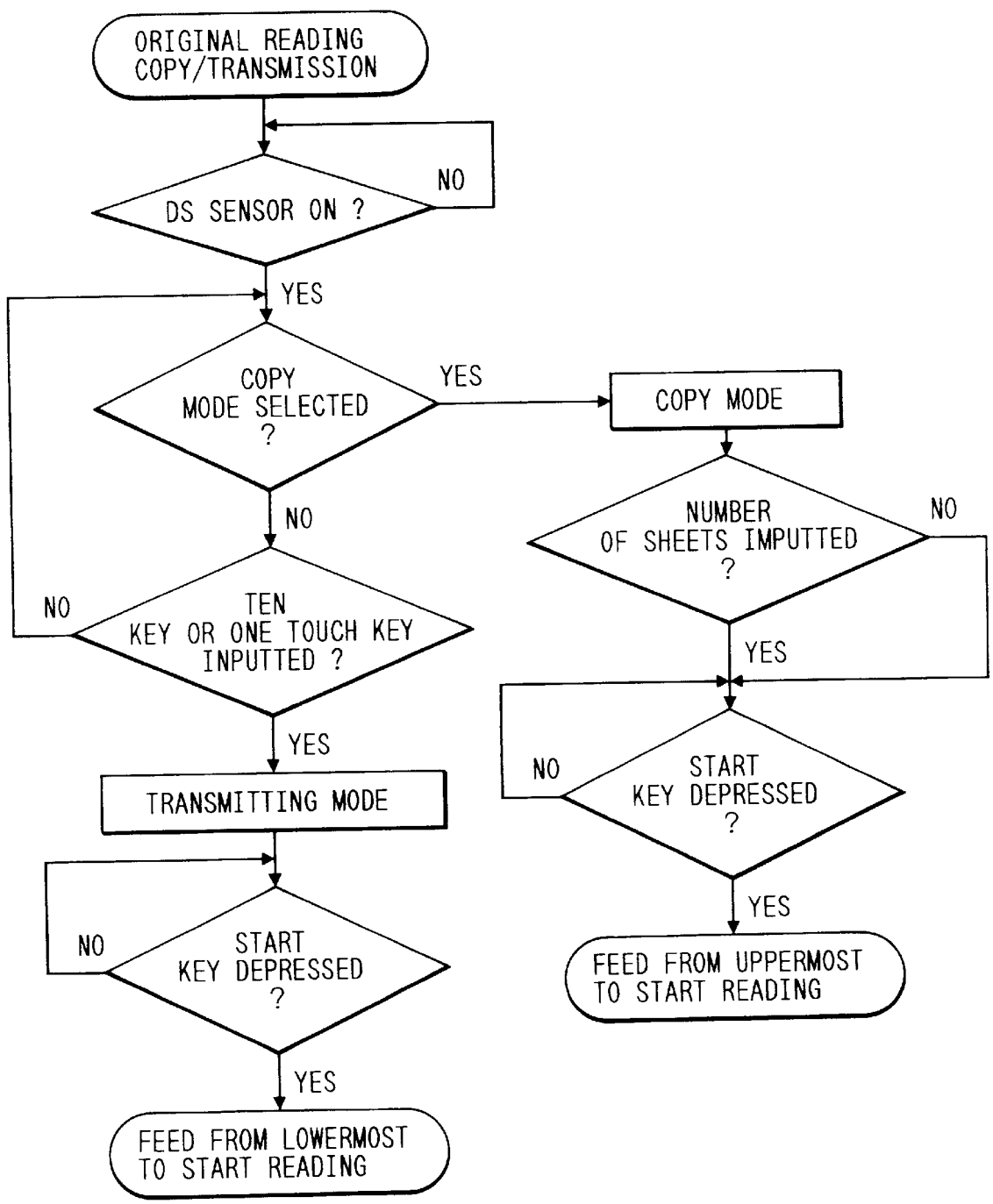
FIG. 9 is a simple flow chart showing an operation of the recording apparatus having the sheet supplying apparatus according to the first embodiment.

As shown in a flow chart of FIG. 9, immediately after the originals are inserted, the presence of the original is detected by an original sensor (DS sensor) 33, with the result that an original treatment waiting signal is sent to the control portion of the apparatus. In this case, the apparatus is waiting in an original transmission (FAX transmission) waiting condition or a copy waiting condition. This condition is displayed on an LCD (liquid crystal display) panel 41e provided in an operation portion 41. This condition is also a key input waiting condition. The reference numeral 41b denotes a ten-key for inputting the FAX telephone number of the receiver; 41c denotes one-touch keys from which previously registered telephone numbers can be picked up; 41f denotes a copy key for commanding the copying operation; and 41e denotes a start key for executing the selected treatment. The reference numeral 41d denotes function keys for setting the resolving power of the image reading. Thus, by depressing one of these keys, one of the resolving powers of 3.85 line/mm (standard mode), 7.7 line/mm (fine mode) and 15.4 line/mm (super fine mode) can be selected.

Depending upon the resolving powers, an image reading speeds are different from each other. The image reading speed is steppingly decreased from the standard mode to the super fine mode. Further, there are provided a 64 gradation half tone mode in which any intermediate tone can be read by obtaining a binary pattern from the error dispersion system, and an AA (automatic adjustment) mode in which the outline of each character is emphasized to facilitate the reading of the character when the intermediate tone and the characters are mixed.

The operation portion 41 includes selection keys for selecting one of various transmission fashions, and, by using the function keys 41d, the resolving power for reading the original, a direct transmission mode in which the transmission is effected while the apparatus is being connected to the receiver's machine, a memory transmission mode in which, after the original image information is stored in a memory, the original image information is transmitted and the like can be selected. When the FAX telephone number of the receiver is inputted by using the ten-key or when one of the one-touch keys 41c for identifying the particular FAX telephone number is depressed, the particular receiver can be determined.

In the apparatus of the original reading waiting condition, after the original reading mode or the original transmitting mode is selected by the function keys 41d, when the particular receiver's machine is determined by the ten-key or the one-touch key, the start key 41a is depressed. As a result, the L-shaped arm 15 is pulled by the solenoid 16 to lower the original stack, so that the tip end(s) of the original(s) is directed to the nip between the retard roller 1 and the first separation roller 2. In this case, in the position where the plunger 16a of the solenoid 16 is completely retracted, the level of the original guide plate 14 is fixed at the level of the first separation roller 2, with the result that the positional relation optimum to separate and supply the lowermost original in the original stack is established.

Then, the first and second motors 10, 12 start to be operated. Further, since the flapper 22a is provided at the original discharge opening, in the FAX transmission, after the start key 41a is depressed, the solenoid 22d shifts the flapper 22a so that the original is discharged onto the first discharge tray 29.

In the FAX transmission, the first motor 10 is rotated in the direction shown by the arrow B in FIG. 1 to rotate the retard roller 1 in the direction shown by the arrow C in FIG. 3, thereby rotating the first separation roller 2 in the direction shown by the arrow D. In this case, the second separation roller 3 can be freely rotated, with the result that the second separation roller follows the movement of the retard roller 1.

After the start key 41a is depressed and the motors are rotated, when the originals S are advanced by the inclination of the original guide plate 14 and the conveying force of the auxiliary roller 8 and are pinched between the retard roller 1 and the first separation roller 2, only the lowermost original is supplied by the advancing force of the first separation roller 2 and the returning force of the retard roller 1, and the other originals are stopped by the nip between the rollers 1, 2.

The retard roller 1, first separation roller 2 and second separation roller 3 are made of rubber material (having the same hardness) of silicone group. This is the reason why these rollers have the same coefficient of friction as each other. When the copying operation (described later) is performed, the rollers are rotated in opposite directions so that the uppermost original or the lowermost original is separated from the original stack S one by one. In order to ensure the same ability, it is desirable that the friction forces of "both" (for example, rollers 1 and 2, or, rollers 1 and 3) are the same as each other. By equalizing the material and hardness of the both, i.e. by equalizing the coefficient of friction, the above effect was achieved. Further, since the identical rollers (1, 2, 3) are used, the manufacturing cost of the sheet supplying apparatus A having such a construction is less expensive than that of a sheet supplying apparatus in which different rollers are used.

After the separated original S' was entered into a nip between the sheet supply roller 19 and the back-up roller 20, when the original is further conveyed in a downstream side (left in FIG. 3), the tip end of the original is detected by an original edge sensor 34 disposed between the sheet supply roller 19 and the reading sensor 21, and the tip end of the original is fed back up to the reading position. Then, the image on the original is read by the image sensor 21, and, a signal from the sensor is binary-coded by a circuit (not shown) in the apparatus and is then stored in a memory. The original S' is advanced along the flapper 22a by the above-mentioned first convey means 23, 24 and is discharged onto the FAX original discharge tray 29 with the imaged surface facing downside. The second and other originals are successively discharged onto the previously discharged original.

When the first original leaves the separation portion constituted by the retard roller 1 and the first separation roller 2, the second original is separated from the original stack on the original guide plate 14 and is conveyed to the downstream side in the original conveying direction. In synchronous with the image reading operation, the transfer of the data stored in the memory is effected. In accordance with the key input by means of the one touch key or the push buttons, the data is transferred to the dialled receiver's facsimile.

On the other hand, in the case of the direct transmission, immediately after the start button 41a is depressed, the circuit connecting operation is started, and, when the connection is completed and the pre-treatment is finished, the conveying and reading of the original are started. In this case, unlike to the memory transmission, the image data for several lines (not shown) is accumulated in the buffer, and the image data for several lines are successively transferred in dependence upon the receiver's modem speed and/or transmission circuit condition, while sometimes effecting the fall-back.

(2) Copying Operation (FIG. 4)

In the copy mode, as is in the facsimile transmission, the originals are set on the original guide plate 14 with the imaged surfaces facing downside. The presence of the original is detected by the original detection sensor 33, and the copy waiting condition is displayed on the liquid crystal display panel 41e. By depressing the copy key 41f on the operation portion 41, the copying operation is started.

As shown in FIG. 9, after the copy key 41f is depressed, the fact that the number of sheets (copy number) should be inputted is displayed on the liquid crystal display panel 41e, and, the operator inputs the copy number by using the ten-key 41b. After the start key 41a is depressed, the solenoid 16 releases the plunger 16a, with the result that the L-shaped arm 15 is retracted by the return spring 15b, thereby lifting the original guide plate 14. When the original guide plate 14 is lifted, the urging arm 7 abut against the projection 7b to determine the upper level of the original stack. As the number of originals on the original guide plate 14 is decreased, the L-shaped arm 15 is gradually retracted by the return spring 15b, thereby gradually lifting the original guide plate 14. The tip ends of the originals are directed to the nip between the retard roller 1 and the second separation roller 3, and the uppermost level of the original stack S is fixed to the level of the second separation roller 3, thereby ensuring the optimum positional relation for the uppermost sheet supply mode. In the lowermost sheet supply mode regarding the facsimile transmission, the auxiliary convey roller 8 is operated. However, during the copying operation, in the uppermost sheet supply mode, due to the small conveying load, since the tip ends of the originals can easily be introduced into the separation portion (nip between the retard roller 1 and the second separation roller 3) only by the gravity-falling of the originals due to the inclination of the original guide plate 14 and the conveying force of the second separation roller 3, the auxiliary convey roller 8 is not operated.

The second motor 12 is rotated in the same direction (direction A in FIG. 1) as that in the FAX transmission. The first motor 10 is rotated in a direction (direction B') opposite to that in the FAX transmission. Further, the solenoid 22d is not activated to maintain the flapper 22a in a lowered condition (that is to say, the flapper 22a is positioned so that the original is U-turned toward above the image sensor 21 (original path side) and then is discharged).

After the start key 41a is depressed and the motors are rotated, when the plural originals S are pinched between the retard roller 1 and the second separation roller 3, since the returning force of the retard roller 1 acts on the originals, only the uppermost original is pulled by the second separation roller 3 and the remaining originals are stopped between the rollers 1, 3.

As is in the FAX transmission, the image information on the original is read by the image sensor 21. Thereafter, the original is pinched between the discharge roller 23 and the discharge back-up roller 24. After the conveying direction of the original is changed by the flapper 22a, the original is pinched between the discharge back-up roller 24 and the discharge auxiliary roller 25 and then is passed through the original path 26 constituted by the convey guides 26a, 26b. Then, the original is discharged onto the copy original discharge tray 30 by the second original discharge roller 27 and the second discharge back-up roller 28. In this case, since the originals are discharged in the face-up fashion (with the imaged surfaces facing upside) and are successively stacked from the last page toward the first page, the page sequence of the originals becomes the same as the page sequence of the originals previously stacked on the original guide plate 14.

In FIGS. 5 and 6, the reference numeral 150 denotes a body of the apparatus; 151 denotes a recording portion comprised of a laser beam printer; 152 denotes a laser scanner; 153 denotes an image forming portion; 154 denotes a cassette sheet supply portion; 155 denotes a recording sheet discharge tray; 156 denotes an MP (recording sheet size variable) cassette; 161 denotes a control portion (including the CPU 500 in FIG. 1) of the recording apparatus; 162 denotes a hand set; 163 denotes a convey guide for the recorded recording sheet; 164 denotes a lamp for indicating the fact that the recording apparatus is being operated; 165 denotes a light cover which is opened when the sheet jam treatment is performed; 166 denotes an MP cassette sensor; and 167 denotes an MP separation portion.

In the recording portion 151, on the basis of an image signal outputted from the control portion 161, a modulation signal (beam) is emitted from a laser beam generator 152a of the laser scanner 152. The modulation signal is illuminated on a photosensitive drum 153a of the image forming portion 153 through a polygon mirror 152b and a reflection mirror 152c to light-scan the drum, thereby forming image information on a surface of the photosensitive drum 153a.

The image information is transferred onto a recording sheet W supplied from the cassette sheet supply portion 154 or the MP cassette portion 156 to the image forming portion 153. The image transferred to the recording sheet W is permanently fixed to the recording sheet at a fixing portion 153g. Thereafter, the recording sheet is discharged onto the recording sheet discharge tray 155.

The photosensitive drum 153a is incorporated into a record cartridge 153e together with a first charger 153b, a developing roller 153c and a cleaning roller 153d, which record cartridge can removably be mounted to the recording apparatus. When the surface of the photosensitive drum 153a is uniformly charged by the first charger 153b and is illuminated by the scan light through the polygon mirror 152b and the reflection mirror 152c, a latent image is formed on the surface of the photosensitive drum. The latent image is visualized with toner supplied from the developing roller 153c as a toner image.

A transfer charger 153f of roller type is disposed around the photosensitive drum 153a of the image forming portion 153. Further, the thermal fixing device (fixing portion) 153g and a discharge roller 153h are disposed at a downstream side of the photosensitive drum 153a and in a recording sheet convey path.

As shown by the dot and chain line, after the toner image formed on the photosensitive drum 153a are transferred onto the recording sheet W by the transfer charger 153f of roller type, the recording sheet is guided along the convey guide 163 to reach the thermal fixing device 153g, where the toner image is fixed to the recording sheet. Thereafter, the recording sheet is discharged onto the recording sheet discharge tray 155 by the discharge roller 153h.

The MP cassette portion 156 is disposed immediately below a center (in a vertical direction) of the apparatus body 150. Regarding the recording sheets W stacked in an MP cassette 156a, an MP intermediate plate 156c is urged by an urging member 156b to be rotated around a fulcrum 156d so that the recording sheet stack is urged against an MP retard roller 167a by the intermediate plate 156c. The recording sheets are separated one by one by an MP separation pad 167b (friction piece separation type), and the separated recording sheet is conveyed along an MP separation base 167c. Thereafter, the recording sheet W is reversely rotated by a convey roller 165a, a cover side U-turn guide 165b provided on the light cover 165 and a body side U-turn guide 165c provided on the apparatus body 150. Further, while the recording sheet is being supplied, a tip end of the recording sheet W is detected by a regist sensor 165d so that the sheet supplying timing and the image output timing are adjusted to align the tip end of the recording sheet W with an image tip end of the toner image formed on the photosensitive drum 153a. Then, the recording sheet is sent between the transfer charger 153f of roller type and the photosensitive drum 153a. The image is recorded on a lower surface of the recording sheet w stacked in the MP cassette 156a.

Further, since lateral edges and rear edges of the recording sheets W are regulated by an MP regulating plate 156e in dependence upon the sheet size, the skew-feed of the recording sheet and the non-supply of the sheet can be prevented. The size of the recording sheet W and the presence/absence of the recording sheet can be detected by the MP cassette sensor 166. The MP cassette 156a can stack 100 (hundred) recording sheets at the maximum and can be drawn from the left side of the apparatus (side loading type). Further, the size of the recording sheet used with the MP cassette 156a is A4 size, letter (LTR) size or legal (LGL) size.

The cassette sheet supply portion 154 is disposed so that a top plate 154h of the cassette sheet supply portion 154 is contacted with a lower surface of the apparatus body 150, with the result that the top plate 154 acts as a bottom plate of the apparatus body 150. The recording sheets W stacked in a sheet supply cassette 154a are biased upwardly (toward a sheet supply roller 154b) by an intermediate plate spring 154f through an intermediate plate 154e, and are separated one by one by the semi-circular sheet supply roller 154b and a pair of separation pawls 154d (pawl separation type). The separated recording sheet W is conveyed by a pair of cassette convey rollers 154c. After the recording sheet is passed between an MP separation base 167c and a sheet pass guide 165e, the recording sheet is reversely rotated by the convey roller 165a, the cover side U-turn guide 165b provided on the light cover 165 and the body side U-turn guide 165c provided on the apparatus body 150.

A further conveyance of the recording sheet is the same as the conveyance of the recording sheet supplied from the MP cassette portion 156. The recording sheet convey path is so designed that the convey path from the MP cassette portion 156 is joined to the convey path from the cassette sheet supply portion 154 immediately ahead of the convey roller 165a. Since the recording sheet is reversely rotated (turned up) in this way, the image is recorded on a lower surface of the recording sheet W stacked the sheet supply cassette 154a. The cassette 154a can stack 500 recording sheets at the maximum and can be drawn from the front side of the apparatus (front loading type). Further, the size of the recording sheet used with the cassette 154a is A4 size or letter (LTR) size.

The cartridge cover/original support 9 acting as both the original support and the cover is provided on the apparatus body 150 for opening/closing movement to permit the mounting and dismounting of a record cartridge 153e. By opening the cartridge cover/original support 9 from the apparatus body 150, the record cartridge 153e can be dismounted from the apparatus body 150 and a new record cartridge can be mounted to the apparatus body. Further, the cartridge cover/original support 9 is provided with an interlock mechanism so that, when the cartridge cover/original support 9 is opened or when the record cartridge 153e is not mounted to the apparatus body 150, the recording portion 166 cannot be operated.

Further, a drum sensitization preventing shutter 153i provided on the record cartridge 153e is driven by the mounting of the record cartridge 153e to the apparatus body 150. Accordingly, after the cartridge cover/original support 9 is opened, when the record cartridge 153e is mounted to the apparatus body 150, the shutter 153i is opened; whereas, when the record cartridge 153e is dismounted from the apparatus body 150, the shutter 153i is closed, thereby preventing the photosensitive drum 153e from being sensitized accidently.

In the copying operation, the recording portion 151 is operated in synchronous with the image sensor 21. When it is desired to shorten the reading time and to obtain a plurality of copies, a memory copy in which, after the image information is stored in the memory once, the recording is executed is performed. Further, in the recording portion 151, when the image data on the originals too great to store it in the memory at once, as is in the direct transmission, the data for several lines are successively stored in the buffer to meet with the image formation speed, thereby providing a direct copy function for preventing a large amount of memory from being consumed.

As mentioned above, in the copying operation, the originals are successively read from the last page (uppermost original in the original stack) and are discharged onto the copy original discharge tray 30 with the imaged surfaces facing upside after being U-turned. When the last page original is discharged, the originals are stacked on the discharge tray in the same page sequence as that of the originals which was set on the original guide plate. Thus, the operator can remove the previously arranged originals from the discharge tray.

Figure 7:
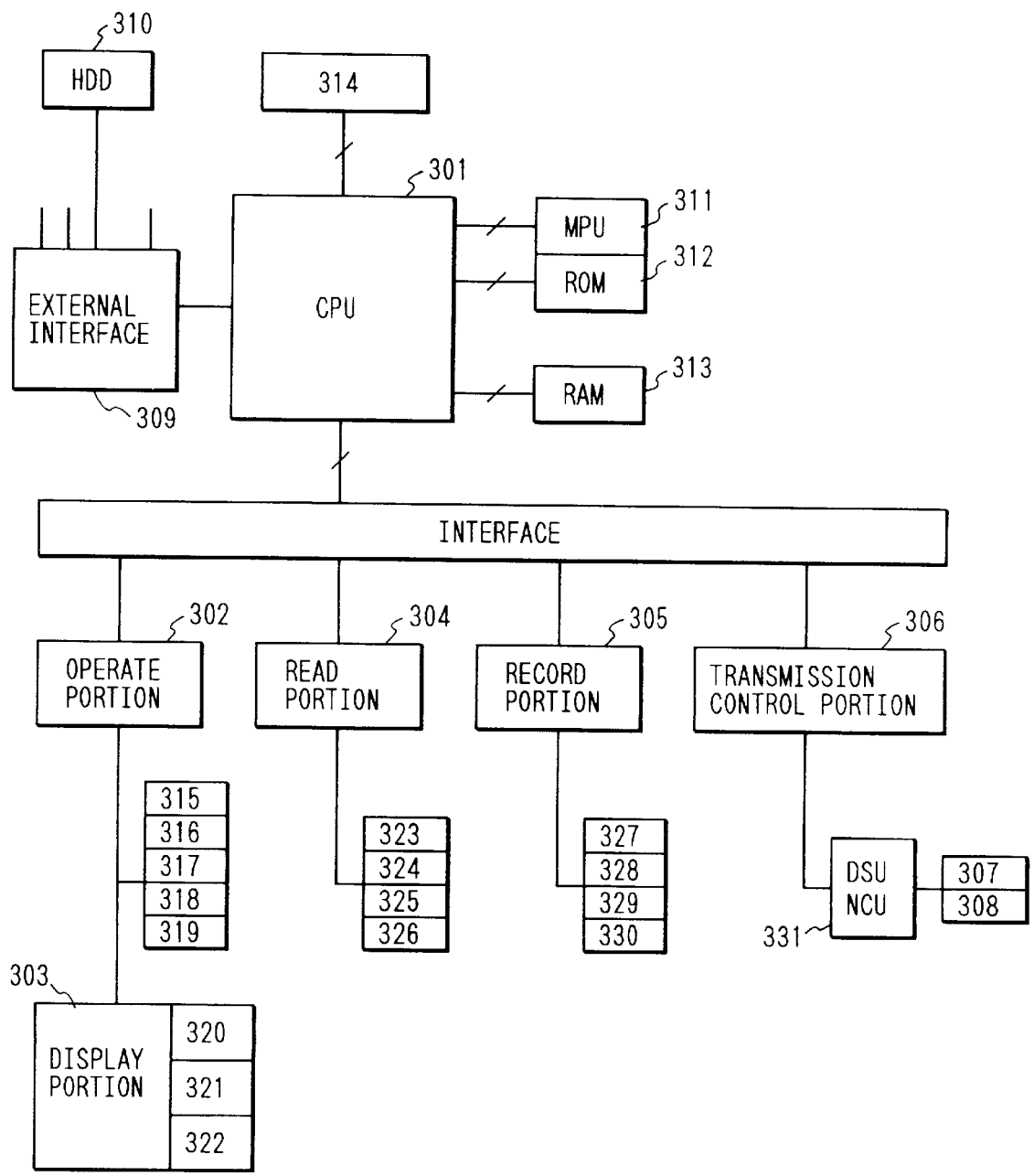
FIG. 7 is a block diagram of the recording apparatus.

FIG. 7 is a block diagram of a control system 300 of the recording apparatus Y using the sheet supplying apparatus X according to the present invention. A CPU 301 for controlling the entire recording apparatus is constituted by an MPU 311, a ROM 312 for storing control program for the MPU 311, a RAM 313 used as a work area for treating various data and adapted to temporarily store the image information, and an image treating portion 314 for changing the magnification of image, the resolving power and the like. Further, the CPU 301 is provided with a calendar function, a clock function and the like which are already known. In the RAM 313, areas for storing important system setting information such as one-touch receiver information, software switch information and the like are protected by the battery back-up so that the data stored in these areas are not erased when an accident such as service interruption. The control system of the recording apparatus is constituted by connecting the CPU 301 with the following elements 302–310 through interfaces.

An operation portion 302 (corresponding to the operation portion 41 in FIG. 5) comprises a ten-key 315 (corresponding to the ten-key 41b in FIG. 5), function keys 316 (corresponding to the function keys 41d in FIG. 5), one-touch keys 317 (corresponding to the one-touch keys 41c in FIG. 5), a start key (corresponding to the start key 41a in FIG. 5), and a stop key 319. A display portion 303 comprises an LCD 320 for displaying various messages (corresponding to the liquid crystal display panel 41e in FIG. 5), various LED's 321 for displaying the transmission mode and the like, and a lamp 322 for displaying the transmission condition and occurrence of an abnormality (corresponding to the lamp 164 in FIG. 5).

A rear portion 304 (corresponding to the image sensor 21 in FIG. 3) comprises a drive portion 323 for driving a reading motor and the like, an image treatment portion 325 for effecting the shading of the read image and the binary coding, and various sensors 326 for detecting the original. A record portion 305 (corresponding to the recording portion 151 in FIG. 6) comprises a drive portion 327 such as a record motor, a record unit 328 for controlling the laser scanner, electrophotographic process and the like, an image treatment portion 329 for effecting the smoothing of the image to be recorded, and various sensors 330 for detecting the original.

A transmission control portion 306 for effecting the calling, the receiving and the binary-coding of the image data has a connection portion 331 comprised of a DSU, an NCU and the like. The connection portion 331 is connected to a transmission network 307 and a hand set 308. A CPU external interface 309 is an interface for executing the direct transmitting/receiving of data regarding the CPU 301 and is connected to an external computer through RS232C, SCS1, LAN or the like so that the apparatus can be used as a scanner printer for the external computer. An HDD 310 is used for holding the image information as a large capacity nonvolatile memory.

[Second Embodiment]

Figure 8A:
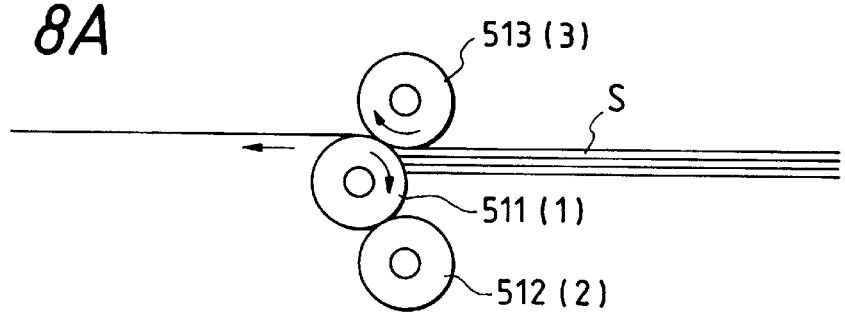
FIG. 8A is an explanatory view for FIG. 1.

FIG. 8A shows a second embodiment of the present invention (main part of a sheet supplying apparatus).

Figure 8B:
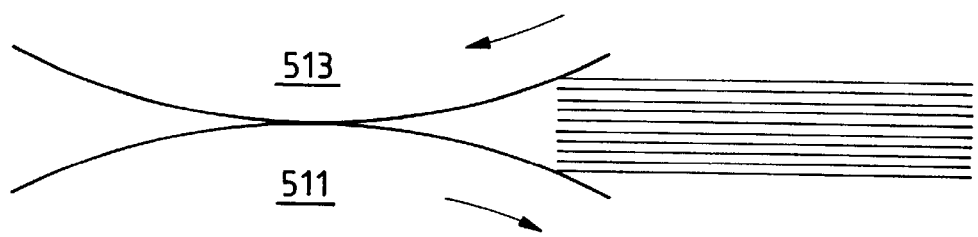
FIG. 8B is an explanatory view for FIG. 2.

The sheet supplying apparatus includes a first roller 511 (corresponding to the retard roller 1 in FIG. 3), a second roller 512 (corresponding to the first separation roller 2 in FIG. 3), and a third roller 513 (corresponding to the second separation roller 3 in FIG. 3). Although the cost-down can be realized by using these two or three rollers having the same configuration, as shown in FIG. 8B, if the rollers having the same diameter are aligned with each other (in a vertical direction), the tip ends of the originals will be pinched by a wedge formed between the rollers, with the result that an adequate nip cannot be obtained between the retard roller 511 and the separation roller 512 or 513, thereby causing the poor conveyance of original.

Figure 8C:
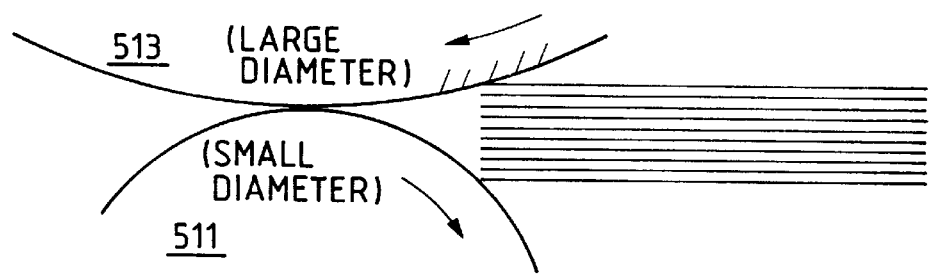
FIG. 8C is an explanatory view for FIG. 3.
Figure 8D:
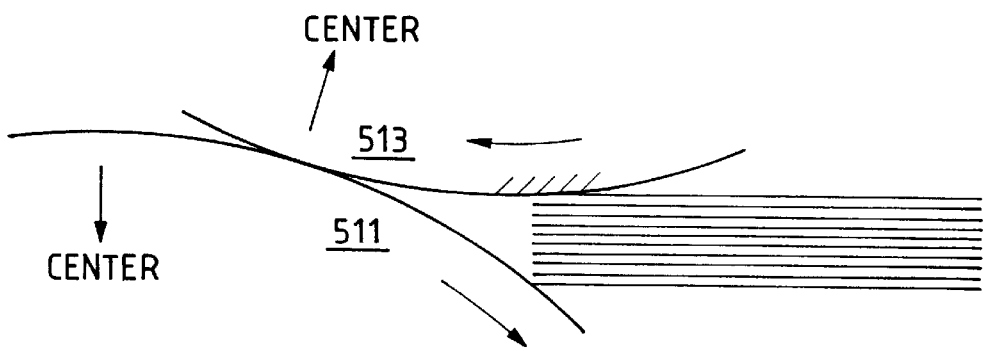
FIG. 8D is an explanatory view for FIG. 4.

There are methods for providing the adequate nip for the separation roller 512 or 513 by optimizing the penetrating angle of the original into the separation portion (nip between the retard roller 511 and the separation roller 512 or 513), as shown in FIGS. 8C and 8D. In the method shown in FIG. 8C, by decreasing the diameter of the retard roller 511, a contact area between the separation roller 513 (512) and the fed original is increased. In this case, the diameter of the second roller 512 may have the same diameter as that of the third roller 513. On the other hand, in the method shown in FIG. 8D, a rotational center of the separation roller is offset toward an upstream side (right in FIG. 8D) to increase a contact area between the separation roller 513 and the fed original. In this case, the first, second and third rollers 511, 512, 513 may have the same configuration.

Accordingly, since two rollers (in the former method shown in FIG. 8C) or three rollers (in the latter method shown in FIG. 8D) can have the same configuration can be made of the same material, the manufacturing cost of the sheet supplying apparatus can be reduced.

(Alteration 1)

As shown in FIG. 3, in the first embodiment, while an example that the single auxiliary convey roller 8 is used was explained, the present invention is not limited to such an example. That is to say, when a large number of originals are supplied or when thick originals (which are hard to be supplied) are supplied, an additional auxiliary roller may be disposed above the original guide plate so that, in the uppermost sheet supply mode, the additional auxiliary roller is operated to further stabilize the supplying the original (thereby improving the reliability of the sheet supply). In this case, as is in the first embodiment, the original guide plate may be inclined or the original guide plate may be shifted in the vertical direction while maintaining the plate in a horizontal condition.

(Alteration 2)

As shown in FIG. 1, in the first embodiment, while an example that the single torque limiter 6 is used was explained, an additional torque limiter may be provided so that the torque limiter 6 or the additional torque limiter is operated in dependence upon the uppermost sheet supply mode or the lowermost sheet supply mode, or, the torque value of the torque limiter 6 may be changed by switching the drive system and by changing the reduction ratio. Normally, in the lowermost sheet supply mode, due to the weights of the originals, the friction force between the originals is increased, and, thus, a great original returning force is required. However, in this alteration, by changing the value of the torque limiter, the reliable separation and conveyance can be realized.

[Third Embodiment]

Figure 10:
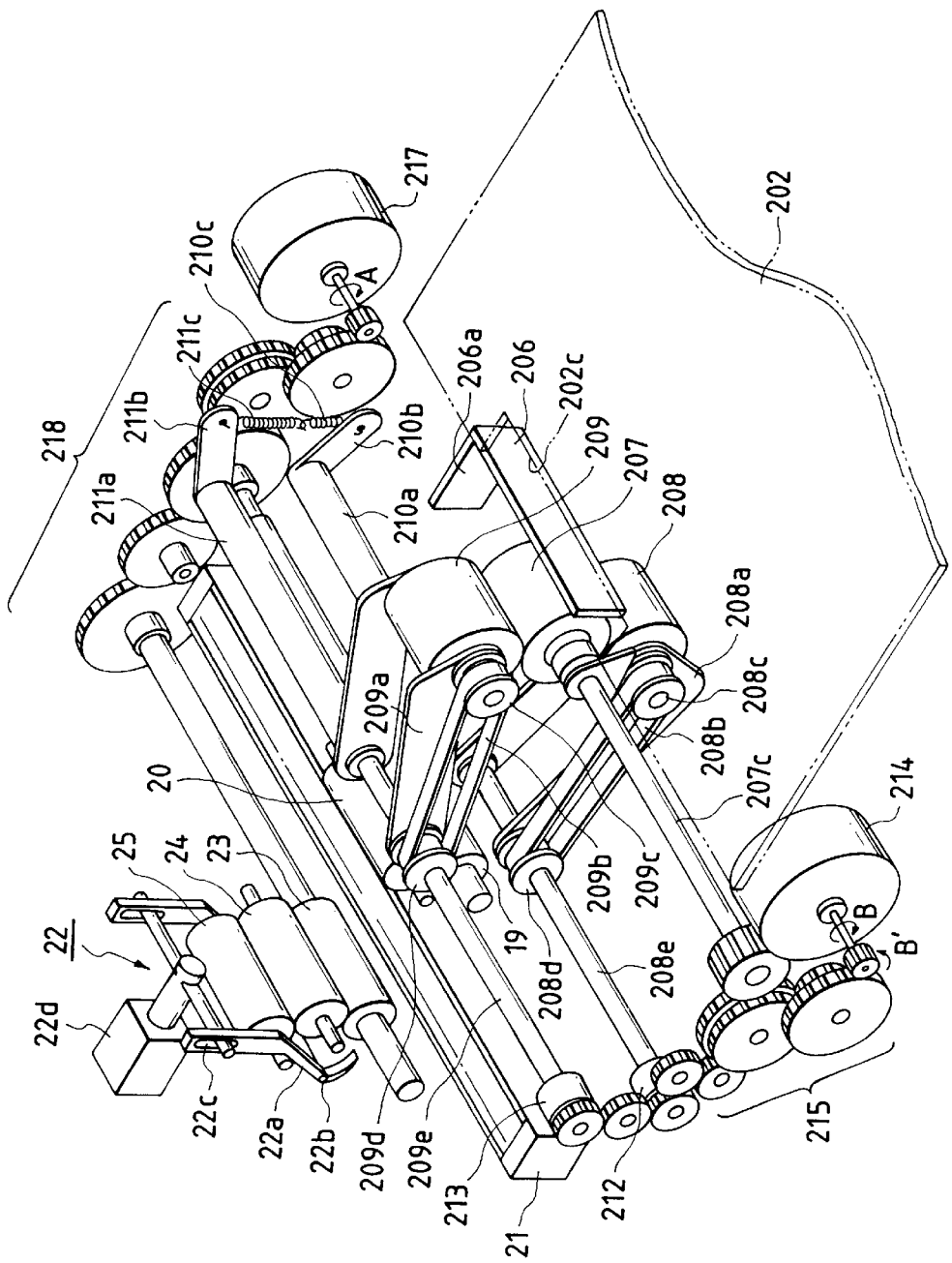
FIG. 10 is a perspective view of a sheet supplying apparatus according to a third embodiment of the present invention.
Figure 11:
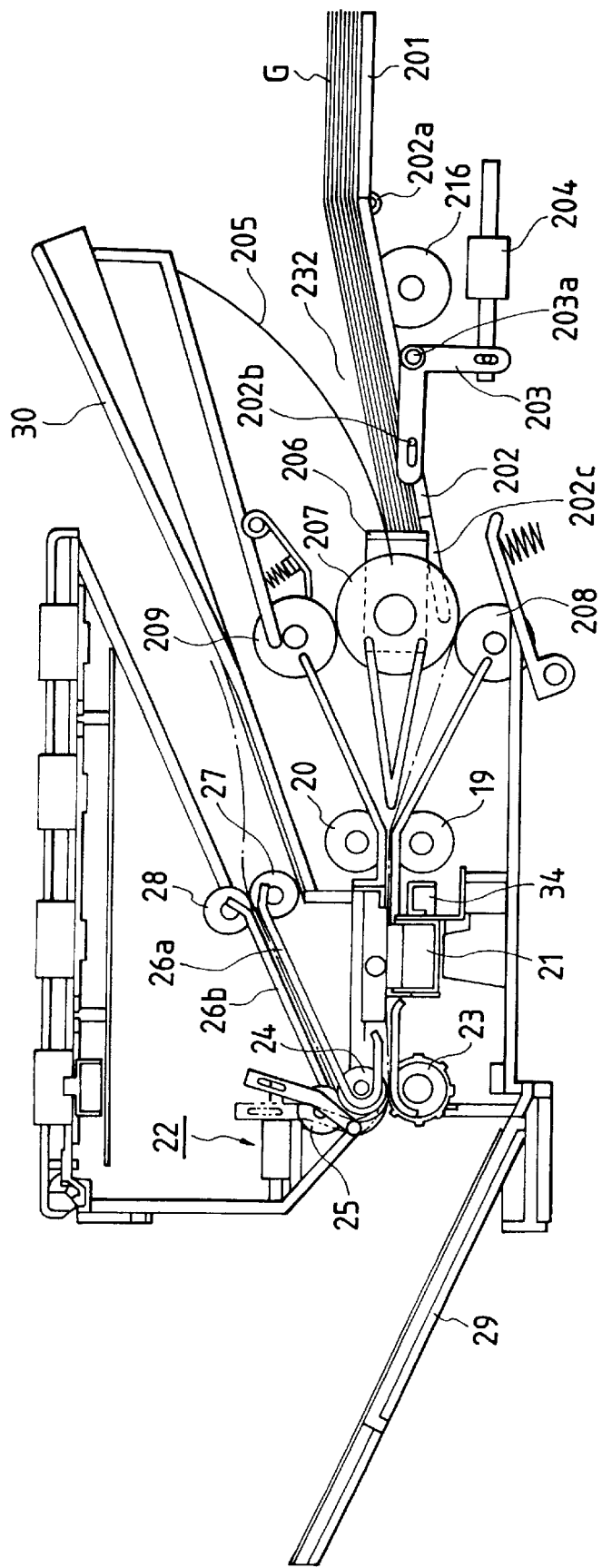
FIG. 11 is a side sectional view of the sheet supplying apparatus in a sheet setting condition.
Figure 12:
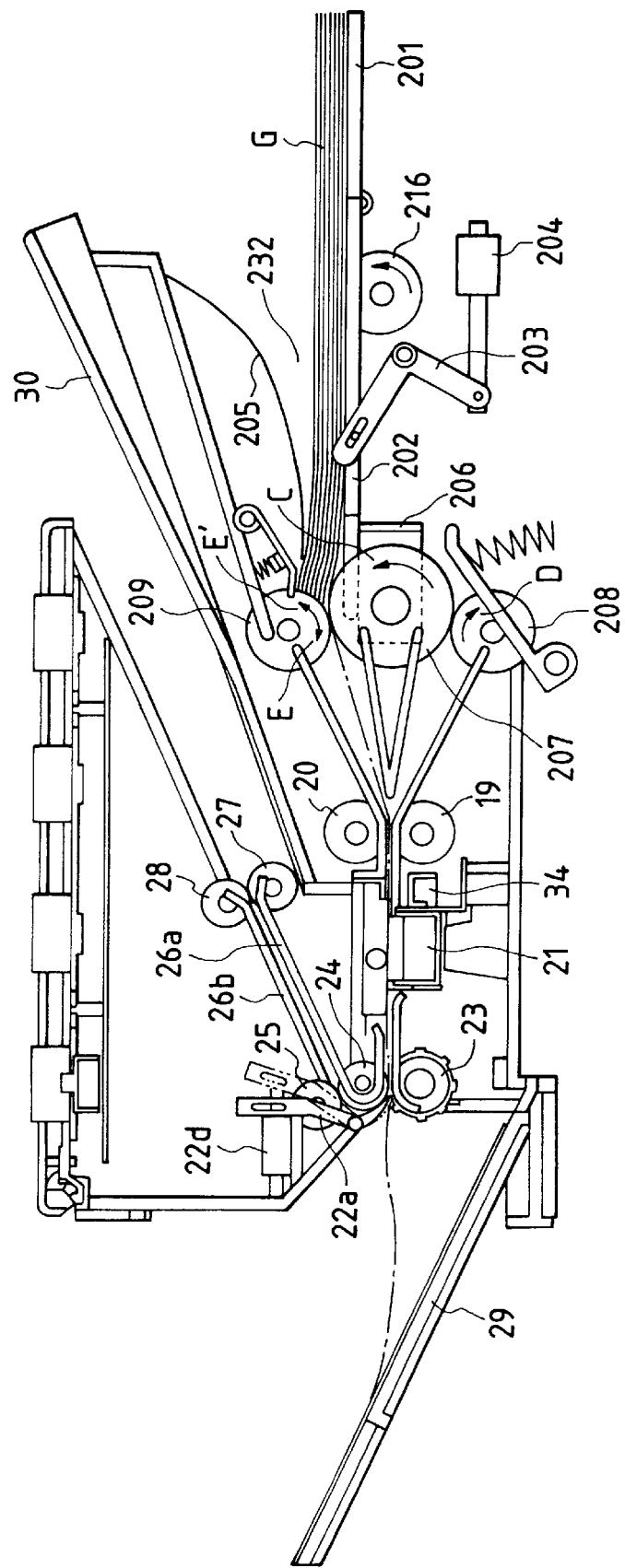
FIG. 12 is a side sectional view of the sheet supplying apparatus in a lowermost sheet supply mode.
Figure 13:
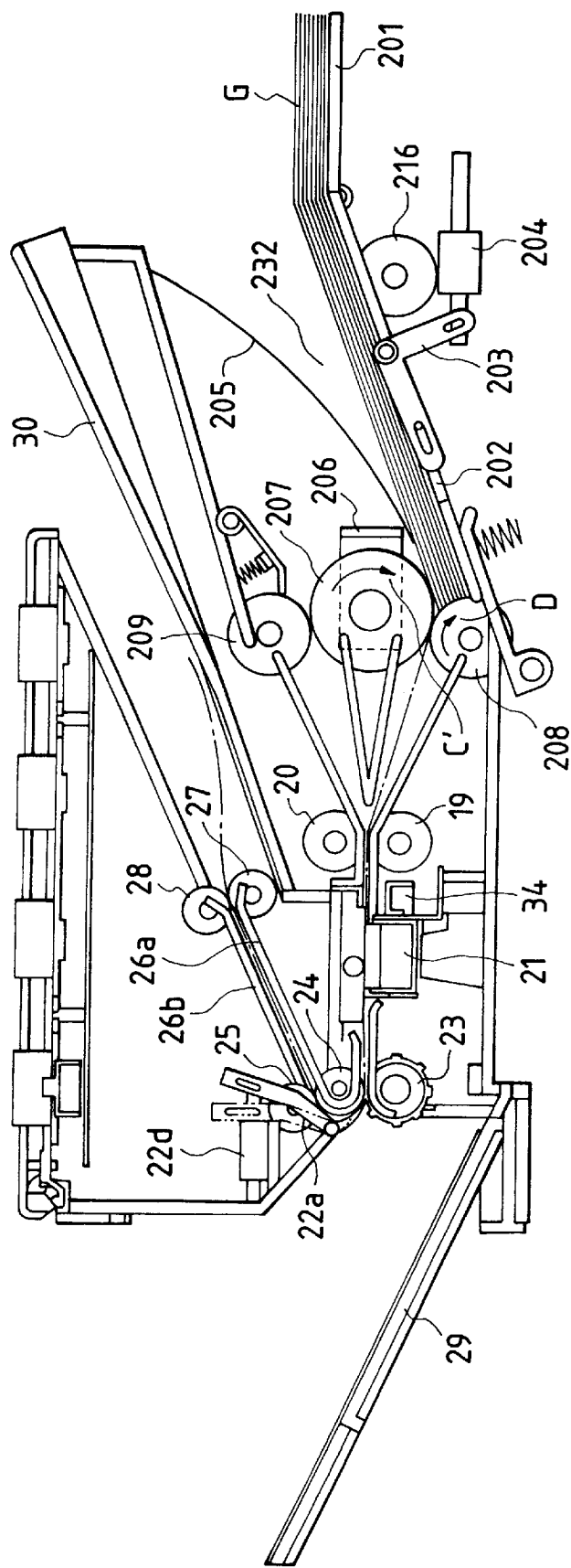
FIG. 13 is a side sectional view of the sheet supplying apparatus in an uppermost sheet supply mode.
Figure 14:
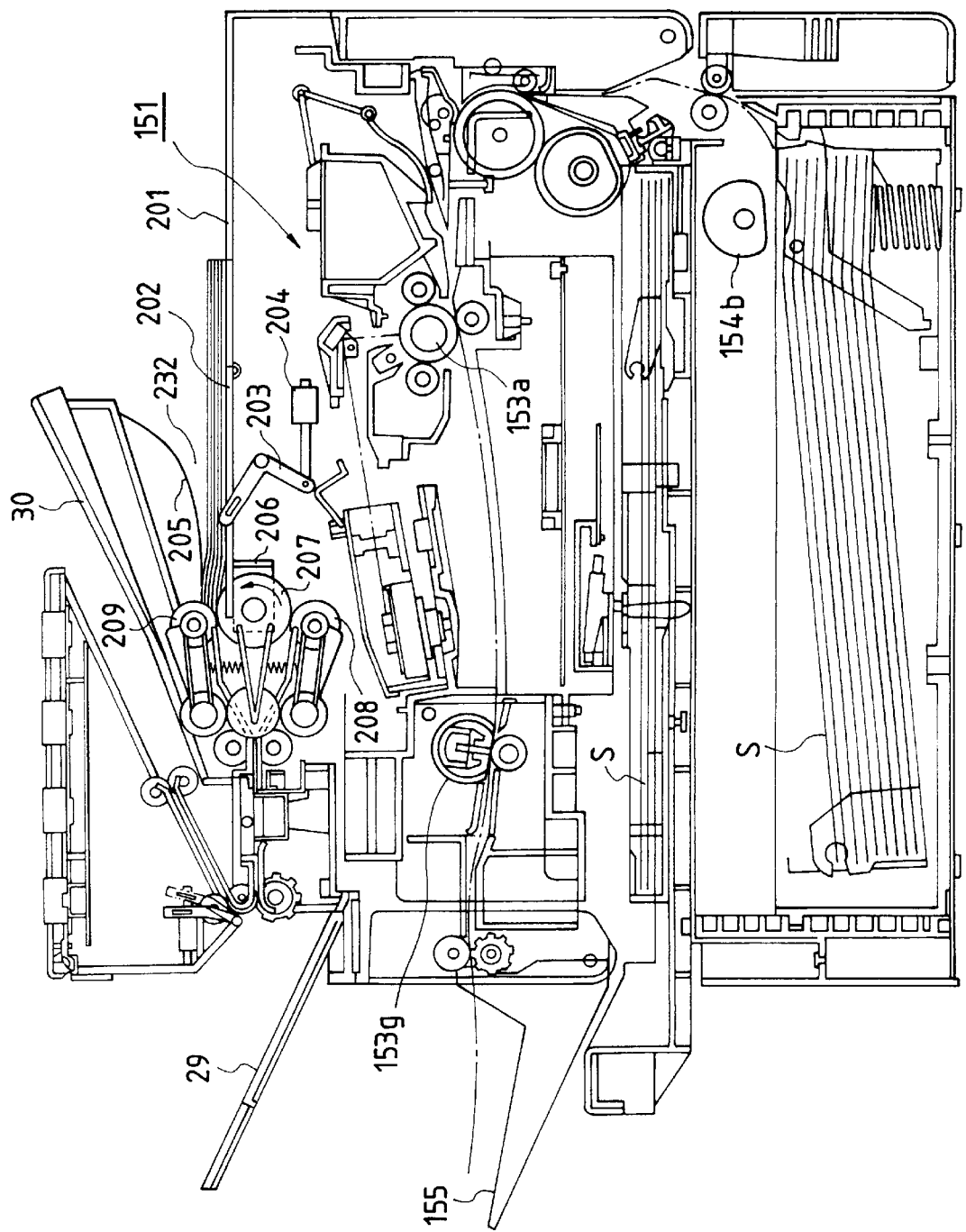
FIG. 14 is a schematic sectional view of a facsimile system.

Next, a sheet supplying apparatus according to a third embodiment of the present invention will be explained with reference the accompanying drawings. This third embodiment shows a sheet supplying apparatus having a copying function and incorporated into a facsimile system in which recorded recording sheets are stacked in a face-up fashion. FIG. 10 is a perspective view of a main part of the sheet supplying apparatus, FIG. 11 is a side sectional view of the sheet supplying apparatus in a sheet setting condition, FIG. 12 is a side sectional view of the sheet supplying apparatus in a sheet supplying condition in a lowermost sheet supply mode, FIG. 13 is a side sectional view of the sheet supplying apparatus in a sheet supplying condition in an uppermost sheet supply mode, and FIG. 14 is a schematic elevational sectional view of the facsimile system.

In FIGS. 10 to 13, an original stacking means (sheet stacking means) 201 includes an original guide plate 202 pivotable around a fulcrum 202*a*. The original guide plate 202 has a fulcrum 202*b* disposed at a downstream side of the fulcrum 202*a*, which fulcrum 202*b* is connected to one end of an L-shaped arm 203 pivotable around a fulcrum 203*a* provided on a body of the apparatus. The other end of the L-shaped arm 203 is connected to a multi-stage plunger 204 for controlling a solenoid by a linear motor so that the L-shaped arm 203 is rotated around the fulcrum 203*a* by driving the plunger 204. That is to say, the original guide plate 202 of the original stacking means 210 can be shifted between a waiting position (FIG. 11) where tip ends of the originals are prevented from entering into a first separation means and a second separation means (described later) by a sheet tip end restraining means, a first feed-out position (FIG. 13) where the originals are fed out to the first separation means and a second feed-out position (FIG. 12) where the originals are fed out to the second separation means, by driving the multi-stage plunger 204.

A guide sheet (sheet urging member) 205 is disposed above the original guide plate 202. In the illustrated embodiment, the guide sheet is formed from flexible polyethylene sheet. Since the tip end of the original stack G rested on the original guide plate 202 is always pressed lightly by an elastic force of the guide sheet 205, the setting condition of the originals can be prevented from being distorted.

A stopper 206 acting as the sheet tip end restraining means is disposed at an upstream side of the first and second separation means (described later) in an original conveying direction. The stopper 206 according to the illustrated embodiment has an L-shaped arm portion 206*a* secured to a frame (not shown). A notch 202*c* is disposed at a downstream side of the original guide plate 202 not to interfere with the stopper 206. A separation roller (first rotary member) 207 is a reversible roller which can be rotated in the original supplying direction in dependence upon the lowermost sheet supply mode or the uppermost sheet supply mode regarding the originals G stacked on the original stacking means 201.

A lower double-feed preventing roller (second rotary member) 208 is attached to a free end of an arm 208*a* rotatably attached to a drive shaft 208*e* via a bearing. The roller 208 receives a rotational driving force from a pulley 208*d* secured to the drive shaft 208*e* through a belt 208*b*. A rotary shaft 208*c* of the roller 208 is disposed at a downstream side of a shaft 207*c* of the separation roller 207, so that, when the originals G are separated from the uppermost one, a contact area between the originals and the separation roller 207 is increased, thereby increasing the original conveying force. That is to say, a first separation means for supplying the originals G one by one from the uppermost one is constituted by the separation roller 207 and the lower double-feed preventing roller 208.

As is in the lower double-feed preventing roller 208, an upper double-feed preventing roller (third rotary member)

209 is attached to a free end of an arm 209a rotatably attached to a drive shaft 209e via a bearing. The roller 209 receives a rotational driving force from a pulley 209d secured to the drive shaft 209e through a belt 209b. A rotary shaft 209c of the roller 209 is disposed at a downstream side of the shaft 207c of the separation roller 207, so that, when the originals G are separated from the lowermost one, a contact area between the originals and the separation roller 207 is increased, thereby increasing the original conveying force. That is to say, a second separation means for supplying the originals G one by one from the lowermost one is constituted by the separation roller 207 and the upper double-feed preventing roller 209.

Incidentally, the lower double-feed preventing roller 208 and the upper double-feed preventing roller 209 are symmetrically disposed with respect to the separation roller 207 in the vertical direction. Further, the separation roller 207, the lower double-feed preventing roller 208 and the upper double-feed preventing roller 209 have the same configuration and are made of the same material. In the illustrated embodiment, the material is rubber of silicone group. With this arrangement, since the identical roller can be used, the cost-down can be realized and the same coefficient of friction can be obtained.

A shaft 210a secured to the arm 208a extends in coaxial with the drive shaft 208e and is provided at its end with a bent portion 210b bent in the same direction as the arm 208a, and a free end of the bent portion is connected with a biasing spring 210c. The other end of the biasing spring is connected to a fixed point on the apparatus body. Similar to the shaft 210a, a shaft 211a secured to the arm 209a extends in coaxial with the drive shaft 209e and is provided at its end with a bent portion 211b bent in the same direction as the arm 209a, and a free end of the bent portion is connected with a biasing spring 211c. The other end of the biasing spring is connected to a fixed point on the apparatus body. The upper double-feed preventing roller 209 is biased toward the separation roller 207 by the biasing spring 211c.

A first torque limiter 212 serves to transmit a rotational driving force (tending to rotate the lower double-feed preventing roller in the same direction as the separation roller 207) from a first motor 14 to the lower double-feed preventing roller 208 with a predetermined torque through a gear train 215. Accordingly, although the lower double-feed preventing roller 208 is driven by the rotation of the separation roller 207 during conveying the originals, if the driven torque of the lower double-feed preventing roller 208 becomes smaller than the torque of the first torque limiter 212 due to the occurrence of the double-feed of originals, the driving force from the first motor 214 is transmitted to the lower double-feed preventing roller 208, thereby returning double-fed original(s). Similar to the first torque limiter 212, a second torque limiter 213 serves to transmit the rotational driving force to the upper double-feed preventing roller 209 with a predetermined torque.

That is to say, the first torque limiter 212 serves to transmit the driving force to prevent the double-feed of originals in the uppermost sheet supply mode, and the second torque limiter 213 serves to transmit the driving force to prevent the double-feed of originals in the lowermost sheet supply mode.

A rotation of an auxiliary convey roller 216 is controlled by a control portion (which will be described later) so that, in the lowermost sheet supply mode, the auxiliary roller is contacted with a lower surface of the original stack G to convey the originals toward a downstream side. When the originals are supplied from the uppermost one, the auxiliary roller is rotated by a predetermined amount to convey the originals G toward the downstream side. The reason why the auxiliary roller is rotated by the predetermined amount in the uppermost sheet supply mode is that the waiting lower originals G are prevented from being damaged by abutting against the lower double-feed preventing roller 208.

The first motor 214 drives the separation roller 207, lower double-feed preventing roller 208 and upper double-feed preventing roller 209. More specifically, when the first motor 214 is rotated in a direction shown by the arrow B in FIG. 10, the original separating operation is effected between the separation roller 207 and the upper double-feed preventing roller 209; whereas, when the first motor 214 is rotated in a direction shown by the arrow B' in FIG. 10, the original separating operation is effected between the separation roller 207 and the lower double-feed preventing roller 208.

A second motor 217 serves to drive, through a gear train 218, a convey system for conveying the separated original G to a reading means and for discharging the original out of the apparatus after reading. In FIG. 10, the reference numeral 19 denotes a sheet supply roller; 20 denotes a back-up roller; and 21 denotes an image sensor of close contact type acting as the reading means. The back-up roller 20 is urged against the sheet supply roller 19 by a spring (not shown) to convey the separated original to the downstream image sensor 21 of close contact type. A switching means 22 for switching a conveying direction of the original G to be discharged includes a flapper 22a rotatably mounted on a support shaft 22b. A slit 22c is formed in the flapper at an end portion thereof opposite to a pawl portion, and a plunger of a solenoid 22d is connected to the slit 22c so that, in accordance with ON/OFF of the solenoid 22d, the flapper 22a is rocked to switch the conveying direction of the original G.

The reference numeral 23 denotes a first discharge roller; 24 denotes a first back-up roller urged against the first discharge roller 23 by a biasing spring (not shown); 25 denotes an auxiliary roller urged against the first back-up roller 24 to change the conveying direction of the original; 26 denotes an original path for guiding the read and U-turned (reversely rotated) original toward a discharging direction; 27 denotes a second discharge roller; 28 denotes a second back-up roller urged against the second discharge roller 28 by a biasing spring (not shown); 29 denotes a FAX original discharge tray on which the originals are stacked after the originals are supplied from the lowermost one in the FAX transmission (described later); and 30 denotes a copy original discharge tray on which the originals are stacked after the originals are supplied from the uppermost one in a copying operation.

Next, an operation of the apparatus will be explained. First of all, a waiting condition of the apparatus will be described, and then, the operations of the apparatus in a FAX mode and a copy mode will be described.

First of all, the originals are arranged to form an original bundle, and the original bundle with the imaged surface facing downside (face-down) is inserted through an original insertion opening 232 disposed at an upstream side of an original convey path constituted by an original guide (not shown) and is rested on the original stacking means 201. Then, the originals are aligned by regulating both lateral edges of the originals by means of a slider (not shown) slid on the original stacking means 201 in a width-wise direction of the original. In this case, the original guide plate 202 is in a waiting position as shown in FIGS. 10 and 11. In this position, the tip end of the original stack set on the original stacking means 201 is restrained by the stopper 206 and is lightly pushed by the guide sheet 205. Accordingly, the tip end of the original stack is prevented from contacting with the downstream roller and the like, thereby preventing the setting condition of the originals G from being distorted.

When the originals G are set in this way, the presence of the original is detected by an original presence/absence sensor (not shown) disposed near the original insertion opening 232, with the result that an original treatment waiting signal is sent to the control portion of the apparatus. In this case, the apparatus is in a FAX transmission waiting condition or a copy waiting condition. This condition is displayed on an LCD panel provided in an operation portion disposed on an upper surface of the apparatus.

Next, the operation in the FAX mode will be explained. In the waiting condition of the apparatus, after the original reading fashion and/or transmission fashion are selected by the function keys, when the receiver is determined by the ten-key or the one-touch key and the start key is depressed, first of all, the multi-stage plunger 204 is operated to shift the original guide plate 202 from the waiting position (FIG. 11) to the second feed-out position as shown in FIG. 12. At the same time, in the vicinity of the original discharge opening, the solenoid 22d is operated to shift the flapper 22a for switching the conveying direction of the original to a solid line position in FIG. 12. As a result, a convey path (shown by the dot and chain line) for discharging the original G along substantially a straight line is established.

The first motor 214 is rotated in the direction B (FIG. 10) and the second motor 217 is rotated in a direction shown by the arrow A in FIG. 10, thereby rotating the above-mentioned rollers. First of all, the auxiliary roller 216 is rotated in the original conveying direction to convey the originals in the second feed-out position shown in FIG. 12 to the second separation means constituted by the separation roller 207 and the upper double-feed preventing roller 209. In this case, since the restraint of the tip ends of the originals by means of the stopper 206 is released by the shifting movement of the original guide plate 202, the auxiliary conveyance is not obstructed.

When the first motor 214 is rotated in the direction B (FIG. 10), the separation roller 207 is rotated in a direction shown by the arrow C in FIG. 12 (original conveying direction in the lowermost sheet supply mode). In this case, the lower double-feed preventing roller 208 is rotated in a direction shown by the arrow D and the upper double-feed preventing roller 209 tries to rotate in a direction shown by the arrow E'. However, since the contact friction force between the upper double-feed preventing roller 209 and the separation roller 207 exceeds the torque value of the second torque limiter 213, the upper double-feed preventing roller 209 is driven by the rotation of the separation roller 207, and, thus, is rotated in a direction shown by the arrow E. Accordingly, after the first motor 214 was rotated, when the originals G are pinched between the separation roller 207 and the upper double-feed preventing roller 209, the upper originals are returned toward the upstream side by the returning force (rotation in the direction E') of the upper double-feed preventing roller 209, with the result that only the lowermost original is conveyed in the original conveying direction by the separation roller 207.

The separation roller 207, lower double-feed preventing roller 208 and upper double-feed preventing roller 209 are made of the same rubber material of silicone group having the same hardness. The reason is that the coefficients of friction of these rollers are made identical. When the copying operation (described later) is performed, the rollers are rotated in opposite directions to separate the originals one by one from the uppermost one. In this case, in order to ensure the same ability as the ability in the lowermost sheet supply mode, it is desirable that the friction forces between the rollers are equal to each other. Accordingly, by using the same rubber material having the same hardness for these rollers, i.e. by equalizing the coefficients of friction of these rollers, the above effect can be achieved. Further, since the similar or identical rollers are used, the manufacturing cost can be reduced in comparison with the case where different rollers are used.

The original G separated by the separation roller 207 and the upper double-feed preventing roller 209 is pinched by the pair of sheet supply rollers 19, 20 to be further conveyed toward the downstream side. When the tip end of the original is detected by the original edge sensor 34 disposed between the pair of sheet supply rollers 19, 20 and the image sensor 21 of close contact type, the tip end of the original is fed back up to the reading position. The imaged surface of the original G sent to the reading position is read by the image sensor 21 of close contact type. A signal from the image sensor is binary-coded by a circuit (not shown) in the apparatus, and the binary-coded signal is stored in a memory. After reading, the original is conveyed to the downstream side by the pair of first discharge rollers 23, 24 and is moved along the flapper 22a, and then is discharged onto the FAX original discharge tray 29 with the imaged surface facing downside. The discharged originals are stacked on the tray from the first page to the last page. Therefore, the originals are stacked in the same page sequence as that of the originals stacked on the original guide plate.

Incidentally, in the FAX transmission, when the memory transmission is used, the read image data can be transferred to the receiver determined by the registration of the one-touch key or the input via the push buttons before all of the originals are read. On the other hand, in the direct transmission, immediately after the start key is depressed, the circuit connection is started, and, when the circuit connection is completed and the pre-treatment is finished, the conveying and the reading of the original are started. In this case, unlike to the memory transmission, the image data for several lines is accumulated in the buffer (not shown), and the image data for several lines are successively transferred in dependence upon the receiver's modem speed and/or transmission circuit condition, while sometimes effecting the fall-back. And, the last original is discharged after the transmission circuit is disconnected.

Next, the operation in the copy mode will be explained. As is in the FAX mode, in the waiting condition of the apparatus, after the copy key of the operation portion is depressed, the fact that the number of sheets (copy number) should be inputted is displayed on the liquid crystal display panel 41e, and, the operator inputs the copy number by using the ten-key 41b. After the start key 41a is depressed, first of all, the multi-stage plunger 204 is operated to shift the original guide plate 202 from the waiting position (FIG. 11) to the first feed-out position as shown in FIG. 13. At the same time, in the vicinity of the original discharge opening, the flapper 22a for switching the conveying direction of the original is shifted to a solid line position in FIG. 13. As a result, a convey path (shown by the dot and chain line) for discharging the original G while U-turning toward above the reading portion is established.

The first motor 214 is rotated in the direction B' (FIG. 10) and the second motor 217 is rotated in a direction shown by the arrow A in FIG. 10, thereby rotating the above-mentioned rollers. First of all, the auxiliary roller 216 is rotated in the original conveying direction by the predetermined amount to convey the originals in the first feed-out position shown in FIG. 13 to the first separation means constituted by the separation roller 207 and the lower double-feed preventing roller 208. In this case, since the restraint of the tip ends of the originals by means of the stopper 206 is released by the shifting movement of the original guide plate 202, the auxiliary conveyance is not obstructed.

When the first motor 214 is rotated in the direction B' (FIG. 10), the separation roller 207 is rotated in a direction shown by the arrow C' in FIG. 12 (original conveying direction in the uppermost sheet supply mode). After the first motor 214 was rotated, when the originals G are pinched between the separation roller 207 and the lower double-feed preventing roller 208, the lower originals are returned toward the upstream side by the returning force of the lower double-feed preventing roller 208, with the result that only the uppermost original is conveyed in the original conveying direction by the separation roller 207.

As is in the FAX transmission, the original G separated by the separation roller 207 and the lower double-feed preventing roller 208 is pinched by the pair of sheet supply rollers 19, 20 to be further conveyed toward the downstream side. When the tip end of the original is detected by the original edge sensor 34 disposed between the pair of sheet supply rollers 19, 20 and the image sensor 21 of close contact type, the tip end of the original is fed back up to the reading position.

The imaged surface of the original G sent to the reading position is read by the image sensor 21 of close contact type. After reading, the original is conveyed to the downstream side by the pair of first discharge rollers 23, 24. After the conveying direction of the original is changed by the flapper 22a, the original is pinched between the first back-up roller 24 and the auxiliary roller 25 and is passed through the original path 26 constituted by the convey guides 26a, 26b, and then is discharged onto the copy original discharge tray 30 with the imaged surface facing upside (face-up) by the second pair of discharge rollers 27, 28. The discharged originals successively are stacked on the tray from the last page to the first page. Therefore, the originals are stacked in the same page sequence as that of the originals stacked on the original guide plate.

By designing the sheet supplying apparatus as mentioned above, without changing (rearranging) the page sequence between the FAX mode and the copy mode, the originals can be read from the first page and then be transferred in the FAX transmission, and, in the copying operation, the originals can be read from the last page, and the read originals and the recorded recording sheets can be stacked in the same page sequence as that of the originals stacked on the original guide plate.

Further, when the originals G are set on the original stacking means 201, since the tip ends of the originals are restrained by the stopper 206 and are lightly pushed down by the guide sheet 205, the setting condition of the originals is not distorted. Further, when the originals are supplied, since the original guide plate 202 is shifted to the first or second feed-out position to release the restraint of the original tip ends by the stopper 206, the auxiliary conveyance effected by the auxiliary convey roller 216 is not obstructed by the stopper 206. Thus, the double-feed and/or poor original supply due to the distortion of the setting condition of the originals can be prevented.

[Fourth Embodiment]

Figure 15:
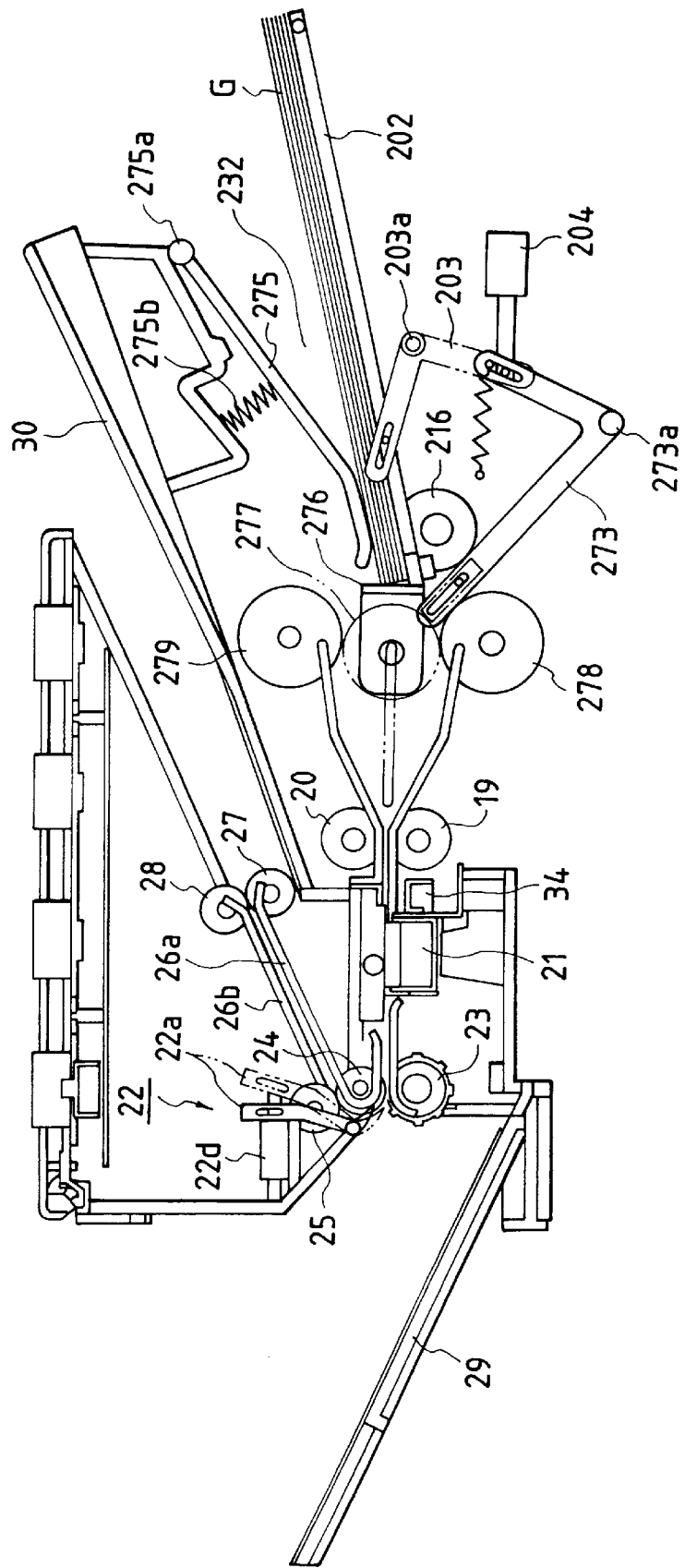
FIG. 15 is a side sectional view of a sheet supplying apparatus according to a fourth embodiment of the present invention, in a sheet setting condition.
Figure 16:
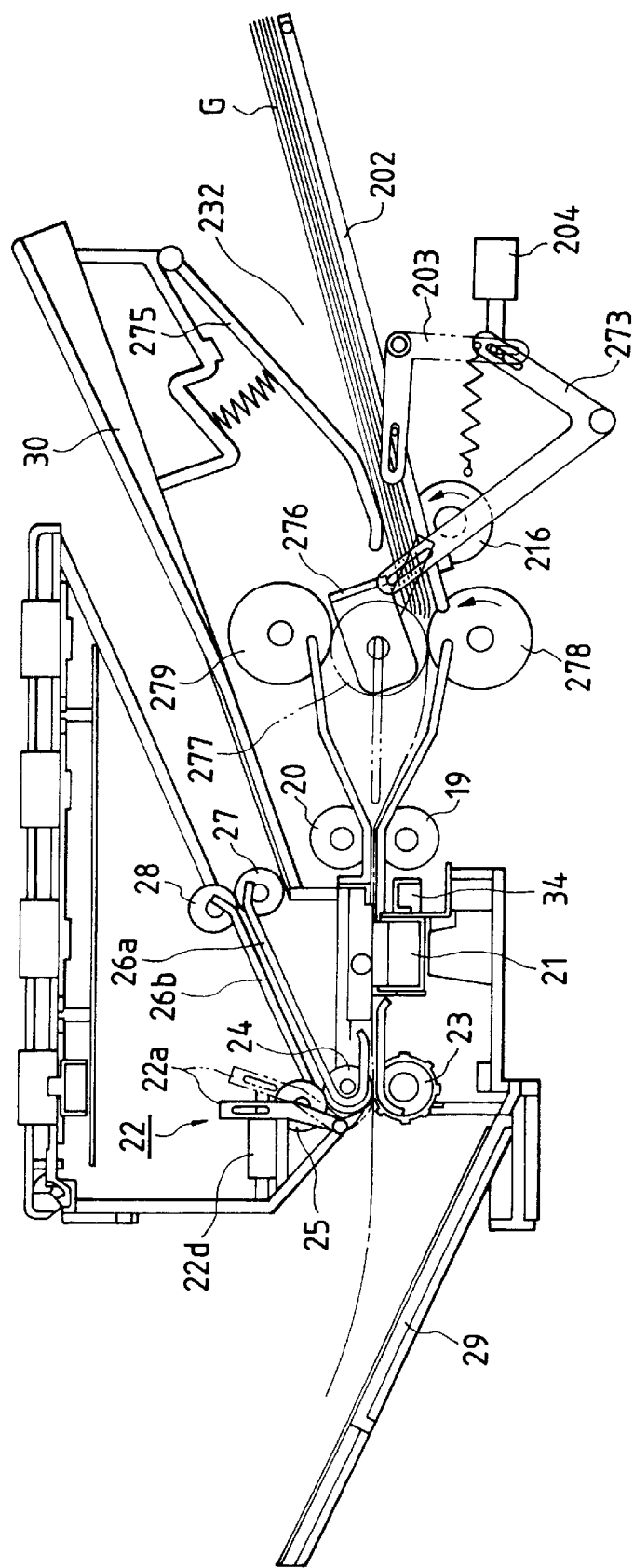
FIG. 16 is a side sectional view of the sheet supplying apparatus in a lowermost sheet supply mode.
Figure 17:
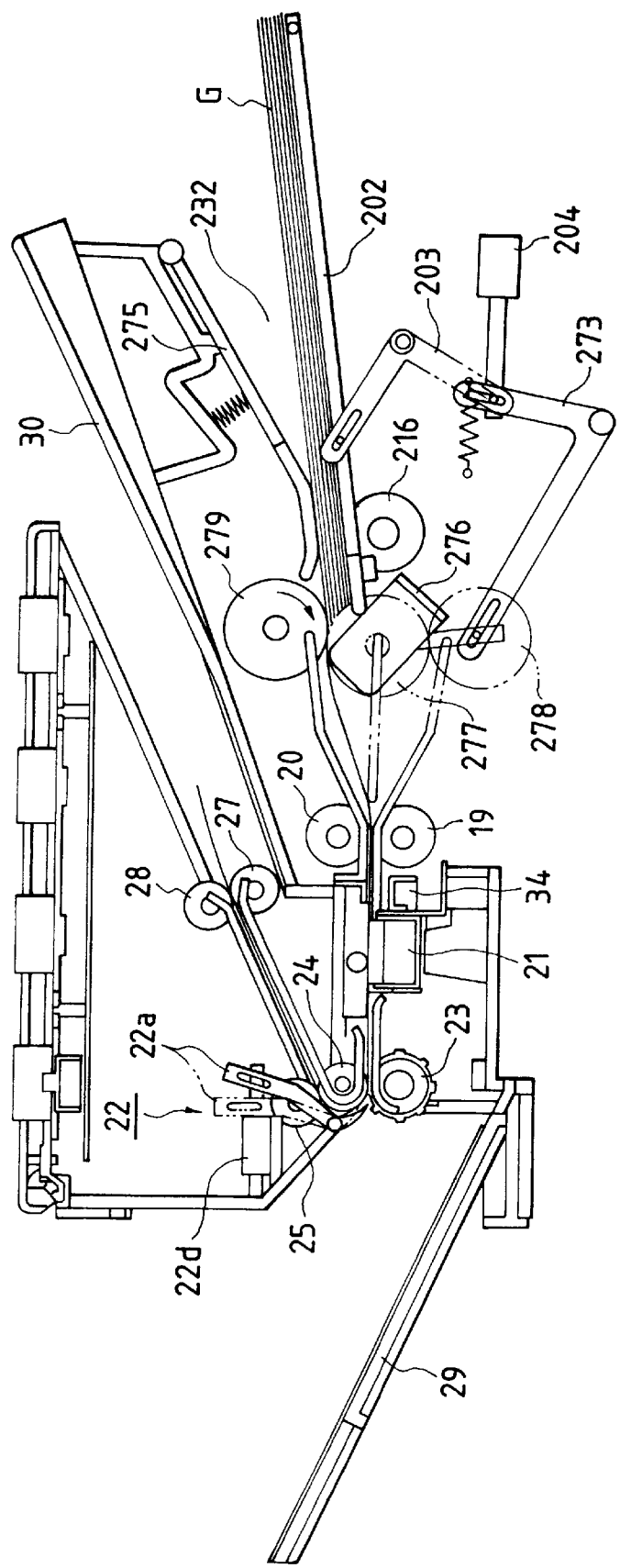
FIG. 17 is a side sectional view of the sheet supplying apparatus in an uppermost sheet supply mode.

Next, a sheet supplying apparatus according to a fourth embodiment of the present invention will be explained with reference to FIGS. 15 to 17. Similar to the above-mentioned embodiments, also in this fourth embodiment, a sheet supplying apparatus having a copying function and incorporated into a facsimile system in which the recorded recording sheets can be stacked in a face-up fashion is shown. FIG. 15 is a side sectional view of the sheet supplying apparatus in a sheet setting condition, FIG. 16 is a side sectional view of the sheet supplying apparatus in a lowermost sheet supply mode, and FIG. 17 is a side sectional view of the sheet supplying apparatus in an uppermost sheet supply mode. Incidentally, since the entire construction of the facsimile system is substantially the same as that of the first embodiment, detailed explanation thereof will be omitted. Further, elements having the same or equivalent construction and function as those in the above-mentioned embodiments are designated by the same reference numerals, and explanation thereof will be omitted. Now, the characteristics of the sheet supplying apparatus according to the fourth embodiment will be described.

In FIGS. 15 to 17, an urging arm (sheet urging member) 275 is pivotally mounted on a fulcrum 275a and is lightly biased toward the original guide plate 202 by a biasing spring 275b. With this arrangement, since the originals G inserted through the original insertion opening 232 is lightly urged against the original guide plate 202 by the urging arm 275, the setting condition of the originals is not distorted.

Further, in FIGS. 15 to 17, a stopper (sheet tip end restraining means) 276 can be rocked around a fulcrum 276a. The stopper 176 is connected to one end of an L-shaped arm 273 pivotally mounted on a fulcrum 273a on the apparatus body. The other end of the L-shaped arm 273 is connected to the multi-stage plunger 204 for shifting the original guide plate 202 so that the L-shaped arm 273 is rotated around the fulcrum 273a by driving the plunger 204. Accordingly, in synchronous with the shifting movement of the original guide plate 202, the stopper 276 is shifted from a waiting position as shown in FIG. 15 to a retard position as shown in FIGS. 16 or 17 by driving the multi-stage plunger 204.

That is to say, in the lowermost sheet supply mode, the original guide plate 202 is shifted to a second feed-out position shown in FIG. 16, and, at the same time, the stopper 276 is shifted to the retard position shown in FIG. 16. On the other hand, in the uppermost sheet supply mode, the original guide plate 202 is shifted to a first feed-out position shown in FIG. 17, and, at the same time, the stopper 276 is shifted to the retard position shown in FIG. 16. As a result, the size of the stopper 276 for restraining the tip ends of the originals at the waiting position can be adequately great, and the stopper does not obstruct the auxiliary conveyance effected by the auxiliary convey roller 216.

Further, in FIGS. 15 to 17, a retard roller (first rotary member) 277 disposed at a downstream side of the stopper 276 acts as a double-feed preventing roller when the originals G are supplied from the lowermost one or uppermost one. A lower separation roller (second rotary member) 278 urged against the retard roller 277 from the below is rotated in the original conveying direction in the lowermost sheet supply mode. An upper separation roller (third rotary member) 279 urged against the retard roller 277 from the above is rotated in the original conveying direction in the uppermost sheet supply mode.

That is to say, in the illustrated embodiment, a second separation means for supplying the originals from the lowermost one is constituted by the retard roller 277 and the lower separation roller 278, and a first separation means for supplying the originals from the uppermost one is constituted by the retard roller 277 and the upper separation roller 279.

Incidentally, as is in the above-mentioned embodiments, also in this embodiment, the retard roller 277, lower separation roller 278 and upper separation roller 279 have the same configuration and are made of the same material. Thus, since the identical rollers can be used in common, the manufacturing cost can be reduced and the same coefficient of friction can be obtained. Since the other elements have the same construction and function as those in the third embodiment, these elements are designated by the same reference numerals.

Next, an operation of the apparatus will be explained. First of all, a waiting condition of the apparatus will be described, and then, the operations of the apparatus in a FAX mode and a copy mode will be described.

In the first, the originals are arranged to form an original bundle, and the original bundle with the imaged surface facing downside (face-down) is inserted through the original insertion opening 232 disposed at an upstream side of the original convey path constituted by the original guide (not shown) and is rested on the original stacking means 201. Then, the originals are aligned by regulating both lateral edges of the originals by means of the slider (not shown) slid on the original stacking means 201 in a width-wise direction of the original.

In this case, the original guide plate 202 and the stopper 276 are in a waiting position as shown in FIG. 15. In this position, the tip end of the original stack set on the original stacking means 201 is restrained by the stopper 276 and is lightly pushed down by the urging arm 275. Accordingly, the tip end of the original stack is prevented from contacting with the downstream roller and the like, thereby preventing the setting condition of the originals from being distorted.

When the originals G are set in this way, the presence of the original is detected by the original presence/absence sensor (not shown) disposed near the original insertion opening 232, with the result that the original treatment waiting signal is sent to the control portion of the apparatus. In this case, the apparatus is in the FAX transmission waiting condition or the copy waiting condition. This condition is displayed on the LCD panel provided in the operation portion disposed on the upper surface of the apparatus.

Next, the operation in the FAX mode will be explained.

In the waiting condition of the apparatus, after the original reading fashion and/or transmission fashion are selected by the function keys, when the receiver is determined by the ten-key or the one-touch key and the start key is depressed, first of all, the multi-stage plunger 204 is operated to shift the original guide plate 202 from the waiting position (FIG. 15) to the second feed-out position as shown in FIG. 16, and the stopper 276 is shifted from the waiting position (FIG. 15) to the retard position (FIG. 16). At the same time, in the vicinity of the original discharge opening, the solenoid 22d is operated to shift the flapper 22a for switching the conveying direction of the original to a solid line position in FIG. 3. As a result, a convey path (shown by the dot and chain line) for discharging the original G along substantially a straight line is established.

Then, the auxiliary convey roller 216 is rotated in the original conveying direction to convey the originals G positioned in the second feed-out position shown in FIG. 16 to the second separation means constituted by the retard roller 277 and the lower separation roller 278. In this case, as mentioned above, since the stopper 276 is shifted to the retard position by the shifting movement of the original guide plate 202, the auxiliary conveyance effected by the auxiliary convey roller 216 is not obstructed. The originals G fed out in this way are pinched between the retard roller 277 and the lower separation roller 278. The upper originals are returned toward the upstream side by the returning force of the retard roller 277, and only the lowermost original is pulled in the original conveying direction by the lower separation roller 278.

Incidentally, the further operation is the same as those in the above-mentioned embodiments. That is to say, in the lowermost sheet supply mode, the read originals G are discharged onto the FAX original discharge tray 29 with the imaged surfaces facing downside from the first page to the last page. In this way, the originals G are stacked in the same page sequence as that of the originals before reading.

Next, the operation in the copy mode will be explained.

As is in the FAX mode, in the waiting condition of the apparatus, after the copy key of the operation portion is depressed, the fact that the number of sheets (copy number) should be inputted is displayed on the liquid crystal display panel, and, the operator inputs the copy number by using the ten-key. After the start key is depressed, first of all, the multi-stage plunger 204 is operated to shift the original guide plate 202 from the waiting position (FIG. 15) to the first feed-out position as shown in FIG. 17 and the stopper 276 is shifted from the waiting position shown in FIG. 15 to the retard position shown in FIG. 17. At the same time, in the vicinity of the original discharge opening, the flapper 22a for switching the conveying direction of the original is shifted to a solid line position in FIG. 17. As a result, a convey path (shown by the dot and chain line) for discharging the original G while U-turning toward above the reading portion is established.

The auxiliary roller 216 is rotated in the original conveying direction by the predetermined amount to convey the originals G in the first feed-out position shown in FIG. 17 to the first separation means constituted by the retard roller 277 and the upper separation roller 279. In this case, since the stopper 276 is shifted to the retard position by the shifting movement of the original guide plate 202, the auxiliary conveyance effected by the auxiliary convey roller 216 is not obstructed. When the originals G fed out as mentioned above is pinched between the retard roller 277 and the upper separation roller 279, the lower originals are returned to the upstream side by the returning force of the retard roller 277, and only the uppermost original is conveyed in the original conveying direction by the upper separation roller 279.

Incidentally, the further operation is the same as those in the above-mentioned embodiments. That is to say, in the uppermost sheet supply mode, the read originals G are reversely rotated by the flapper 22a and are discharged onto the copy original discharge tray 30 with the imaged surfaces facing upside from the last page to the first page. In this way, the originals G are stacked in the same page sequence as that of the originals before reading.

By designing the sheet supplying apparatus as mentioned above, without changing (rearranging) the page sequence between the FAX mode and the copy mode, the originals can be read from the first page and then be transferred in the FAX transmission, and, in the copying operation, the originals can be read from the last page, and the read originals and the recorded recording sheets can be stacked in the same page sequence as that of the originals stacked on the original guide plate.

Further, the originals G are set on the original stacking means 201, since the tip ends of the originals are restrained by the stopper 276 and are lightly pushed down by the guide sheet 275, the setting condition of the originals is not distorted. Further, when the originals are supplied, since the original guide plate 202 is shifted to the first or second feed-out position and the stopper 276 is shifted to the retard position, the auxiliary conveyance effected by the auxiliary convey roller 216 is not obstructed by the stopper 276. Further, since the dimension of original restraining portion of the stopper 276 can be sufficiently increased, the tip ends of the originals can surely be stopped by the stopper 276, thereby improving the operability. Thus, the double-feed and/or poor original supply due to the distortion of the setting condition of the originals can be prevented.

In the above-mentioned embodiments, while an example that the sheet guide 205 or the urging arm 275 is used as the sheet urging member was explained, the present invention is not limited to such an example, any means for lightly holding down the originals may be used. Further, when the setting condition of the originals is hard to be distorted depending upon the kind of the originals or the environments under which the apparatus is used, the urging member may be omitted. In this case, the apparatus can be made cheaper.

Further, in the above-mentioned embodiment, while an example that the auxiliary convey roller 216 is provided as the auxiliary convey means for conveying the originals G on the original stacking means 201 to the first or second separation means was explained, when the number of originals to be set is small and/or when the setting condition of the originals is hard to be distorted depending upon the kind of the originals or the environments under which the apparatus is used, the auxiliary convey means may be omitted. In this case, the apparatus can be made cheaper.

Further, in the above-mentioned embodiment, while an example that the originals are conveyed to the separation means by means of the auxiliary convey means was explained, the present invention is not limited to such an example, but, for example, by inclining the original guide plate 202 toward the downstream side, the originals may be conveyed to the separation means by their own weights. In this case, the roller arrangement as explained in connection with the fourth embodiment can be used. That is to say, it may be so designed that the first rotary member acts as the double-feed preventing retard roller 277 and second and third rotary members urged against the first rotary member from the above and below act as the separation rollers 278, 279.

With this arrangement, since the lowermost original G is fed out below the stopper 276 in the lowermost sheet supply mode and the uppermost sheet G is fed out above the stopper 276 in the uppermost sheet supply mode, even when the original guide plate 202 is inclined so that the originals G are entered into the separation portion by their own weights, the tip ends of the originals does not form an inverted wedge front edge (condition that the front edge of the fed original bundle becomes a concave wedge shape), thereby feeding out the originals smoothly. Further, in the third embodiment, while an example that the stopper 206 acting as the sheet tip end restraining means is fixed was explained, the stopper may be movable as is in the fourth embodiment.

With this arrangement, since the dimension of the front original restraining portion of the stopper 206 can be increased, when the originals are set, the tip ends of the originals can positively be stopped by the stopper, thereby improving the operability.

To the contrary, in the fourth embodiment, while an example that the stopper 206 acting as the sheet tip end restraining means is movable was explained, the stopper may be fixed as is in the third embodiment. With this arrangement, a cheaper apparatus having a simple construction can be provided.

[Fifth embodiment]

Figure 18:
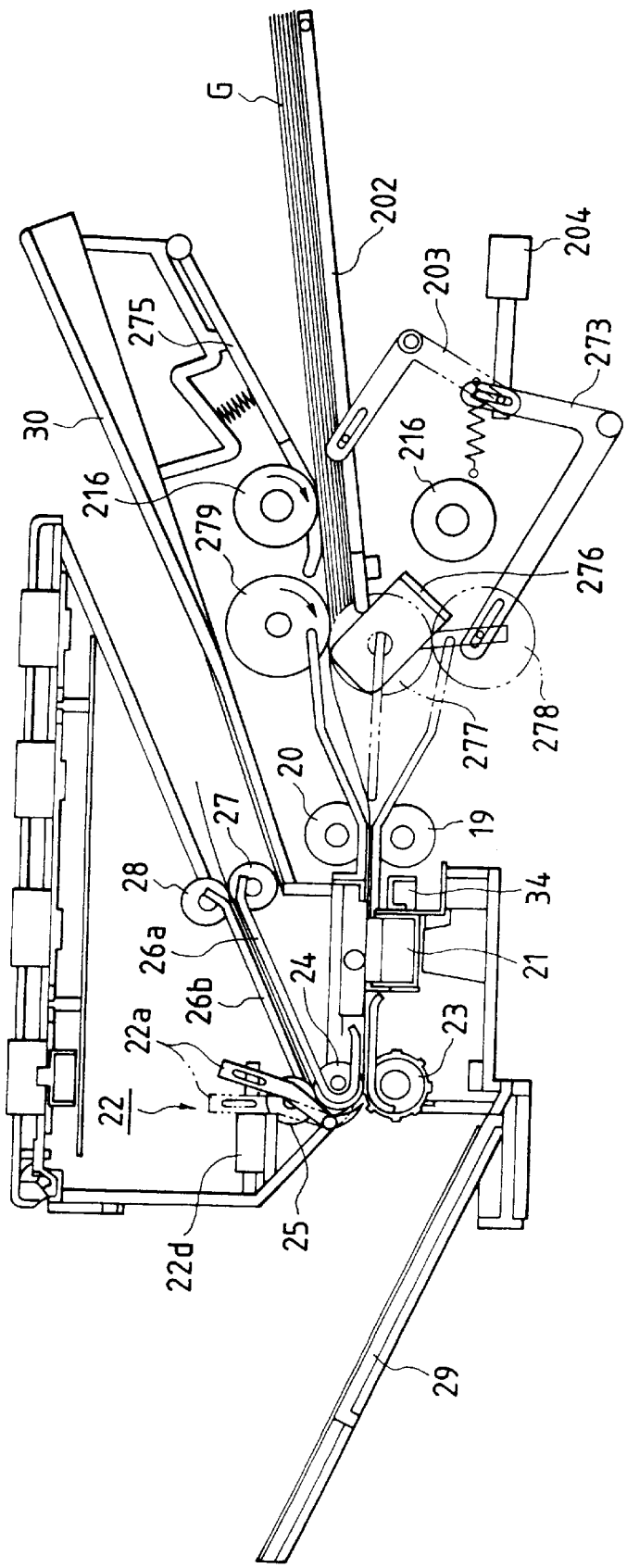
FIG. 18 is a side sectional view of a sheet supplying apparatus according to a fifth embodiment of the present invention.

In the above-mentioned embodiments, while an example that, as the auxiliary convey means for feeding out the originals to the first or second separation means, the single auxiliary roller 216 is provided below the original guide plate 202 was explained, the present invention is not limited to such an example. For example, as shown in FIG. 18, two auxiliary convey rollers 216 are disposed above and below the original guide plate 202, respectively so that one of these auxiliary convey roller can be rotatingly driven in synchronous with other rollers in dependence upon the uppermost sheet supply mode or the lowermost sheet supply mode.

With this arrangement, since the auxiliary conveying force can be applied during the conveyance of the originals, the feeding of the originals can be further stabilized, thereby improving the reliability of the apparatus. Incidentally, since the other constructions other than the auxiliary convey rollers are the same as those in the second embodiment, the same and similar elements are designated by the same reference numerals.

[Sixth Embodiment]

Figure 19:
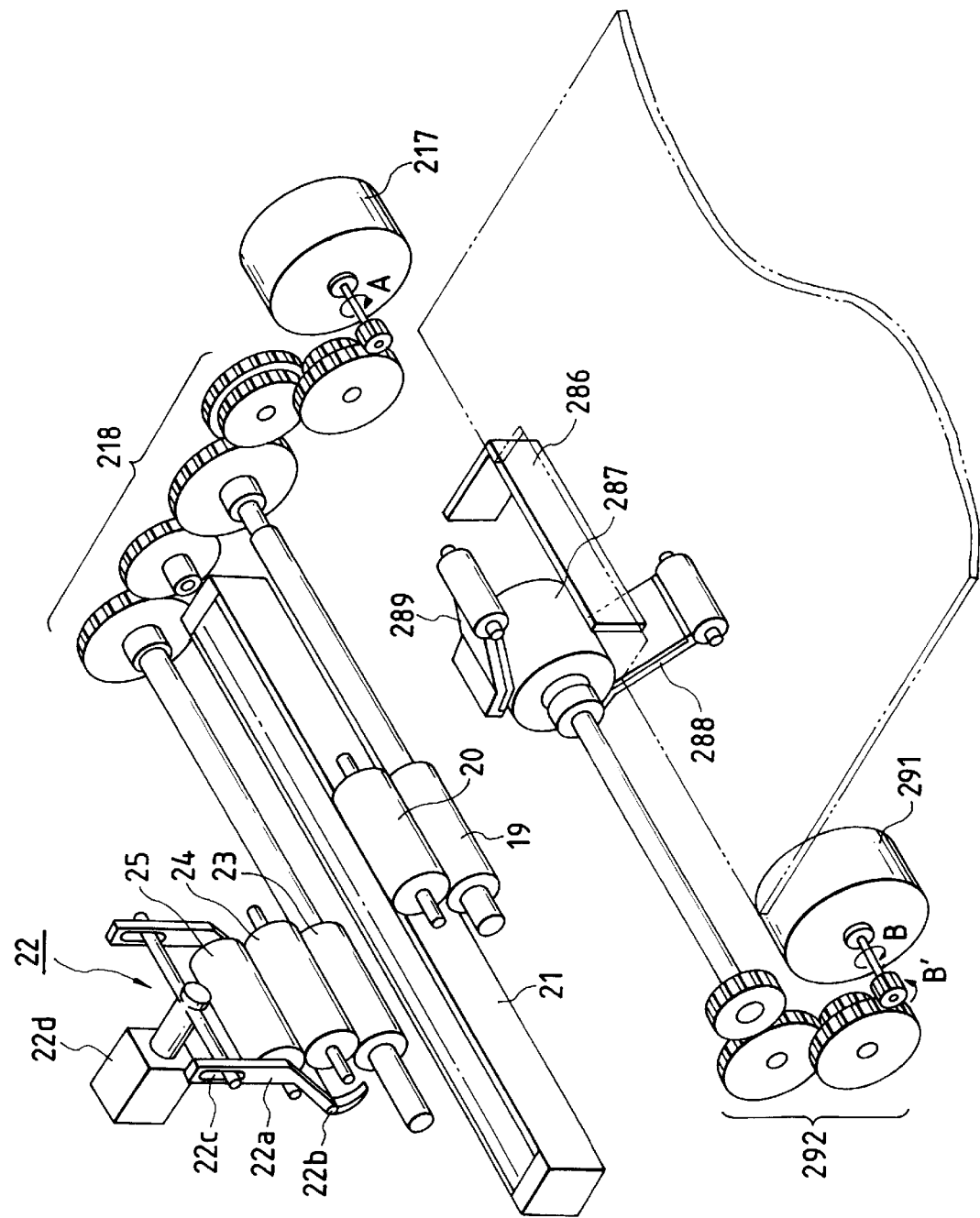
FIG. 19 is a perspective view of a sheet supplying apparatus according to a sixth embodiment of the present invention.

In the above-mentioned embodiments, while an example that three rollers cooperate with each other to separate and feed out the originals was explained, the present invention is not limited to such an example. For example, as shown in FIG. 19, it may be so designed that the originals are separated and fed out by a single rotary member and two friction members. As shown in FIG. 19, a lower friction piece (first friction member) 288 and an upper friction piece (second friction member) 289 are urged against a reversible separation roller (rotary member) 287 from the below and the above, respectively, so that a first separation means for separating and feeding out the originals from the uppermost one is constituted by the separation roller 287 and the lower friction piece 288 and a second separation means for separating and feeding out the originals from the lowermost one is constituted by the separation roller 287 and the upper friction piece 289. Further, a first motor 291 serves to drive the separation roller 287 through a gear train 292.

More specifically, when the first motor 291 is rotated in a direction B in FIG. 19, the original separation action is effected between the separation roller 287 and the second friction piece 289; whereas, when the first motor 291 is rotated in a direction B' in FIG. 19, the original separation action is effected between the separation roller 287 and the first friction piece 288. Incidentally, since the functions and constructions of the other elements are the same as those in the above-mentioned embodiments, such elements are designated by the same reference numerals. Further, a stopper 286 acting as a sheet tip end restraining means may be fixed as is in the third embodiment, or be movable as is in the fourth embodiment. With the arrangement as mentioned above, since the friction members cheaper than the rollers are used, the apparatus can be made cheaper.

[Seventh Embodiment]

Figure 20:
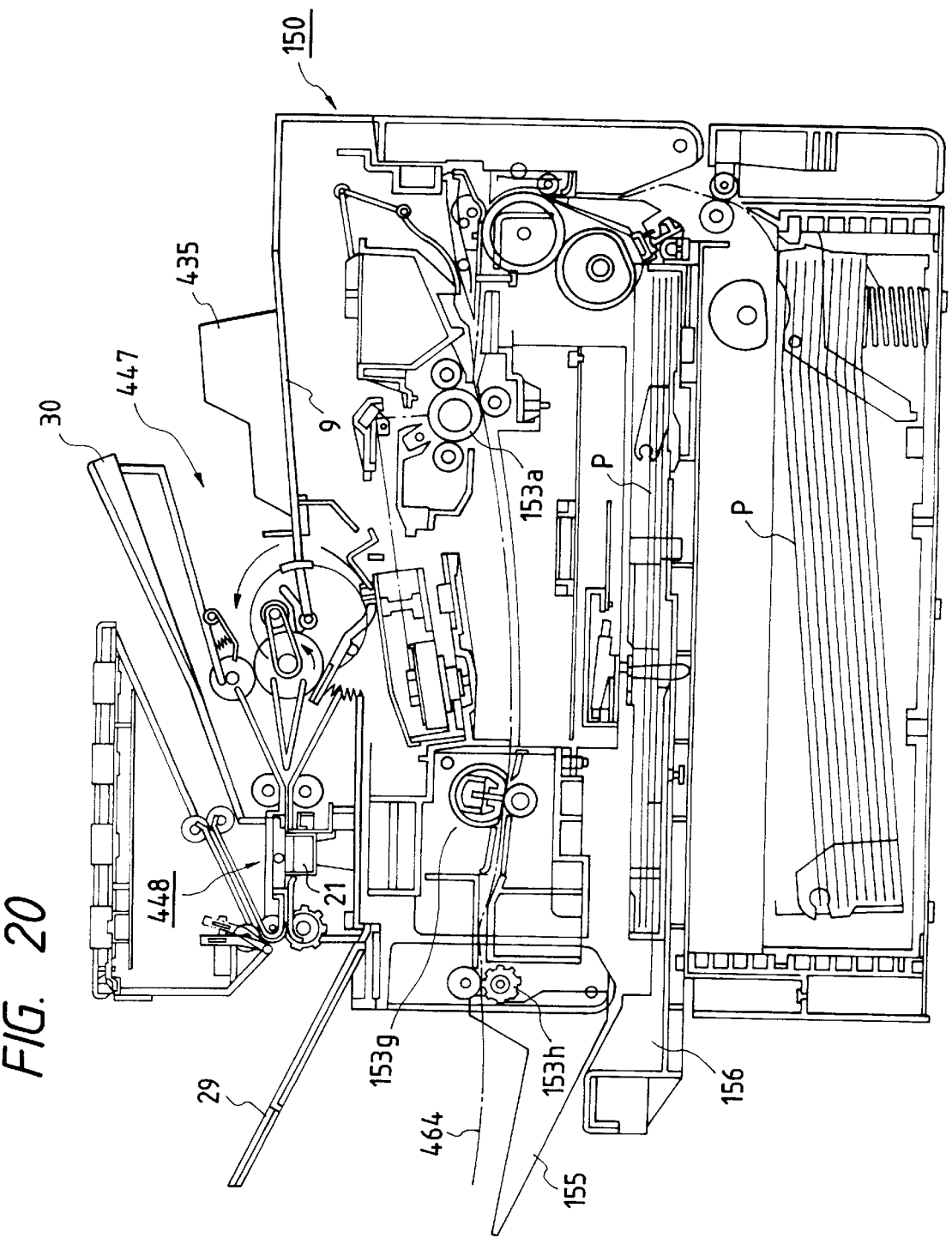
FIG. 20 is an elevational sectional view of an image forming apparatus having a sheet supplying apparatus according to a seventh embodiment of the present invention.
Figure 21:
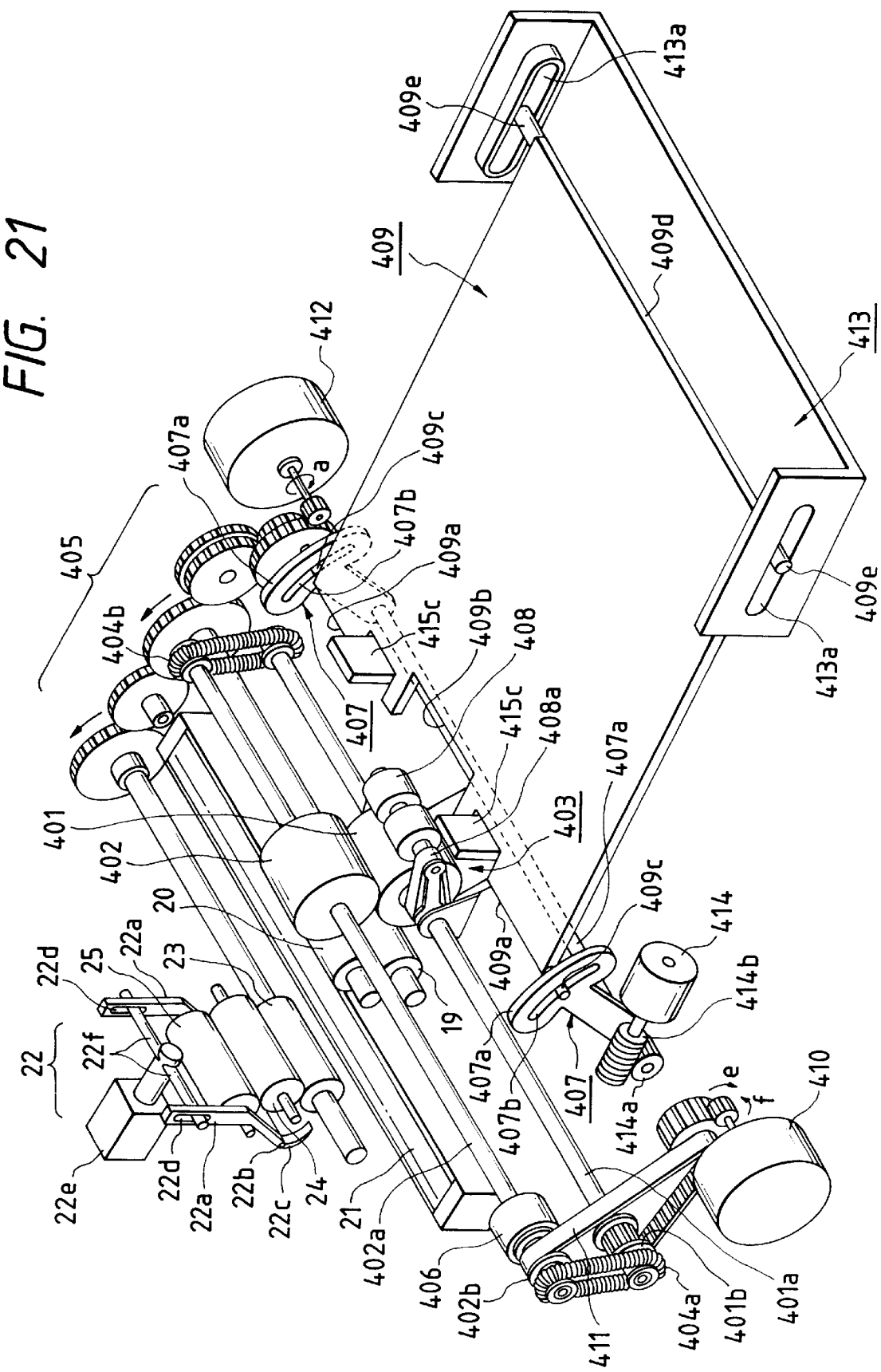
FIG. 21 is a perspective view showing an example of a sheet supply portion of the image forming apparatus having the sheet supplying apparatus.
Figure 22:
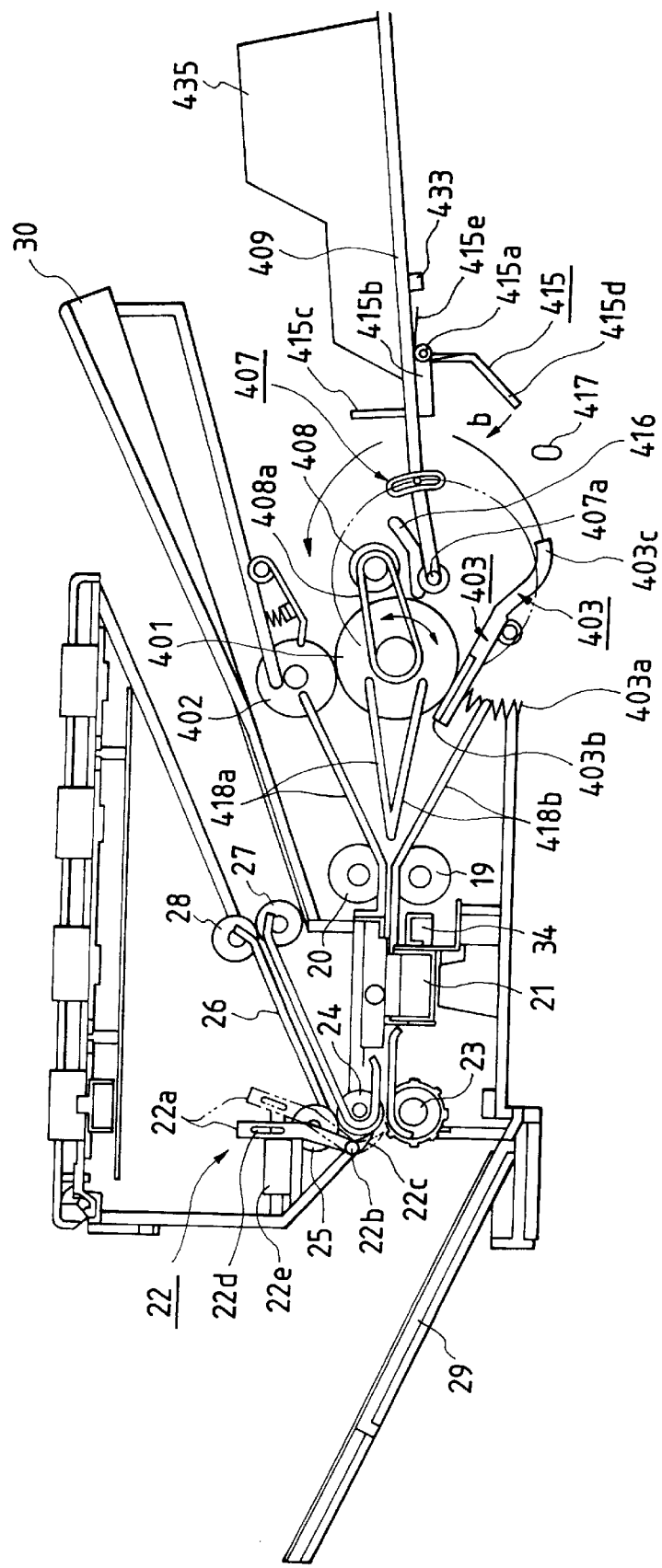
FIG. 22 is a sectional view of the sheet supply portion of the image forming apparatus having the sheet supplying apparatus.
Figure 23:
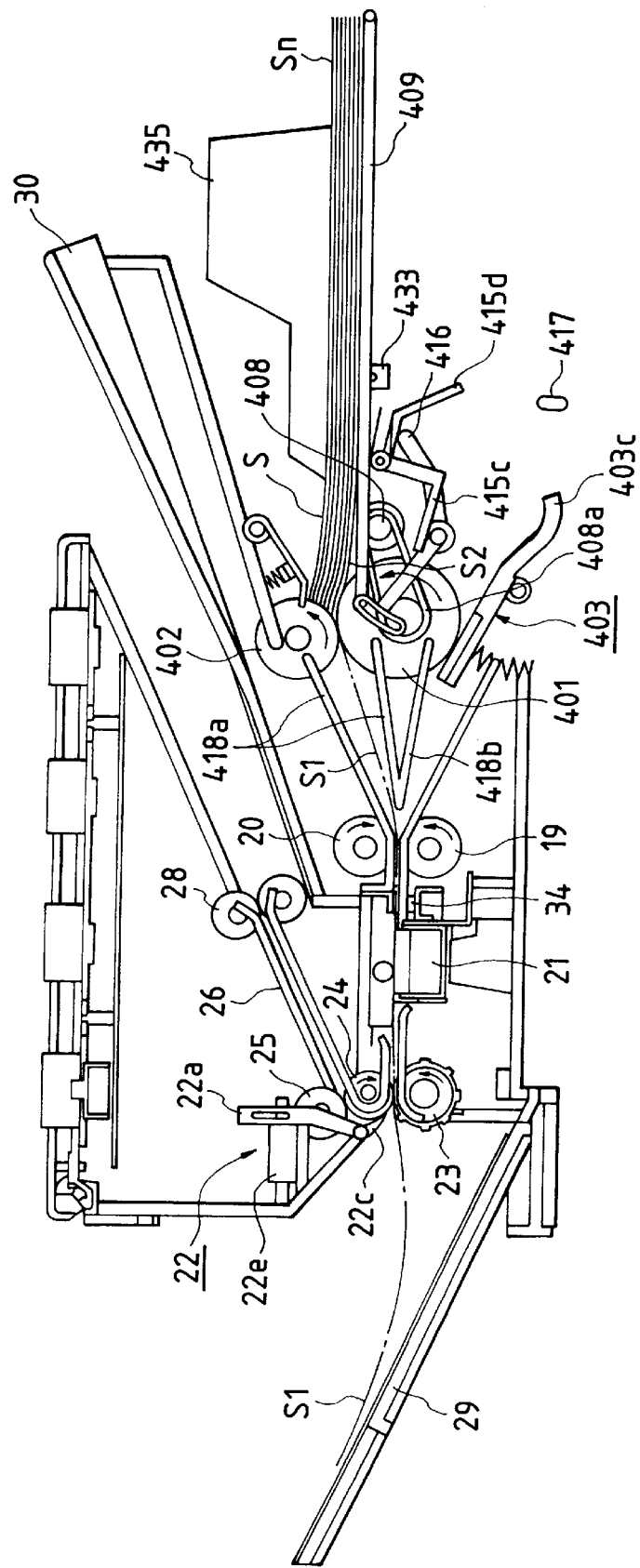
FIG. 23 is a sectional view of a sheet convey path in a lowermost sheet supply mode.
Figure 24A:
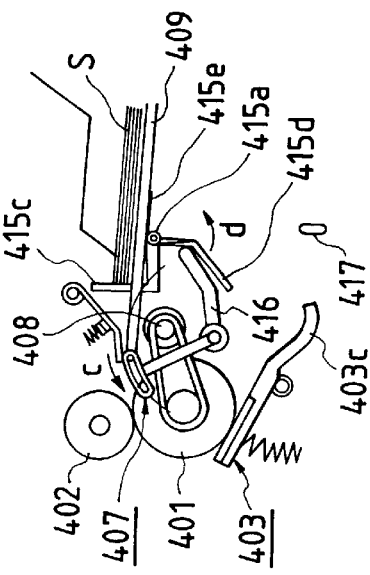
FIGS. 24A to 24D are explanatory views for explaining the lowermost sheet supply mode.

Next, a sheet supplying apparatus according to a seventh embodiment of the present invention and an image forming apparatus having such a sheet supplying apparatus and having a facsimile transmission function and a copying function will be fully explained with reference to the accompanying drawings. FIG. 20 is an elevational sectional view of the image forming apparatus having the sheet supplying apparatus according to the seventh embodiment, FIG. 21 is a perspective view of a sheet supply portion of the image forming apparatus having the sheet supplying apparatus, FIG. 22 is a sectional view of the sheet supply portion of the image forming apparatus having the sheet supplying apparatus, FIG. 23 is a sectional view showing a sheet convey path in a lowermost sheet supply mode, FIGS. 24A to 24D are explanatory views for explaining the lowermost sheet supply mode, FIG. 25 is a sectional view showing a sheet convey path in an uppermost sheet supply mode, and FIGS. 26A to 26E are explanatory views for explaining the uppermost sheet supply mode.

(Entire Construction)

First of all, the entire construction of the image forming apparatus having the sheet supplying apparatus according to the present invention will be explained with reference to FIG. 20. In FIG. 20, an original supply portion (sheet supply means) 447 serves to supply sheet-like originals S (formed from a paper sheet, a synthetic resin film or the like) stacked on an original stacking plate (sheet stacking means) 9, and an image reading portion 448 has an image sensor of close contact type (image reading means) 21 for reading image information on the original S supplied from the original supply portion 447. There are provided original discharge trays 29, 30 on which the originals S are discharged after the image information was read by the image reading portion 448.

Next, an original supplying mechanism of the sheet supplying apparatus will be fully explained. In FIGS. 21 and 22, a separation roller (first rotary member) 401 is secured to a shaft 401a. The separation roller 401 receives a rotational driving force from a motor (drive source) 410 through the shaft 401a, a belt 411 and the like to be rotated in a normal direction or a reverse direction.

A reverse rotation roller (second rotary member) 402 disposed above the separation roller 401 and contacted with the latter is secured to a shaft 402a. The rotational driving force from the motor 410 is transmitted to the reverse rotation roller 402 through a torque limiter 406 provided on the shaft 402a, the belt 411 and the like so that the reverse rotation roller is rotated in a direction opposite to the separation roller 401.

Further, the shaft 402a of the reverse rotation roller 402 is disposed at a downstream side of the shaft 401a of the separation roller 401 in an original supplying direction so that, when the originals are separated, a contact area between the original S and the separation roller 401 is increased, thereby increasing a conveying force of the separation roller 401. The separation roller 401 and the reverse rotation roller 402 are made of the same rubber material of silicone group.

Both ends of the shafts 401a, 402a of the separation roller 401 and of the reverse rotation roller 402 are biased to approach to each other by springs 404a, 404b. Pulleys 401b, 402b are secured to the shafts 401a, 402a, respectively. The rotational driving force of the motor 410 is transmitted to the pulleys 401b, 402b through the belt 411. Accordingly, when the motor 410 is rotated, the separation roller 401 and the reverse rotation roller 402 are rotated in opposite directions to frictionally sliding with each other. Since the biasing acting on the ends of the shafts 401a, 402a near the belt 411 differs from the biasing force acting on the other ends of the shafts 401a, 402a due to the tension of the belt 411, the springs 404a, 404b have the different spring constants.

A separation member 403 is disposed below the separation roller 401 and is urged against the separation roller 401 by a spring 403a. A pad 403b made of natural rubber is adhered to a surface portion of the separation member 403 opposed to the separation roller 401. Further, a slope 403c formed on an end of the separation pad 403 at an upstream side in the original supplying direction serves to direct the original S to a separation portion constituted by the separation roller 401 and the separation member 403.

An auxiliary supply roller 408 acting as an auxiliary sheet supply rotary member (auxiliary sheet supply means) is connected to the shaft 401a of the separation roller 401 via a belt 408a and is rotated by the motor 410 in the same direction as the separation roller 401.

An original stacking plate (sheet stacking plate) 409 constituting a sheet stacking means has a notch 409b in a confronting relation to the separation roller 401, reverse rotation roller 402 and auxiliary supply roller 408. By the provision of the notch 409b, when a supply end 409a of the original stacking plate 409 approaches the separation portion constituted by the separation roller 401 and the reverse rotation roller 403, the lowermost original S rested on the original stacking plate 409 can be contacted with the auxiliary supply roller 408.

Pins (engagement members) 409c are protruded from both lateral edges of the supply end 409a of the original stacking plate in directions perpendicular to the original supplying direction, which pins 409c are freely received in arcuate slots 407b (having a predetermined length) formed in link members 407 along their rotational directions. The link members 407 constitute a link mechanism rotatable around a support shaft 407a. Accordingly, the supply end 409a of the original stacking plate 409 can be rocked within the lengths of the slots 407b of the link members 407.

Further, pins (engagement members) 409e are protruded from both lateral edges of an original insertion end 409d of the original stacking plate 409 in directions perpendicular to the original supplying direction, which pins 409e are freely received in substantially horizontal slots 413a (having a predetermined length) formed in a guide member 413 secured to a frame of the apparatus. Accordingly, the original insertion end 409d of the original stacking plate 409 can be shifted within the lengths of the slots 407b of the guide member 413.

As mentioned above, the link members 407 engaged by the supply end 409a of the original stacking plate 409 and the guide member 413 engaged by the original insertion end 409d of the original stacking plate 409 constitute a shifting means for supporting the sheet stacking means for shifting movement to a predetermined position.

A worm gear 414a is secured to one end of the support shaft 407a rotatably supporting the link members 407, which worm gear is meshed with a worm 414b secured to an output shaft of a motor 414. Accordingly, by driving the motor 414, the link members 407 are rotated around the support shaft 407a to shift the original stacking plate 409 to the predetermined position.

In response to the rotational movements of the link member 407, the supply end 409a of the original stacking plate 409 is rocked along an ark having a radius of curvature corresponding to a distance between the support shaft 407a and the slots 407b. The rotation direction of the link members 407 corresponds to the rotational direction of the separation roller 401, so that the original stacking plate 409 is shifted by driving the motor 414 to direct the supply end 409a to the upper separation portion constituted by the separation roller 401 and the reverse rotation roller 402 or to the lower separation portion constituted by the separation roller 401 and the separation member 403.

The motor 414 is a stepping motor, and, thus, by counting the number of pulses, the position of the original stacking plate 409 can be controlled. The pulse data for shifting the original stacking plate 409 is previously stored in a memory provided in a control portion (not shown) of the apparatus, and the position control of the original stacking plate 409 is effected on the basis of the pulse data.

A motor 412 is a drive source for rotatingly driving an original supply roller 19 disposed at a downstream side of the separation roller 401 and an original discharge roller 23 disposed at a downstream side of the original supply roller 19, and a driving force of the motor 412 is transmitted to the respective rollers through a gear train 405. The motor 412 is rotated only in a direction shown by the arrow a in FIG. 21 to convey the original in the downstream side exclusively. Accordingly, regardless of the rotational direction of the motor 410 for driving the separation portion, the motor 412 is rotated in the predetermined direction to convey the original S toward the downstream side.

An original regulating member (sheet regulating member) 415 constituting a sheet regulating means is rotatably supported on a shaft 415a below the original stacking plate 409. One end of the original regulating member 415 is provided at its one end with an abutment portion 415b which can abut against a lower surface of the original stacking plate 409, and protruded portions 415c connected to the abutment portion 415b substantially in perpendicular to the abutment portion and protruded perpendicular to a surface of the original stack S rested on the original stacking plate 409. The other end of the original regulating member 415 has an engagement portion 415d positioned below the original stacking plate 409.

A torsion coil spring (spring member; elastic member) 415e is supported on the shaft 415a. One end of the torsion coil spring 415e abuts against the lower surface of the original stacking plate 409 and the other end of the torsion coil spring 415e is locked to the engagement portion 415c of the original regulating member 415. As shown in FIG. 22, when the abutment portion 415b of the original regulating member 415 abuts against the lower surface of the original stacking plate 409, the torsion coil spring 415e provides a predetermined biasing force to always bias the original regulating member 415 toward a direction shown by the arrow b in FIG. 22 around the shaft 415a.

With the arrangement as mentioned above, the protruded portions 415c of the original regulating member 415 are normally protruded from the surface of the original stacking plate 409 by the biasing force of the torsion coil spring 415e, thereby regulating the tip ends of the originals S stacked on the original stacking plate 409 to prevent the tip ends of the originals from advancing toward the downstream side from the protruded portions 415c.

Further, although explaining in connection with FIGS. 24A to 24D and 26A to 26E, when the engagement portion 415d is engaged by stoppers (first and second lock members) 416, 417 provided on the frame of the apparatus and is depressed in a direction opposite to the direction b in FIG. 22 in opposition to the biasing force of the torsion coil spring 415e, the original regulating member 415 is rotated around the shaft 415a in the direction opposite to the direction b in FIG. 22, with the result that the protruded portions 415c are retracted below the surface of the original stacking plate 409 to release the restraint of the tip ends of the originals S, thereby permitting the advancing of the originals S into either of the separation portions.

A back-up roller 20 is disposed in a confronting relation to the original supply roller 19 and is urged against the original supply roller 19 by a biasing means such as a spring (not shown). The original S separated in either of the separation portions is introduced into and pinched by a nip between the original supply roller 19 and the back-up roller 20 through a pair of upper guides 418a and a pair of lower guides 418b. Then, the original is sent to a downstream image sensor 21 of close contact type (image reading means) by the original supply roller 19 and the back-up roller 20.

(Operation in Various Modes)

Next, an operation of the sheet (original) supplying apparatus having the above construction will be fully explained. FIGS. 23 to 24D show the operation of the sheet supplying apparatus in a facsimile transmission mode, and FIGS. 25 to 26E show the operation of the sheet supplying apparatus in a copy mode.

(Facsimile Transmission Operation)

First of all, the operation of the apparatus in the facsimile transmission will be described with reference to FIGS. 23 to 24D. In FIG. 23, first of all, the originals S are arranged in page sequence to form an original bundle. Then, the original bundle is rested on the original stacking plate 409 with the imaged surfaces facing downside (face-down), and the originals S are aligned with each other by shifting the original slider 435 in the width-wise direction of the original S.

As shown in the flow chart of FIG. 9, immediately after the originals S are inserted, the presence of the original S is detected by an original presence/absence sensor DS (document sensor) 433 (step S1), with the result that the original treatment waiting signal is sent to the control portion (not shown) of the apparatus. In this case, the control portion (not shown) of the apparatus is in a waiting condition for waiting the facsimile transmission operation or the copying operation (step S2). Further in this case, the original stacking plate 409 is also in the waiting condition as shown in FIG. 24A.

This waiting condition is a key input waiting condition and is displayed on an LCD (liquid crystal display) panel on the operation portion. After the original reading mode or the original transmitting mode is selected by the function keys, when the particular receiver is determined by the ten-key or the one-touch key (step S3), the facsimile transmission mode (step S4) is obtained. When the start key is depressed (step S5), the facsimile transmission operation is started.

Figure 24B:
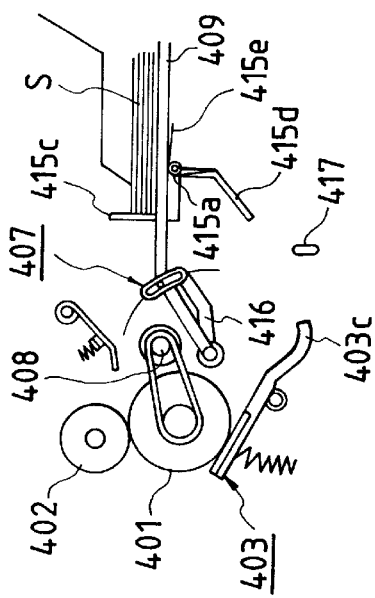
Figure 25:
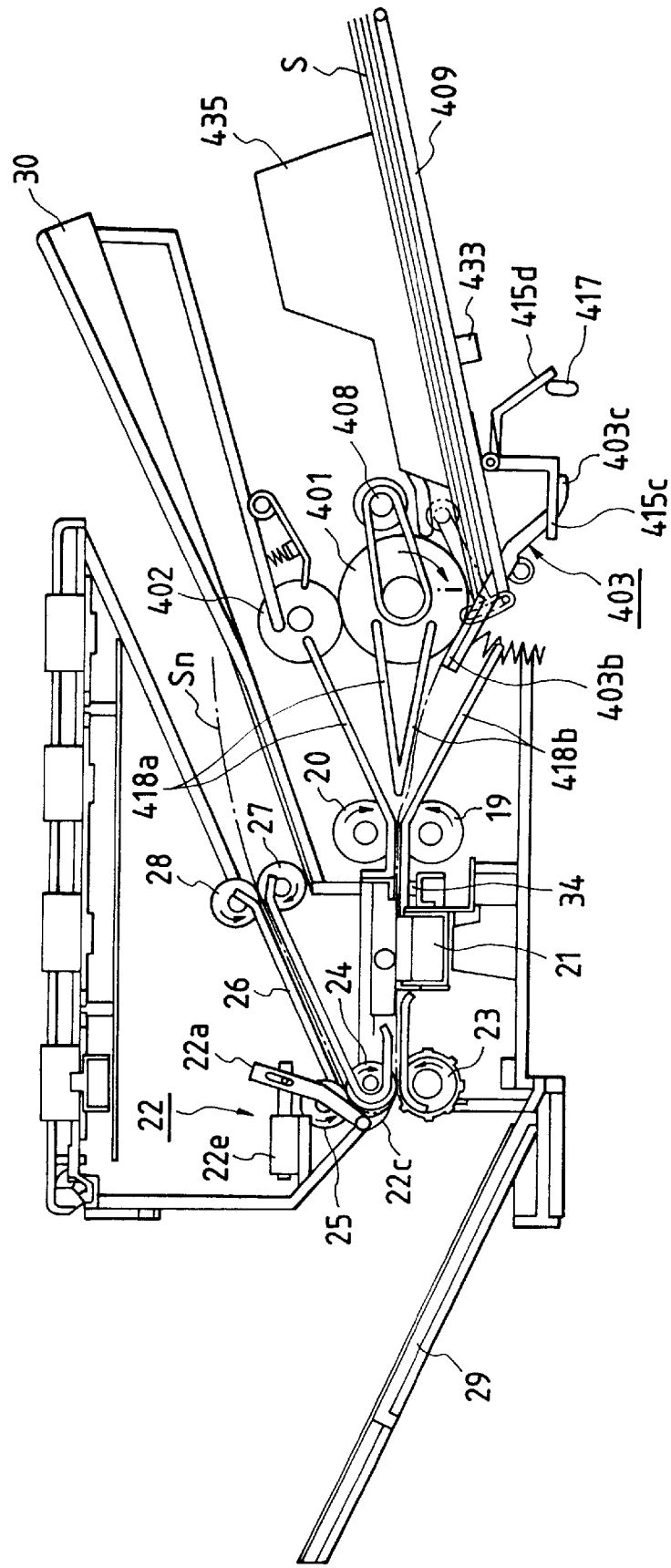
FIG. 25 is a sectional view of the sheet convey path in an uppermost sheet supply mode.

In this case, the motor 414 is rotated to rotate the link members 407 in a direction shown by the arrow c in FIG. 24B, thereby shifting the supply end 409a of the original stacking plate 409 toward a top of a peripheral surface of the separation roller 401 (FIG. 24B). In this case, after each link member 407 is passed through a top of the corresponding arc, each link member starts to be lowered toward the separation roller 401, with the result that the supply end 409a of the original stacking plate 409 rides over the auxiliary supply roller 408.

Figure 24C:
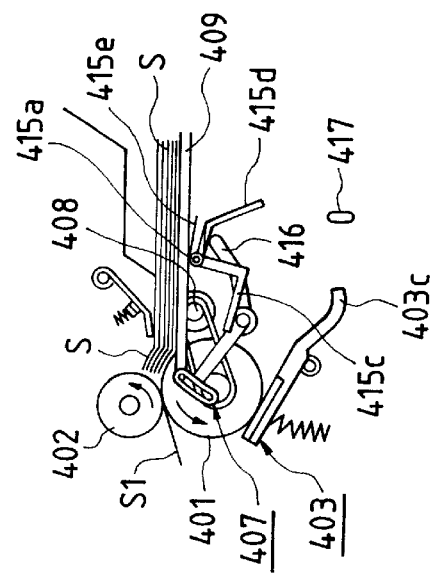
Figure 24D:
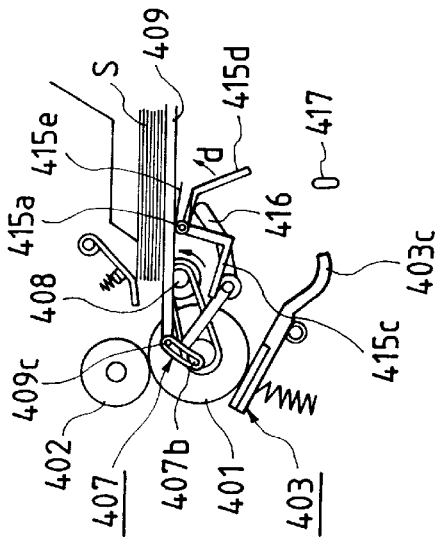

Further, when the link member 407 are rotated in the direction c in FIG. 24B, the engagement portion 415d of the original regulating member 415 abuts against the stopper 416 to be pushed in opposition to the biasing force of the torsion coil spring 415e, with the result that the original regulating member 415 is rotated in a direction shown by the arrow d in FIGS. 24B and 24C around the shaft 415a to retract the protruded portions 415c below the upper surface of the original stacking plate 409, thereby releasing the restraint of the tip ends of the originals S (FIG. 24C).

When the peripheral surface of the auxiliary supply roller 408 is protruded from the upper surface of the original stacking plate 409 through the notch 409b of the supply end 409a to be contacted with the lowermost original S (FIG. 24C), the motor 414 is stopped to stop the original stacking plate 409.

In this case, since the lowermost original S is urged by the auxiliary supply roller 408, the supply end 409a of the original stacking plate 409 tends to be lifted. However, as shown in FIG. 24C, since the pins 409c provided on the supply end 409a of the original stacking plate 409 are locked by the ends of the slots 407b of the link members 407, the lifting movement of the supply end 409*a* of the original stacking plate 409 is prevented. Further, by the restoring force of the torsion coil spring 415*e* disposed between the engagement portion 415*d* of the original regulating member 415 and the lower surface of the original stacking plate 409, the supply end 409*a* of the original stacking plate 409 is biased upwardly. By the aforementioned actions, the supply end 409*a* of the original stacking plate 409 is positioned at the optimum position with respect to the separation portion constituted by the separation roller 401 and the reverse rotation roller 402.

Then, the motor 410 is rotated in a direction shown by the arrow e in FIG. 21 to rotate the auxiliary supply roller 408, thereby guiding the originals S to the separation portion constituted by the separation roller 401 and the reverse rotation roller 402 (FIG. 24D). The lowermost original S directly contacted with the separation roller 401 is conveyed toward the downstream side through the nip between the separation roller 401 and the reverse rotation roller 402, and the other originals S on the lowermost original are returned by the reverse rotation roller 402. By this separating action, only the lowermost original is separated (from the other originals) and is supplied.

In FIG. 23, the lowermost original S separated by the separation roller 401 and the reverse rotation roller 402 is guided by the pair of upper guides 418*a* and is pinched between the original supply roller 19 and the back up roller 20. When the original is further conveyed, the tip end of the lowermost original S1 is detected by the original edge sensor 34 disposed between the original supply roller 19 and the image sensor 21 of close contact type. From the time when the tip end of the original S1 is detected, the motor 412 is rotated by the predetermined number of steps (pulses) to convey the tip end of the original S1 to the reading position where the image sensor 21 of close contact type is positioned. While the original S1 is being conveyed at a predetermined speed by the original supply roller 19 and the back-up roller 20, the image information on the original S1 is read by the image sensor 21 of close contact type, and the image information is binary-coded in the control portion (not shown) of the apparatus and then is stored in the memory.

After reading, the original S1 is pinched between the original discharge roller 23 and the discharge back-up roller 24 to be advanced as it is, and is discharged onto the original discharge tray 29 with the imaged surface facing downside. When a trail end of the first original S1 leaves the separation portion constituted by the separation roller 401 and the reverse rotation roller 402, the separation roller 401 contacts with a second original S2, with the result that the second original S2 is separated from the original stack S. Then, as is in the first original S1, the second original is conveyed toward the downstream side, and image information on the second original is read by the image sensor 21 of close contact type. Then, the second original is discharged onto the first original S1 on the original discharge tray 29 with the imaged surface facing downside.

Similarly, the other originals are similarly conveyed and read, and then are discharged onto the previously discharged original on the discharge tray with the imaged surface facing downside. In this way, the originals S are stacked on the original discharge tray 29 in the page sequence.

Before the image information on all of the originals S is read, the image data of the original(s) S is transferred to the receiver's facsimile selected by the one-touch key or the ten-key, through an image signal transferred means (facsimile circuit including a modem) (not shown) of the apparatus.

On the other hand, in the direct transmission, immediately after the start key is depressed, the facsimile circuit connecting operation is started. When the circuit connection is completed and the pre-treatment is finished, the original supplying operation and the reading operation are started. In this case, the memory transmission is established. The image data for several lines is accumulated in a buffer (not shown), and the image data for several lines are successively transferred in dependence upon the receiver's modem speed and/or transmission circuit condition, while sometimes effecting the fall-back.

After the image information of the uppermost original Sn among the original stack S rested on the original stacking plate 409 was read, when the facsimile transmission is completed and the transmission circuit is disconnected, the uppermost original (last page original) Sn is discharged onto the original discharge tray 29. After the completion of the transmission, the motor 414 is rotated by predetermined pulses to restore the waiting condition shown in FIG. 24A. In this way, the facsimile transmission operation is finished.
(Copying Operation)

Next, the copying operation will be explained with reference to FIGS. 25 to 26E. As is in the facsimile transmission operation, also in the copying operation, in FIGS. 26A to 26E, first of all, the originals S are arranged in page sequence to form an original bundle. Then, the original bundle is rested on the original stacking plate 409 with the imaged surfaces facing downside (face-down), and the originals S are aligned with each other by shifting the original slider 435 in the width-wise direction of the original S.

When the presence of the original S is detected by an original presence/absence sensor 433 (step S1), the apparatus becomes the waiting condition for selecting the operation mode (step S2), and the waiting condition is displayed on the LCD panel. When the copy key is depressed, the copy mode (step S6) is selected, thereby starting the copying operation. In this case, if the ten-key or the one-touch key is depressed, the above-mentioned facsimile transmission operation is effected.

In the step S2 in FIG. 9, after the copy key is depressed, since the fact that the number of sheets (copy number) should be inputted is displayed on the LCD panel, the operator inputs the number of sheets by using the ten-key (step S7). Then, when the start key is depressed (step S8), the motor 412 is rotated in the same direction (direction a in FIG. 21) as is in the facsimile transmission operation, and the motor 410 is rotated in a direction (direction f in FIG. 21) opposite to that in the facsimile transmission. Further, the solenoid 22*e* is not operated, with the result that the flapper 22*a* is maintained in a condition shown in FIG. 25. In this condition, the original S can be U-turned by the pawl portion 22*c* of the flapper 22*a* to be directed to the original path 26, and then can be discharged onto the original discharge tray 30.

Figure 26A:
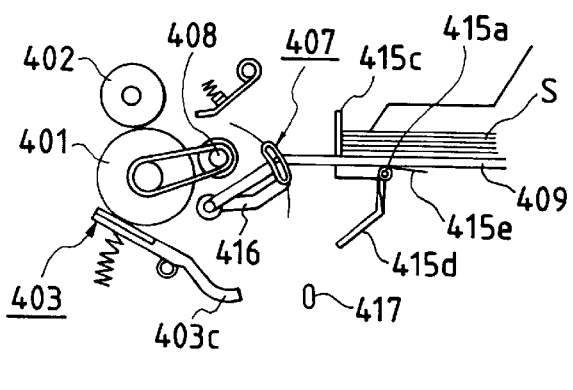
FIGS. 26A to 26E are explanatory views for explaining the uppermost sheet supply mode.
Figure 26B:
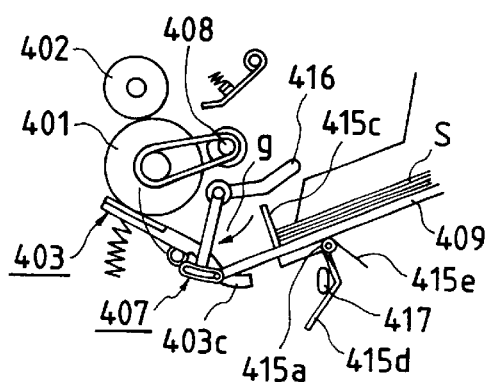

Then, the motor 414 is rotated to rotate the link members 407 from the waiting condition shown in FIG. 26A to in a direction shown by the arrow g in FIG. 26B, thereby shifting the supply end 409*a* of the original stacking plate 409 to the lower end of the peripheral surface of the separation roller 401. In this case, the original stacking plate 409 is inclined by a predetermined angle. At this point, the tip ends of the originals S on the original stacking plate 409 is regulated by the protruded portions 415*c* of the original regulating member 415, so that the originals S cannot be slid down along the inclined original stacking plate 409 by their own weights (FIG. 26B).

Figure 26C:
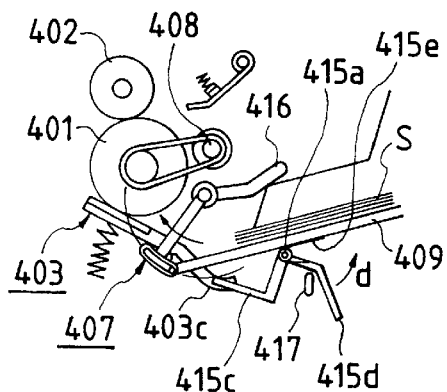

When the link members 407 are further rotated to pass through the tops of the arcs and start to be lowered, the engagement portion 415d of the original regulating member 415 abuts against the second stopper 417 (FIG. 26B), thereby rotating the original regulating member 415 around the shaft 415a in a direction shown by the arrow d in FIG. 26C, with the result that the protruded portions 415c is retracted below the upper surface of the original stacking plate 409, thereby releasing the restraint of the tip ends of the originals S (FIG. 26C).

As a result, the original stack S rested on the original stacking plate 409 is slid down toward the supply end 409a along the inclined original stacking plate 409 by its own weight. Then, the tip end of the original stack S is contacted with the separation member 403 through the notch 409b formed in the supply end portion 409a of the original stacking plate 409 and then is guided by the slope 403c formed on the separation member 403 to be directed to the separation portion constituted by the separation roller 401 and the separation member 403 (FIG. 26D).

In this case, when the pins 409c of the supply end 409a of the original stacking plate are locked (stopped) by the lower ends of the slots 407b of the link members 407 by the weight of the original stack S, since the engagement portion 415d abuts against the stopper 417, the restoring force of the torsion coil spring 415e acts on the lower surface of the original stacking plate 409, thereby biasing and shifting the original stacking plate 409 upwardly.

Figure 26D:
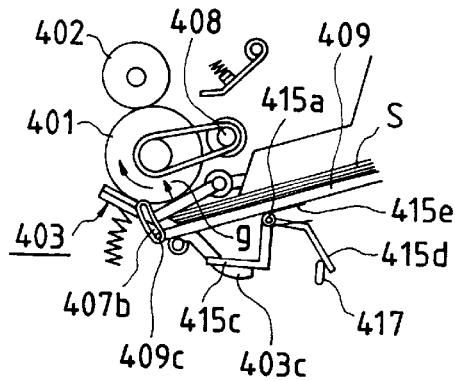
Figure 26E:
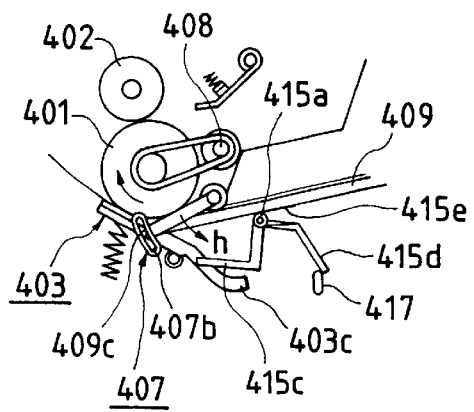

When the link members 407 are further rotated in the direction g in FIG. 26D to shift the original stacking plate 409 up to a position where the tip end of the original stack S is contacted with the lower peripheral surface of the separation roller 401 (FIG. 26E), the motor 414 is rotated in the reverse direction by a predetermined number of pulses to rotate the link members 407 in a direction shown by the arrow e in FIG. 26E. When the pins 409c of the supply end 409a of the original stacking plate reach a position spaced apart from the upper end of the slot 407b of the link member 407 by a predetermined distance, the motor 414 is stopped, thereby keeping the link members 407 stationary (FIG. 26E).

By stopping the link members 407 in the condition as shown in FIG. 26E, it is possible to shift the original stacking plate 409 upwardly in response to the reduction of the number of the originals S on the original stacking plate 409. That is to say, since the pins 409c of the supply end 409a of the original stacking plate can be freely lifted in the slots 407b of the link members 407 to some extent, by the restoring force of the torsion coil spring 415e disposed between the original regulating member 415 and the lower surface of the original stacking plate 409, the supply end 409a of the original stacking plate is always biased upwardly with the predetermined force.

Accordingly, as the number of the originals S on the original stacking plate 409 is decreased, the upper level of the original stack is lowered, with the result that the contact pressure between the separation roller 401 and the original is gradually decreased and the weight of the original stack on the original stacking plate 409 is gradually decreased. However, since the original stacking plate 409 is lifted correspondingly by the restoring force of the torsion coil spring 415e, the contact pressure between the uppermost original S on the original stacking plate 409 and the separation roller 401 can be kept substantially constant.

In this way, the supply end 409a of the original stacking plate is positioned at the optimum position with respect to the separation portion constituted by the separation roller 401 and the separation member 403 (FIG. 26E). Further, even when the number of the originals is relatively small and the weight of the original stack is relatively small, since the original stacking plate 409 is biased toward the separation roller 401 by the restoring force of the torsion coil spring 415e and the pins 409c of the supply end 409a can be shifted along the slots 407b, the upper surface of the original stack S can always be contacted with the lower portion of the separation roller 401 (FIG. 26E).

In FIG. 25, when the motor 410 is rotated in the direction F in FIG. 25, the separation roller 401 is rotated in a direction shown by the arrow i in FIG. 25. In this condition, when the originals S enter into the separation portion constituted by the separation roller 401 and the separation member 403, only the uppermost original directly contacted with the separation roller 401 is conveyed toward the downstream side, and the other originals S (other than the uppermost original) are stopped by the pad 403b of the separation member 403 (by the friction force of the pad 403b) without being conveyed together with the uppermost original.

The uppermost original (last page) Sn separated by the separation roller 401 and the separation member 403 is guided by the pair of lower guides 418b and then is pinched between the original supply roller 19 and the back-up roller 20 to further conveyed toward the downstream side. As is in the facsimile transmission operation, the image information on the original Sn is read by the image sensor 21 of close contact type. Then, the original is pinched between the original discharge roller 23 and the discharge back-up roller 24. After the conveying direction of the original is changed by the flapper 22a, the original is pinched between the discharge back-up roller 24 and the auxiliary roller 25 to be U-turned. Thereafter, the original is passed through the original path 26 and then is discharged onto the original discharge tray 30 with the imaged surface facing upside by the original discharge roller 27 and the discharge back-up roller 28.

Similarly, the second and other originals are successively read by the image sensor and are discharged onto the previously discharged original on the discharge tray with the imaged surfaces facing upside. Thus, the discharged originals are stacked on the tray from the last page to the first page. When the image information on all of the originals S is read, eventually, the originals are stacked on the original discharge tray 30 in the page sequence.

An image corresponding to the image information on the original S read by the image sensor 21 of close contact type is recorded on a recording sheet P supplied from either of a record cassettes by means of corresponding recording sheet supply means, at an image forming portion (image forming means) provided in the apparatus shown in FIG. 20.

Figure 27:
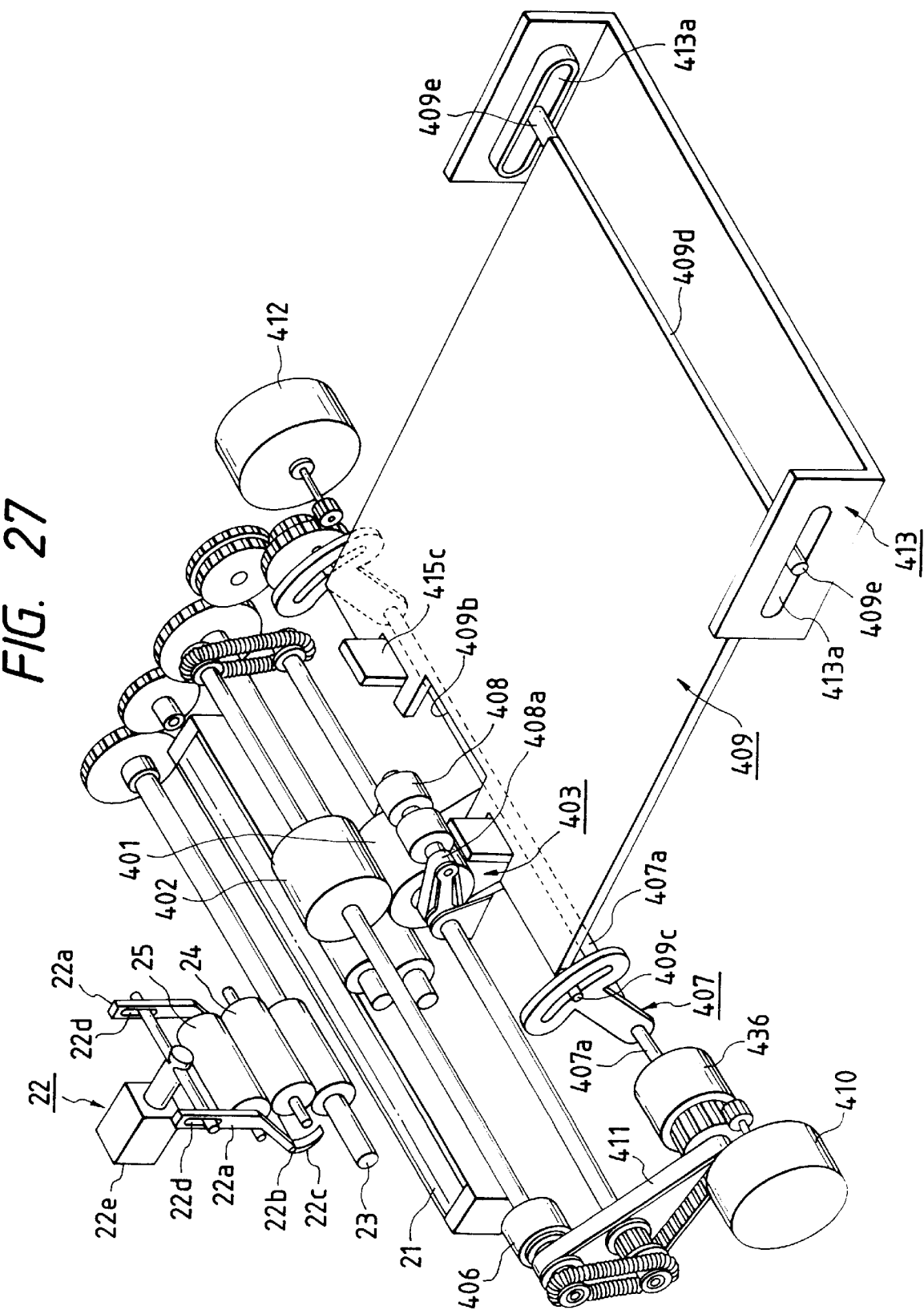
FIG. 27 is a perspective view showing a sheet supply portion of an image forming apparatus having a sheet supplying apparatus according to an eighth embodiment of the present invention.
Figure 28:
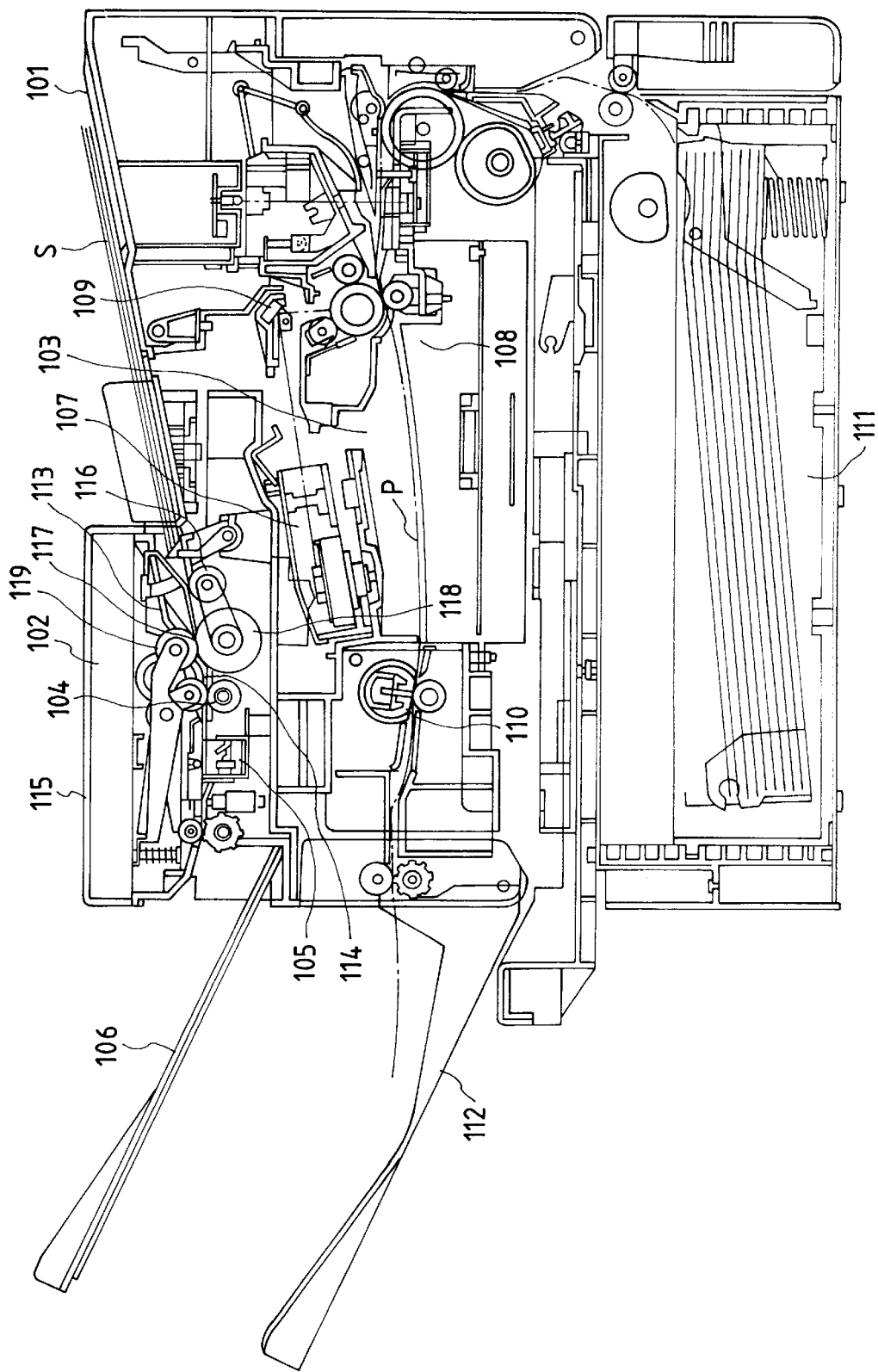
FIG. 28 is an elevational sectional view of a conventional recording apparatus having a sheet supplying apparatus.

Next, a sheet supplying apparatus according to an eighth embodiment of the present invention will be explained with reference to FIG. 27. Incidentally, the same elements as those in the seventh embodiment are designated by the same reference numerals and explanation thereof will be omitted. In FIG. 27, according to the eighth embodiment, the link members 407 are rotated by the motor 410. In this embodiment, an electromagnetic clutch (clutch means) 436 is disposed between the motor 410 and the shaft 407a around which the link members 407 are rotated so that the driving force from the motor 410 can be transmitted or interrupted with respect to the link members 407. When the driving force is interrupted, the link members 407 can be maintained in their present position.

When the electromagnetic clutch 436 is activated (engaged) and the motor 410 is rotated in the predetermined direction, the link members 407 are rotated, thereby shifting the original stacking plate 409 in dependence upon the uppermost sheet supply mode or the lowermost sheet supply mode, as is in the seventh embodiment. In this case, since the separation roller 401 and the link members 407 are rotated in the same direction in synchronous with each other, the separation roller 401 is rotated in the same direction as the link members. Further, the motor 410 is a stepping motor. Thus, after the electromagnetic clutch 436 is engaged, by counting the number of pulses of the motor 410, the position of the original stacking plate 409 can be controlled.

The pulse data for shifting the original stacking plate 409 and the timing for disengaging the electromagnetic clutch 436 are previously stored in the memory in the control portion (not shown) of the apparatus, and the position of the original stacking plate 409 is controlled on the basis of the data. The other constructions are the same as the seventh embodiment, thus obtaining the same advantage as the seventh embodiment.

Next, a sheet supplying apparatus according to a ninth embodiment of the present invention will be explained. Incidentally, the same elements as those in the seventh embodiment are designated by the same reference numerals and explanation thereof will be omitted. In the seventh embodiment, by changing the rotational amount of the link members 407, the contact pressure between the original S and the auxiliary supply roller 408 (that is, the conveying force of the auxiliary supply roller 408) can be changed. That is to say, if the delay conveyance of the tip end of the original stack S is detected by the original edge sensor 334 shown in FIGS. 22, 23 and 25 to determine "poor supply", the contact pressure between the original S and the auxiliary supply roller 408 is increased by lifting or lowering the original stacking plate 409. As a result, the conveying force acting on the original(s) S is increased, thereby preventing the poor supply.

Next, a sheet supplying apparatus according to a tenth embodiment of the present invention will be explained. Incidentally, the same elements as those in the seventh embodiment are designated by the same reference numerals and explanation thereof will be omitted. In the seventh embodiment, after the originals S are separated in the separation portion constituted by the separation roller 401 and the reverse rotation roller 402 shown in FIG. 23, if the conveying force of the auxiliary supply roller 408 is great, there is a danger of causing the double-feed of originals S.

In this case, according to the conventional techniques, the auxiliary supply roller 408 is designed so that it can be moved upwardly and downwardly to lower the auxiliary supply roller 408, or, a clutch means is provided so that a driving force transmitted to the auxiliary supply roller 408 is interrupted. To the contrary, in the tenth embodiment, since the original stacking plate 409 can be lifted and lowered by the link members 407, after the tip end of the original stack S is detected by the original edge sensor 434, the supply end 409a of the original stacking plate 409 is appropriately lifted to release the contact between the original stack S and the auxiliary supply roller 408, thereby reducing the conveying force. With this arrangement, the conveying force of the auxiliary supply roller 408 can be adjusted with simpler arrangement and without adding any element, in comparison with the conventional techniques.

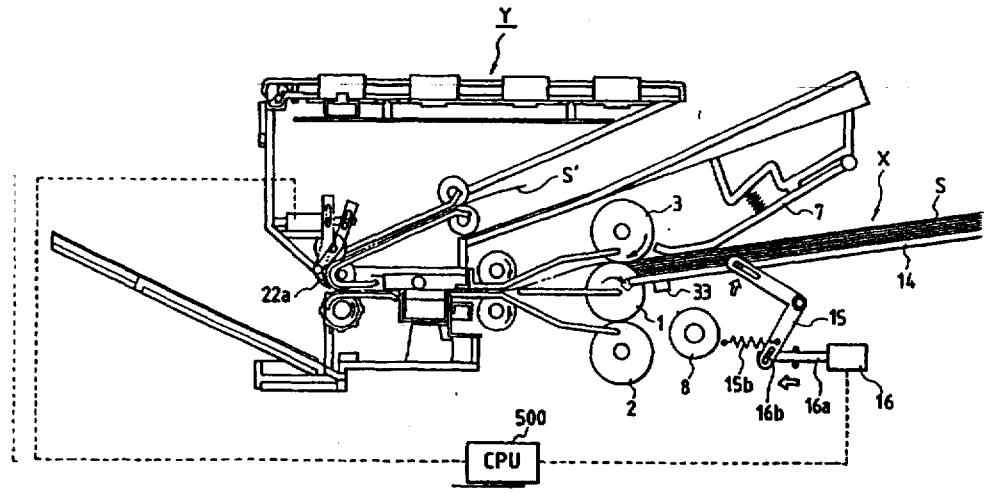

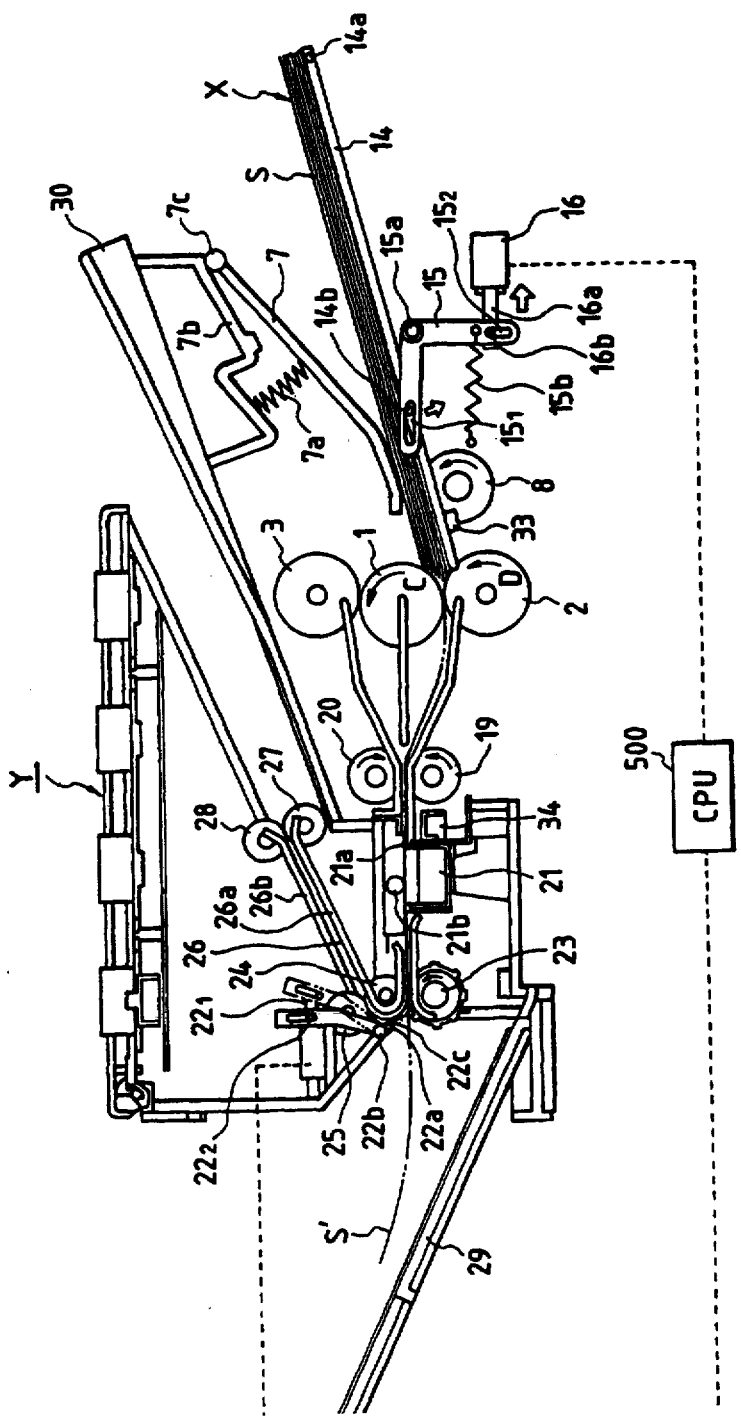

What is claimed is:

1. A sheet supplying apparatus comprising:
   a sheet stacking means for stacking a plurality of sheets;
   a first sheet supply roller for supplying an uppermost sheet of the plurality of sheets on said sheet stacking means;
   a second sheet supply roller for supplying a lowermost sheet of the plurality of sheets on said sheet stacking means;
   a separation roller disposed between said first and second sheet supply rollers for selectively cooperating with one of said first and second sheet supply rollers to pass a single sheet toward a predetermined direction and to separate the other sheets from the single sheet for return, wherein said first sheet supply roller, said second sheet supply roller and said separation roller are made of the same material, and a diameter of said separation roller is smaller than respective diameters of said first and second sheet supply rollers; and
   a controller for controlling:
   a first drive means for driving said separation roller and said first and second sheet supply rollers;
   a switching means for selectively connecting one of said first and second sheet supply rollers to said first drive means and for reversing a rotational direction of said separation roller; and
   a second drive means for shifting said sheet stacking means to position the sheets thereon at a predetermined position with respect to said first and second sheet supply rollers.

2. A sheet supplying apparatus comprising:
   a sheet stacking means for stacking a plurality of sheets;
   a first rotary sheet supply means for supplying an uppermost sheet of the plurality of sheets on said sheet stacking means;
   a second rotary sheet supply means for supplying a lowermost sheet of the plurality of sheets on said sheet stacking means;
   a rotary separation means disposed between said first and second rotary sheet supply means for selectively cooperating with one of said first and second rotary sheet supply means to pass a single sheet toward a predetermined direction and to separate the other sheets from the single sheet for return, wherein said first and second rotary sheet supply means and said rotary separation means are made of the same material;
   a first drive means for driving said rotary separation means and said first and second rotary sheet supply means;
   a switching means for selectively connecting one of said first rotary sheet supply means and said second rotary sheet supply means to said first drive means and for reversing a rotational direction of said rotary separation means; and
   a second drive means for shifting said sheet stacking means to position the sheets thereon at a predetermined position with respect to said first and second rotary sheet supply means, wherein said sheet stacking means is inclined so that the sheets on said sheet stacking means can enter into a nip between said first rotary sheet supply means and said rotary separation means and a nip between said second rotary sheet supply means and said rotary separation means by their own weights.

3. A sheet supplying apparatus comprising:
   a sheet stacking means for stacking a plurality of sheets;
   a first sheet supply roller for supplying an uppermost sheet of the plurality of sheets on said sheet stacking means;
   a second sheet supply roller for supplying a lowermost sheet of the plurality of sheets on said sheet stacking means;

a separation roller disposed between said first and second sheet supply rollers for selectively cooperating with one of said first and second sheet supply rollers to pass a single sheet toward a predetermined direction and to separate the other sheets from the single sheet for return, wherein said first sheet supply roller, said second sheet supply roller and said separation roller are made of the same material, and said first and second sheet supply rollers are disposed upstream of said separation roller in a sheet supplying direction; and a controller for controlling:
  a first drive means for driving said separation roller and said first and second sheet supply rollers;
  a switching means for selectively connecting one of said first and second sheet supply rollers to said first drive means and for reversing a rotational direction of said separation roller; and
  a second drive means for shifting said sheet stacking means to position the sheets thereon at a predetermined position with respect to said first and second sheet supply rollers.

4. A sheet supplying apparatus according to claim 3, wherein said sheet stacking means is shifted as a rocking movement.

5. A sheet supplying apparatus according to claim 3, wherein said separation roller is connected to said first drive means through a torque limiter.

6. A sheet supplying apparatus according to claim 3, wherein said first and second sheet supply rollers and said separation roller have substantially the same configuration.

7. A sheet supplying apparatus according to claim 3, further comprising:
  a first auxiliary convey means cooperating with said first sheet supply roller for feeding out the uppermost sheet, said first auxiliary convey means being disposed above said sheet stacking means;
  a second auxiliary convey means cooperating with said second sheet supply roller for feeding out the lowermost sheet, said second auxiliary convey means being disposed below said sheet stacking means; and
  said first and second auxiliary convey means are selectively connected to a third driving means through said switching means.

8. A sheet supplying apparatus according to claim 3, further comprising an auxiliary convey means cooperating with said second sheet supply roller for feeding out the lowermost sheet, said auxiliary convey means being disposed below said sheet stacking means and connected to a third driving means.

9. A sheet supplying apparatus according to claim 3, further comprising a stopper means for abutting against an uppermost sheet on said sheet stacking means to position said uppermost sheet so that said uppermost sheet on said sheet stacking means is positioned at a predetermined position with respect to said first sheet supply roller, and wherein said second drive means includes an elastic member for biasing the sheet on said sheet stacking means against said stopper means.

10. A reading apparatus comprising:
a sheet supplying apparatus according to one of claims 3–4, 5–9; and
an original reading means for reading image information on the sheet supplied from said sheet supplying apparatus.

11. A reading apparatus comprising:
a sheet supplying apparatus according to one of claims 3–5, 6–9;
an original reading means for reading image information on the sheet supplied from said sheet supplying apparatus;
a first convey means for discharging the sheet on which image information was read by said original reading means onto a first discharge tray;
a sheet convey path for reversing a front and rear surface of the sheet conveyed by said first convey means and for directing said sheet to a second discharge tray;
a convey path switching means for switching a convey direction of the sheet between said first discharge tray and said sheet convey path;
a second convey means disposed in said sheet convey path for conveying the sheet to said second discharge tray; and
a control means connected to said convey path switching means and adapted to drive said convey path switching means in accordance with said sheet supplying apparatus,
wherein when said sheet supplying apparatus supplies an uppermost sheet on said sheet stacking means, the sheet is discharged through said sheet convey path.

12. A reading apparatus comprising:
a sheet supplying apparatus according to claim 3; and
a reading means for reading the sheet supplied from said sheet supplying apparatus;
wherein the sheets are supplied from a lowermost sheet in a facsimile transmission mode, and the sheets are supplied from an uppermost sheet in a copy mode.

13. An image forming apparatus comprising:
a reading apparatus according to claim 12;
a recording means for recording an image on the read sheet onto a copy sheet; and
a transmission means for transmitting the image on the read sheet to an external apparatus.

14. A sheet supplying apparatus comprising:
a sheet stacking means for stacking a plurality of sheets;
a first sheet supply roller for supplying an uppermost sheet of the plurality of sheets on said sheet stacking means;
a second sheet supply roller for supplying a lowermost sheet of the plurality of sheets on said sheet stacking means;
a separation roller disposed between said first and second sheet supply rollers at a downstream side for selectively cooperating with one of said first and second sheet supply rollers to pass a single sheet toward a predetermined direction and to separate the other sheets from the single sheet for return; and
a controller for controlling:
  a first drive means for driving said separation roller and said first and second sheet supply rollers;
  a switching means for selectively connecting one of said first and second rotary sheet supply rollers to said first drive means and for reversing a rotational direction of said separation roller; and
  second drive means for shifting said sheet stacking means to position the sheets thereon at a predetermined position with respect to said first and second sheet supply rollers.

15. A sheet supplying apparatus comprising:
a sheet stacking means for stacking a plurality of sheets;
a first sheet supply roller for supplying an uppermost sheet of the plurality of sheets on said sheet stacking means;

a second sheet supply roller for supplying a lowermost sheet of the plurality of sheets on said sheet stacking means;

a separation roller disposed between said first and second sheet supply rollers and having a diameter smaller than the respective diameters of said first and second sheet supply rollers, said separation roller selectively cooperating with one of said first and second sheet supply rollers to pass a single sheet toward a predetermined direction and to separate the other sheets from the single sheet for return; and a controller for controlling:

a first drive means for driving said separation roller and said first and second sheet supply rollers;

a switching means for selectively connecting one of said first and second rotary sheet supply rollers to said first drive means and for reversing a rotational direction of said separation roller; and a second drive means for shifting said sheet stacking means to position the sheets thereon at a predetermined position with respect to said first and second sheet supply rollers.

* * * * *

UNITED STATES PATENT AND TRADEMARK OFFICE
CERTIFICATE OF CORRECTION

PATENT NO. : 5,887,867
DATED : March 30, 1999
INVENTOR(S) : Koji Takahashi et al.

It is certified that error appears in the above-identified patent and that said Letters Patent is hereby corrected as shown below:

The title page, should be deleted and substitute therefore the attached title page.

Figure 4A:
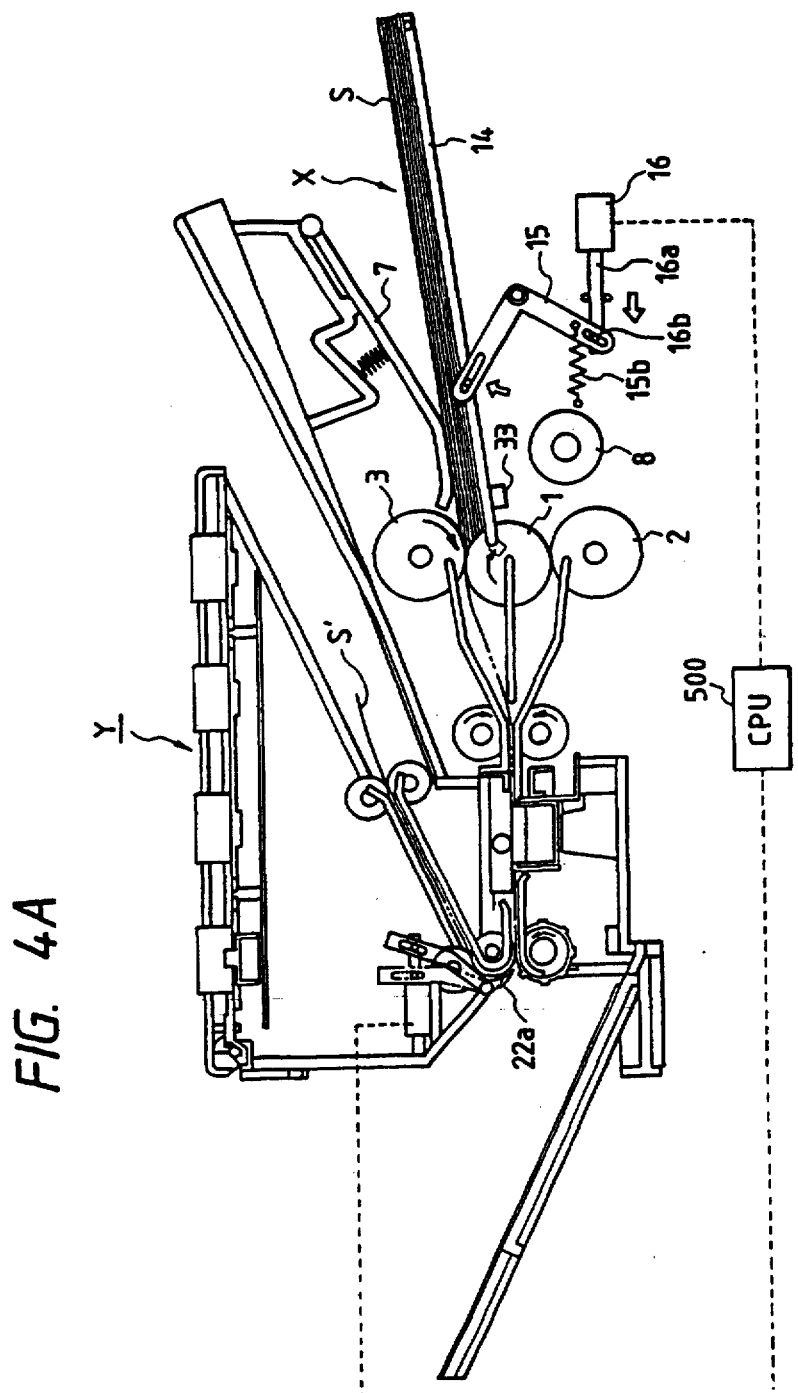
Figure 4B:
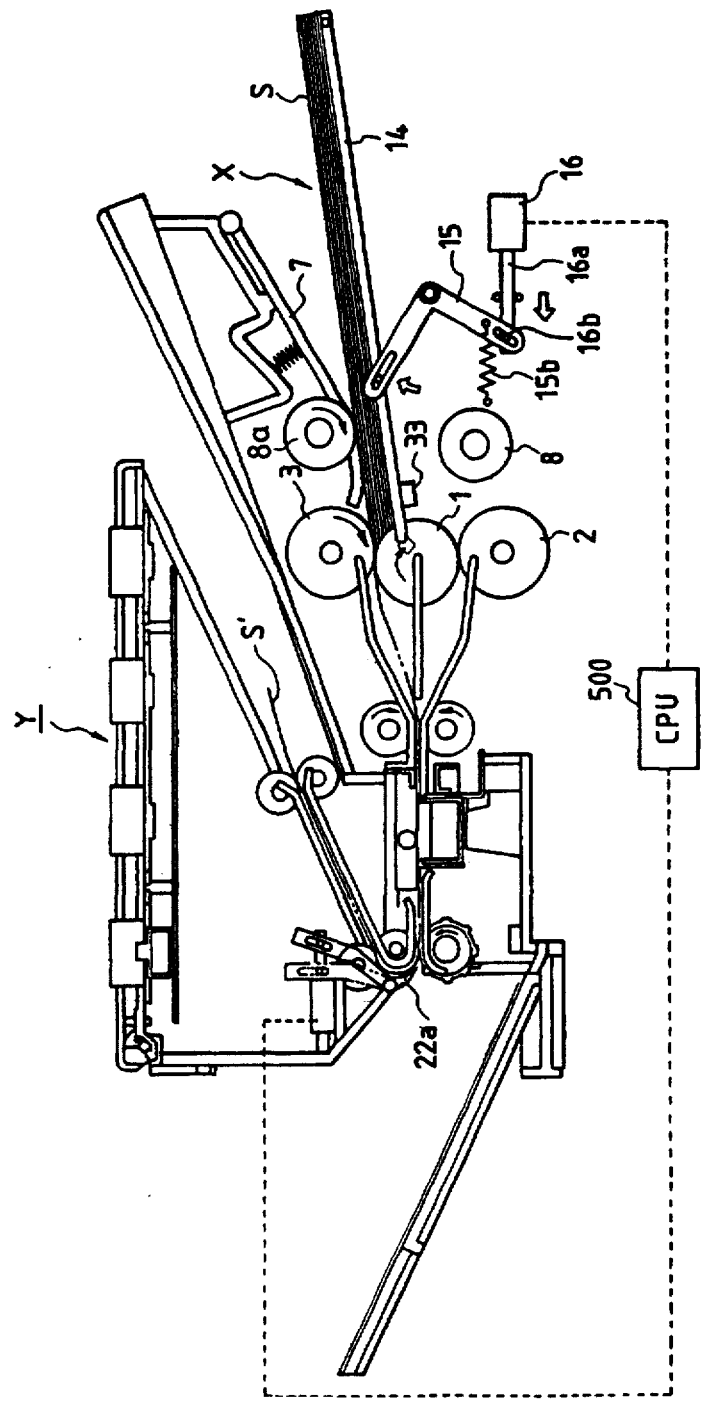

Delete Drawing Figs. 3 and 4 and substitute therefore the Drawing Sheets, consisting of Figs. 3, 4A and 4B as shown on the attached pages.

Drawings,
Sheet 3,
Figure 3, replace printed Figure 3 with attached Figure 3.

Sheet 4,
Figure 4, replace printed Figure 4 with attached Figure 4.
"FIG. 4" should read -- FIG. 4A and FIG. 4B --.

Column 2,
Line 19, "firstly" should read -- first --; and "lastly" should read -- last --.

Column 3,
Line 2, "pair" should read -- pairs --.
Line 4, "respectively" should read -- respectively, --.

Column 6,
Line 15, "sheet" should read -- sheet, --.
Line 54, "same" should read -- the same --.

Column 11,
Line 6, "FIG. 4 is an" should read -- FIGS. 4A and 4B are --; and "view" should read -- views --.

Column 12,
Line 8, close up right margin.
Line 9, close up left margin.

Column 18,
Line 60, "abut" should read -- abuts --.

Column 23,
Line 29, "can" (second occurrence) should read -- and can --.

Column 33,
Line 50, "does" should read -- do --.

UNITED STATES PATENT AND TRADEMARK OFFICE
CERTIFICATE OF CORRECTION

PATENT NO.     : 5,887,867
DATED          : March 30, 1999
INVENTOR(S)    : Koji Takahashi et al.

It is certified that error appears in the above-identified patent and that said Letters Patent is hereby corrected as shown below:

Column 34,
Line 9, "respectively" should read -- respectively, --.
Line 10, "roller" should read -- rollers --.

Column 38,
Line 46, "member" should read -- members --.

Column 40,
Line 8, "in dependence" should read -- depending --.
Line 55, "to" should be deleted.

Column 42,
Line 24, "to" should read -- to be --.

Column 43,
Line 5, "in synchronous" should read -- synchronously --.

Column 45,
Line 60, "3-4, 5-9;" should read -- 1-9; --.
Line 66, "3-5, 6-9;" should read -- 1-9; --.

Column 46,
Line 59, "second" should read -- a second --.

Signed and Sealed this

Eighteenth Day of December, 2001

Attest:

JAMES E. ROGAN
Attesting Officer        Director of the United States Patent and Trademark Office

United States Patent [19]
Takahashi et al.

[11] Patent Number: 5,887,867
[45] Date of Patent: Mar. 30, 1999

[54] SHEET SUPPLYING APPARATUS INCLUDING FIRST AND SECOND SHEET SUPPLY ROLLERS AND A SEPARATION ROLLER ALL MADE OF THE SAME MATERIAL

[75] Inventors: Koji Takahashi, Yokohama; Masaaki Saito; Masahiko Yokota, both of Tokyo, all of Japan

[73] Assignee: Canon Kabushiki Kaisha, Tokyo, Japan

[21] Appl. No.: 953,013

[22] Filed: Oct. 16, 1997

Related U.S. Application Data

[63] Continuation of Ser. No. 600,897, Feb. 13, 1996, abandoned.

[30] Foreign Application Priority Data

| Feb. 15, 1995 | [JP] | Japan | 7-026945 |
| Jun. 21, 1995 | [JP] | Japan | 7-154846 |
| Jul. 12, 1995 | [JP] | Japan | 7-175914 |

[51] Int. Cl.⁶ ............................... B65H 3/06
[52] U.S. Cl. ............... 271/117; 271/122; 271/127; 271/165
[58] Field of Search ............... 271/9.07, 9.08, 271/117, 122, 125, 126, 127, 162, 165

[56] References Cited

U.S. PATENT DOCUMENTS

| 4,239,203 | 12/1980 | Uchida | 271/122 |
| 4,674,734 | 6/1987 | Ibuchi | 271/117 X |
| 5,116,034 | 5/1992 | Trask et al. | 271/121 X |

FOREIGN PATENT DOCUMENTS

| 123833 | 9/1980 | Japan | 271/117 |
| 17837 | 2/1981 | Japan | 271/117 |
| 183540 | 10/1983 | Japan | 271/122 |
| 61-1335 | 1/1986 | Japan | |
| 162438 | 7/1986 | Japan | 271/9.07 |
| 170346 | 7/1993 | Japan | 271/9.07 |

Primary Examiner—Boris Milef
Attorney, Agent, or Firm—Fitzpatrick Cella Harper & Scinto

[57] ABSTRACT

A sheet supplying apparatus is provided including a sheet stacking unit for stacking a plurality of sheets, a first roller for supplying an uppermost sheet on the sheet stacking unit and a second roller for supplying a lowermost sheet on the sheet stacking unit. A separation roller is disposed between the first and second sheet supply rollers to pass a single sheet toward a predetermined direction and to separate the other sheets from the single sheet for return. The first and second sheet supply rollers and the separation roller are made of the same material, and the first and second sheet supply rollers are disposed upstream of the separation roller in a sheet supplying direction. The apparatus also includes a controller for controlling (i) a motor for driving the separation roller and the first and second sheet supply rollers, (ii) a pendulum gear train for selectively connecting the first or second sheet supply rollers to the motor and for reversing a rotational direction of the separation roller and (iii) a solenoid for shifting the sheet stacking unit to position the sheets thereon at a predetermined position with respect to the first and second sheet supply rollers.

15 Claims, 28 Drawing Sheets